(12) United States Patent
Brown et al.

(10) Patent No.: US 9,915,934 B2
(45) Date of Patent: Mar. 13, 2018

(54) SYSTEMS AND METHODS FOR COMMUNICATING WITH MOTION CONTROL SYSTEMS AND DEVICES

(71) Applicant: Automation Middleware Solutions, Inc., Marshall, TX (US)

(72) Inventors: David W. Brown, Bingen, WA (US); Jay S. Clark, Bingen, WA (US)

(73) Assignee: Automation Middleware Solutions, Inc., Marshall, TX (US)

( * ) Notice: Subject to any disclaimer, the term of this patent is extended or adjusted under 35 U.S.C. 154(b) by 0 days.

(21) Appl. No.: 15/187,324

(22) Filed: Jun. 20, 2016

(65) Prior Publication Data
US 2016/0299485 A1  Oct. 13, 2016

Related U.S. Application Data

(63) Continuation of application No. 14/531,807, filed on Nov. 3, 2014, now abandoned, which is a continuation of application No. 13/911,031, filed on Jun. 5, 2013, now abandoned, which is a continuation
(Continued)

(51) Int. Cl.
G05B 19/05 (2006.01)
G05B 19/042 (2006.01)

(52) U.S. Cl.
CPC ......... *G05B 19/05* (2013.01); *G05B 19/0426* (2013.01); *G05B 2219/13004* (2013.01); *G05B 2219/24142* (2013.01)

(58) Field of Classification Search
CPC ............... G05B 19/05; G05B 19/0426; G05B 2219/24142; G05B 2219/13004
See application file for complete search history.

(56) References Cited

U.S. PATENT DOCUMENTS 4,577,710 A   3/1986   Ruzumna
4,799,171 A   1/1989   Cummings
(Continued)

FOREIGN PATENT DOCUMENTS

EP   0275826 A1   7/1988
EP   0442676 A2   8/1991
(Continued)

OTHER PUBLICATIONS

"Declaration of David W. Brown", Aug. 26, 2013, USPTO Patent Trial and Appeal Board, *ABB, Inc.* v. *ROY-G-BIV Corporation*, U.S. Pat. No. 6,513,058, *RA* v. *AMS* Ex. 1016, 137 pages.
(Continued)

*Primary Examiner* — Ramesh Patel
(74) *Attorney, Agent, or Firm* — Michael R. Schacht; Schacht Law Office, Inc.

(57) ABSTRACT

A motion control system includes a motion control application generated by a motion control system designer, a motion control component defining an application programming interface comprising an API function, and a security system comprising security settings for determining access by the motion control application to an API function of the application programming interface. A motion control application comprises an API function call. The motion control application makes an API function call to the motion control component. The motion control component generates a motion control command based on the API function call. The security system limits generation by the motion control component of a motion control command based on the security settings. The motion device performs the motion task based on the motion control command.

22 Claims, 49 Drawing Sheets

Related U.S. Application Data of application No. 13/011,753, filed on Jan. 21, 2011, now abandoned, which is a continuation of application No. 11/375,502, filed on Mar. 13, 2006, now abandoned, which is a continuation-in-part of application No. 11/063,696, filed on Feb. 22, 2005, now Pat. No. 7,035,697, which is a continuation of application No. 10/447,185, filed on May 27, 2003, now Pat. No. 6,859,671, which is a continuation of application No. 09/565,627, filed on May 4, 2000, now Pat. No. 6,571,141, said application No. 11/375,502 is a continuation-in-part of application No. 10/039,147, filed on Jan. 4, 2002, now abandoned, and a continuation-in-part of application No. 10/353,604, filed on Jan. 28, 2003, now Pat. No. 7,024,666, and a continuation-in-part of application No. 10/836,031, filed on Apr. 29, 2004, now Pat. No. 7,137,107.

(60) Provisional application No. 60/132,693, filed on May 4, 1999, provisional application No. 60/260,061, filed on Jan. 4, 2001, provisional application No. 60/352,302, filed on Jan. 28, 2002, provisional application No. 60/353,366, filed on Jan. 31, 2002, provisional application No. 60/466,588, filed on Apr. 29, 2003, provisional application No. 60/467,667, filed on May 2, 2003.

(56) References Cited

U.S. PATENT DOCUMENTS

| | | | |
|---|---|---|---|
| 4,837,719 | A | 6/1989 | McIntosh et al. |
| 4,923,428 | A | 5/1990 | Curran |
| 4,962,491 | A | 10/1990 | Schaeffer |
| 4,989,253 | A | 1/1991 | Liang et al. |
| 5,012,411 | A | 4/1991 | Policastro et al. |
| 5,029,214 | A | 7/1991 | Hollander |
| 5,036,462 | A | 7/1991 | Kaufman et al. |
| 5,148,944 | A | 9/1992 | Kaufman et al. |
| 5,268,837 | A | 12/1993 | Saylor |
| 5,307,263 | A | 4/1994 | Brown |
| 5,345,538 | A | 9/1994 | Narayannan et al. |
| 5,429,140 | A | 7/1995 | Burdea et al. |
| 5,453,933 | A | 9/1995 | Wright et al. |
| 5,483,440 | A | 1/1996 | Aono et al. |
| 5,553,609 | A | 9/1996 | Chen et al. |
| 5,612,869 | A | 3/1997 | Letzt et al. |
| 5,646,912 | A | 7/1997 | Cousin |
| 5,691,897 | A | 11/1997 | Brown et al. |
| 5,746,602 | A | 5/1998 | Kikinis |
| 5,752,976 | A | 5/1998 | Duffin et al. |
| 5,867,385 | A | 2/1999 | Brown et al. |
| 5,954,641 | A | 9/1999 | Kehr et al. |
| 5,988,851 | A | 11/1999 | Gent |
| 6,022,315 | A | 2/2000 | Iliff |
| 6,292,712 | B1 | 9/2001 | Bullen |
| 6,292,714 | B1 | 9/2001 | Okabayashi |
| 6,319,010 | B1 | 11/2001 | Kikinis |
| 6,393,297 | B1 | 5/2002 | Song |
| 6,471,420 | B1 | 10/2002 | Maekawa et al. |
| 6,480,896 | B1 | 11/2002 | Brown et al. |
| 6,482,156 | B2 | 11/2002 | Iliff |
| 6,513,058 | B2 | 1/2003 | Brown et al. |
| 6,516,236 | B1 | 2/2003 | Brown et al. |
| 6,522,951 | B2 | 2/2003 | Born et al. |
| 6,529,802 | B1 | 3/2003 | Kawakita et al. |
| 6,542,925 | B2 | 4/2003 | Brown et al. |
| 6,572,431 | B1 | 6/2003 | Maa |
| 6,584,376 | B1 | 6/2003 | Kommer |
| 6,594,347 | B1 | 7/2003 | Calder et al. |
| 6,615,091 | B1 * | 9/2003 | Birchenough ......... B65G 37/02 700/20 |
| 6,885,898 | B1 | 4/2005 | Brown et al. |
| 6,941,543 | B1 | 9/2005 | Brown et al. |
| 7,024,255 | B1 | 4/2006 | Brown et al. |
| 7,024,666 | B1 | 4/2006 | Brown |
| 7,031,798 | B2 | 4/2006 | Brown et al. |
| 7,103,348 | B1 | 9/2006 | Levit et al. |
| 7,127,303 | B2 * | 10/2006 | Renner ............. G05B 19/0421 340/3.1 |
| 7,137,107 | B1 * | 11/2006 | Brown ................... G06F 9/542 318/568.1 |
| 7,139,642 | B2 | 11/2006 | Kamoto et al. |
| 7,139,843 | B1 | 11/2006 | Brown et al. |
| 7,171,281 | B2 * | 1/2007 | Weber .................... B65G 37/02 700/20 |
| 7,194,412 | B2 | 3/2007 | Mays |
| 7,321,799 | B2 | 1/2008 | Paillard |
| 7,553,234 | B2 | 6/2009 | Walker et al. |
| 7,831,323 | B2 * | 11/2010 | Weber .................... B65G 37/02 700/20 |
| 7,853,645 | B2 | 12/2010 | Brown et al. |
| 7,904,194 | B2 * | 3/2011 | Brown ................. G05B 19/408 700/174 |
| 7,949,616 | B2 | 5/2011 | Levy et al. |
| 8,027,349 | B2 * | 9/2011 | Brown ............... G05B 19/4185 370/399 |
| 8,032,605 | B2 * | 10/2011 | Brown ............... G05B 19/4185 700/1 |
| 8,073,557 | B2 | 12/2011 | Brown et al. |
| 8,155,781 | B2 | 4/2012 | Birzer et al. |
| 8,165,867 | B1 | 4/2012 | Fish |
| 8,356,207 | B2 | 1/2013 | Hosek et al. |
| 9,588,510 | B2 | 3/2017 | Brown et al. |
| 2001/0044731 | A1 | 11/2001 | Coffman et al. |
| 2002/0057765 | A1 | 5/2002 | Hyziak et al. |
| 2002/0061504 | A1 | 5/2002 | Saijo et al. |
| 2002/0103575 | A1 | 8/2002 | Sugawara |
| 2002/0146097 | A1 | 10/2002 | Vuori |
| 2002/0160757 | A1 | 10/2002 | Shavit et al. |
| 2003/0023348 | A1 | 1/2003 | Inoue et al. |
| 2003/0045947 | A1 | 3/2003 | Wampler |
| 2003/0139848 | A1 | 7/2003 | Cifra et al. |
| 2004/0093219 | A1 | 5/2004 | Shin et al. |
| 2004/0098167 | A1 | 5/2004 | Yi et al. |
| 2005/0240672 | A1 | 10/2005 | Chen et al. |
| 2006/0230201 | A1 * | 10/2006 | Fromherz ............... H04L 41/00 710/62 |
| 2007/0067678 | A1 | 3/2007 | Hosek et al. |
| 2007/0112912 | A1 * | 5/2007 | Weber .................... B65G 37/02 709/203 |
| 2010/0131080 | A1 | 5/2010 | Brown et al. |
| 2010/0131081 | A1 | 5/2010 | Brown et al. |
| 2011/0035037 | A1 * | 2/2011 | Weber .................... B65G 37/02 700/96 |
| 2013/0041671 | A1 | 2/2013 | Brown et al. |
| 2013/0110259 | A1 | 5/2013 | Brown et al. |
| 2013/0304806 | A1 | 11/2013 | Brown et al. |
| 2014/0018941 | A1 | 1/2014 | Brown et al. |
| 2015/0057769 | A1 | 2/2015 | Brown et al. |
| 2015/0105869 | A1 | 4/2015 | Brown et al. |
| 2015/0112471 | A1 | 4/2015 | Brown et al. |
| 2015/0127341 | A1 | 5/2015 | Brown et al. |
| 2015/0312336 | A1 | 10/2015 | Brown et al. |
| 2017/0038763 | A1 | 2/2017 | Brown et al. |

FOREIGN PATENT DOCUMENTS

| EP | 1678589 B1 | 3/2013 |
|---|---|---|
| HK | 1093626 B | 3/2007 |
| WO | 1991005311 A1 | 4/1991 |
| WO | 9507504 | 3/1995 |
| WO | 9526009 | 9/1995 |
| WO | 1996024284 A1 | 8/1996 |

OTHER PUBLICATIONS

"Declaration of David W. Brown", Jul. 18, 2013, USPTO Patent Trial and Appeal Board, *ABB, Inc.* v. *ROY-G-BIV Corporation*, U.S. Pat. No. 6,516,236, *RA* v. *AMS* Ex. 1016, 138 pages.

(56) References Cited

OTHER PUBLICATIONS

"Declaration of David W. Brown", Jul. 18, 2013, USPTO Patent Trial and Appeal Board, *ABB, Inc.* v. *ROY-G-BIV Corporation*, U.S. Pat. No. 8,073,557, *RA* v. *AMS* Ex. 1016, 186 pages.
"Declaration of William Rizzi in Support of Petition for InterPartes Review of U.S. Pat. No. 5,691,897", USPTO Patent Trial and Appeal Board, Dec. 22, 2016, *VA* v. *AMS* Ex. 1002, 127 pages.
"Declaration of William Rizzi in Support of Petition for InterPartes Review of U.S. Pat. No. 6,513,058", USPTO Patent and Trial and Appeal Board, Oct. 7, 2016, *RA* v. *AMS* Ex. 1002, 121 pages.
"Declaration of William Rizzi in Support of Petition for InterPartes Review of U.S. Pat. No. 6,516,236", USPTO Patent Trial and Appeal Board, Oct. 17, 2016, *RA* v. *AMS* Ex. 1002, 114 pages.
"Declaration of William Rizzi in Support of Petition for InterPartes Review of U.S. Pat. No. 6,941,543", USPTO Patent Trial and Appeal Board, Dec. 23, 2016, *RA* v. *AMS* Ex. 1002, 103 pages.
"Declaration of William Rizzi in Support of Petition for InterPartes Review of U.S. Pat. No. 8,073,557", USPTO Patent Trial and Appeal Board, Nov. 1, 2016, *RA* v. *AMS* Ex. 1002, 123 pages.
"Defendant's Identification of Preliminary Proposed Claim Constructions and Extrinsic Evidence Under Patent Local Rule 4-2", *Automation Middleware Solutions, Inc.* v. *Invensys Systems, Inc., et al., Emerson Process Management, et al., Rockwell Automation, Inc. et al., Kollmorgen Corporation, et al., Yaskawa America, Inc., et al., Mitsubishi Electric Corp., et al.*, U.S. District Court for the Eastern District of Texas Marshall Division, Sep. 2, 2016, *RA* v. *AMS* Ex. 1005, 18 pages.
"Exhibit O3—Invalidity Claim Chart for U.S. Pat. No. 6,941,543 Cashin/Motion Toolbox/ODBC", *RA* v. *AMS* Ex. 1027, 75 pages.
"First Amended Exhibit N1—Invalidity Claim Chart for U.S. Pat. No. 6,513,058 Cashin/GML/ODBC", *RA* v. *AMS* Ex. 1028, 148 pages.
"First Amended Exhibit N2—Invalidity Claim Chart for U.S. Pat. No. 6,516,236 Cashin/GML/ODBC/Brockschmidt", *RA* v. *AMS* Ex. 1028, 90 pages.
"First Amended Exhibit N3—Invalidity Claim Chart for U.S. Pat. No. 6,941,543 Cashin/GML/ODBC", *RA* v. *AMS* Ex. 1026, 69 pages.
"First Amended Exhibit N4—Invalidity Claim Chart for U.S. Pat. No. 8,073,557 Cashin/GML/ODBC/Brockschmidt", *RA* v. *AMS* Ex. 1028, 411 pages.
"First Amended Exhibit N5—Invalidity Claim Chart for U.S. Pat. No. 5,691,897 Cashin/GML/ODBC/Brockschmidt", *RA* v. *AMS* Ex. 1026, 86 pages.
"Hearing on Motion to Dismiss Under 35 U.S.C. 101 (Alice)" *Automation Middleware Solutions, Inc.* v. *Invensys Systems, Inc. et al.*, Aug. 3, 2016, US District Court for the Eastern District of Texas, Texarkana Division, *RA* v. *AMS* Ex. 1003, 91 pages.
"Invalidity claim chart Cashin, Motion Toolbox, and ODBC", U.S. Pat. No. 6,513,058, *RA* v. *AMS* Ex. 1029; 160 pages.
"Invalidity claim chart Cashin, Motion Toolbox, ODBC, and Brockschmidt", U.S. Pat. No. 6,516,236, *RA* v. *AMS* Ex. 1029; 96 pages.
"Invalidity Claim Chart for U.S. Pat. No. 5,691,897 Cashin//ODBC/Brockschmidt/Motion Toolbox", *RA* v. *AMS* Ex. 1027, 97 pages.
"P.R. 4-3 Joint Claim Constructions and Prehearing Statement", *Automation Middleware Solutions, Inc.* v. *Invensys Systems, Inc. et al.*, Sep. 13, 2016, US District Court for the Eastern District of Texas, Marshall Division, *RA* v. *AMS* Ex. 1004, 47 pages.
"Petition for Inter Partes Review Under 35 U.S.C. §§ 311-319 and 37 C.F.R. § 42.100 et Seq.", USPTO Patent Trial and Appeal Board, *Rockwell Automation, Inc. et al.*, v. *Automation Middleware Solutions, Inc.*, U.S. Pat. No. 6,941,543, Dec. 23, 2016, 75 pages.
"Petition for Inter Partes Review Under 35 U.S.C. §§ 311-319 and 37 C.F.R. § 42.100 et Seq.", USPTO Patent Trial and Appeal Board, *Rockwell Automation et al.*, v. *Automation Middleware Solutions, Inc.*, U.S. Pat. No. 5,691,897, Dec. 22, 2016, 85 pages.
"Petition for Inter Partes Review Under 35 U.S.C. §§ 311-319 and 37 C.F.R. § 42.100 et Seq.", USPTO Patent Trial and Appeal Board, *Rockwell Automation, Inc. et al.*, v. *Automation Middleware Solutions, Inc.*, U.S. Pat. No. 8,073,557, Nov. 2, 2016, 86 pages.
"Petition for Inter Partes Review Under 35 U.S.C. §§ 311-319 and 37 C.F.R. § 42.100 et Seq.", USPTO Patent Trial and Appeal Board, *Rockwell Automation, Inc. et al.*, v. *Automation Middleware Solutions, Inc.*, U.S. Pat. No. 6,516,236, Oct. 17, 2016, 83 pages.
"Petition for Inter Partes Review Under 35 U.S.C. §§ 311-319 and 37 C.F.R. § 42.100 et Seq.", USPTO Patent Trial and Appeal Board, *Rockwell Automation, Inc. et al.*, v. *Automation Middleware Solutions, Inc.*, U.S. Pat. No. 6,513,058, Oct. 7, 2016, 84 pages.
"Plaintiff Roy-G-Biv Corporation's Disclosure of Asserted Claims and Infringement Contentions Pursuant to Local Patent Rule 3-1", Sep. 14, 2012, *ROY-G-BIV Corporation* v. *ABB Ltd., ABB, Inc., Meadwestvaco Texas, LP and Meadwestvaco Corporation*, U.S. District Court for the Eastern District of Texas Marshall Division, *RA* v. *AMS* Ex. 1015, 8 pages.
"Plaintiff's P.R. 4-2 Disclosures", *Automation Middleware Solutions, Inc.* v. *Invensys Systems, Inc. et al.*, U.S. District Court for the Eastern District of Texas Marshall Division, Sep. 2, 2016, *RA* v. *AMS* Ex. 1006, 51 pages.
ABB, Siemens, Honeywell; "Pleadings: Defendant's Notice of Compliance with Court's Motion Practice Order Including Exhibit 1", Apr. 12, 2013, 10 pages.
Aerotech, Inc.; "UNIDEX 400 Series Motion Controllers—Operation and Technical Manual", Oct. 1992, 508 pages.
Allen-Bradley, "GML Graphical Motion Control Language—GML Programmer's Workshop User Manual", 1993, *RA* v. *AMS* Ex. 1021, 59 pages.
Allen-Bradley, "IMC-201 Single-Axis Motion Controller—GMP V3.3 Programming Manual", Jun. 17, 1993, *RA* v. *AMS* Ex. 1022, 296 pages.
Boult Wade Tennant/ROY-G-BIV, "Response as filed, EP 04816957.7" Aug. 11, 2015, 14 pages.
Brockschmidt, Kraig, "Inside OLE 2", 1994, *RA* vs. *AMS* Ex. 1030, 221 pages.
Brown, David, "WOSA/XMC MCAPI and MCSPI Design Specification", Jul. 1, 1994, *RA* v. *AMS* Ex. 1018, 54 pages.
Brown, et al., "Motion Control Systems and Methods", U.S. Appl. No. 60/067,466, filed Dec. 4, 1997, *RA* v. *AMS* Ex. 1017, 13 pages.
Canadian Intellectual Property Office, Confirming Dead Application, CA 2,766,268, Feb. 5, 2016, 2 pages.
Canadian Intellectual Property Office, Office Action, CA 2,766,268, dated Jan. 29, 2014, 2 pages.
Cashin, Jerry, Computer Technology Research Corp, "WOSA Windows Open Services Architecture", 1994, *RA* v. *AMS* Ex. 1008, 165 pages.
Davis, L.; "Order: Granting Motion to Dismiss All Claims Relating to U.S. Pat. No. 8,027,349", Apr. 30, 2013, US Dist Court EDTX, Tyler Div, 2 pages.
Davis, L.; "Order: Meet and Confer to Narrow Number of Disputed Terms", Apr. 15, 2013, US Dist Court EDTX, Tyler Div, 1 page.
Davis, L.; "Order: Meet and Confer to Narrow Number of Disputed Terms", Apr. 23, 2013, US Dist Court EDTX, Tyler Div, 1 page.
EPO, "Communication pursuant to Article 94(3) EPC, EP 04816957.7" dated Feb. 4, 2015, 5 pages.
EPO, "Extended European Search Report, EP 10180730.3" dated Nov. 6, 2013, 5 pages.
EPO, "Noting of loss of rights pursuant to Rule 112(1) EPC, EP 10180730.3" dated Jan. 29, 2014, 1 page.
Gibbs, David and Crandell, Thomas M., "An Introduction to CNC Machining and Programming", 1991, *RA* v. *AMS* Ex. 1010, Part 1 of 3, 15 pages.
Gibbs, David and Crandell, Thomas M., "An Introduction to CNC Machining and Programming", 1991, *RA* v. *AMS* Ex. 1010, Part 2 of 3, 20 pages.
Gibbs, David and Crandell, Thomas M., "An Introduction to CNC Machining and Programming", 1991, *RA* v. *AMS* Ex. 1010, Part 3 of 3, 39 pages.
Halpert. David E., "Object Oriented Programming for Motion Control", *RA* v. *AMS* Ex. 1013, 11 pages.
Hawthorn, Z.; "Order: Claim Construction Memorandum Opinion and Order", Jul. 25, 2013, US Dist Court EDTX, Tyler Div, 64 pages.

(56) References Cited

OTHER PUBLICATIONS

Hawthorn, Z.; "Order: Granting Joint Motion to Extend Deadlines", Jul. 17, 2013, US Dist Court EDTX, Tyler Div, 3 pages.
Hawthorn, Z.; "Order: Report and Recommendation of United States Magistrate Judge to Deny Summary Judgement on Indefiniteness", Jul. 26, 2013, US Dist Court EDTX, Tyler Div, 19 pages.
Holloway, Kevin, "Motion Software Heads Toward Friendlier User Environments", Aug. 1995, 7 pages.
Individual; "ReEx: U.S. Pat. No. 6,513,058 Interpartes Review—Response to Petition for Inter Partes Review", Jan. 15, 2013, 63 pages.
Lin, S.C. Jonathan, "Computer Numerical Control—From Programming to Networking" 1994, RA v. AMS Ex. 1011, 90 pages.
Microsoft Press, "Computer Dictionary—The Comprehensive Standard for Business, School, Library, and Home", 1991, RA v. AMS Ex. 1030, 7 pages.
Microsoft Windows Version 3.1, "Device Driver Adaptation Guide", 1991, RA v. AMS Ex. 1007, 119 pages (part 1 of 2).
Microsoft Windows Version 3.1, "Device Driver Adaptation Guide", 1991, RA v. AMS Ex. 1007, 120 pages (part 2 of 2).
Microsoft, "ODBC 2.0 Programmer's Reference and SDK Guide—The Microsoft Open Database Standard for Microsoft Windows and Windows NT", 1994, RA v. AMS Ex. 1020, 100 pages (part 1 of 4).
Microsoft, "ODBC 2.0 Programmer's Reference and SDK Guide—The Microsoft Open Database Standard for Microsoft Windows and Windows NT", 1994, RA v. AMS Ex. 1020, 100 pages (part 2 of 4).
Microsoft, "ODBC 2.0 Programmer's Reference and SDK Guide—The Microsoft Open Database Standard for Microsoft Windows and Windows NT", 1994, RA v. AMS Ex. 1020, 100 pages (part 3 of 4).
Microsoft, "ODBC 2.0 Programmer's Reference and SDK Guide—The Microsoft Open Database Standard for Microsoft Windows and Windows NT", 1994, RA v. AMS Ex. 1020, 134 pages (part 4 of 4).
Motion Engineering, Inc. PC/DSP-Series Motion Controller C Programming Guide, May 1992, RA v. AMS Ex. 1025, 55 pages.
National Instruments, "LabVIEW for Windows User Manual", Aug. 1993, RA v. AMS Ex. 1024, 460 pages.
NEMA, Programmable Motion Control Group, "Programmable Motion Control Handbook", Nov. 1992, RA v. AMS Ex. 1009, 28 pages.
ROY-G-BIV Corp, ABB, Honeywell, and Siemens; "Pleadings: Amended Joint Claim Construction and PreHearing Statement—Exhibit A", Apr. 18, 2013, 2 pages.
ROY-G-BIV Corp, ABB, Honeywell, and Siemens; "Pleadings: Amended Joint Claim Construction and PreHearing Statement—Exhibit B", Apr. 18, 2013, 8 pages.
ROY-G-BIV Corp, ABB, Honeywell, and Siemens; "Pleadings: Amended Joint Claim Construction and Prehearing Statement—Exhibit C", Apr. 18, 2013, 63 pages.
ROY-G-BIV Corp, ABB, Honeywell, and Siemens; "Pleadings: Amended Joint Claim Construction and PreHearing Statement—Exhibit D", Apr. 18, 2013, 16 pages.
ROY-G-BIV Corp, ABB, Honeywell, and Siemens; "Pleadings: Amended Joint Claim Construction and PreHearing Statement", Apr. 18, 2013, 7 pages.
ROY-G-BIV Corp, ABB, Honeywell, and Siemens; "Pleadings: Joint Claim Construction and PreHearing Statement—Exhibit A", Apr. 10, 2013, 1 page.
ROY-G-BIV Corp, ABB, Honeywell, and Siemens; "Pleadings: Joint Claim Construction and PreHearing Statement—Exhibit B", Apr. 10, 2013, 7 pages.
ROY-G-BIV Corp, ABB, Honeywell, and Siemens; "Pleadings: Joint Claim Construction and PreHearing Statement—Exhibit C", Apr. 10, 2013, 66 pages.
ROY-G-BIV Corp, Abb, Honeywell, and Siemens; "Pleadings: Joint Claim Construction and PreHearing Statement—Exhibit D", Apr. 10, 2013, 18 pages.
ROY-G-BIV Corp, ABB, Honeywell, and Siemens; "Pleadings: Joint Claim Construction and PreHearing Statement", Apr. 10, 2013, 6 pages.
ROY-G-BIV Corporation; "Pleadings: Plaintiff Markman Reply Brief to FANUC", Dec. 12, 2008, 24 pages.
Schacht Law Office/ROY-G-BIV, "Preliminary Amendment, U.S. Appl. No. 14/572,611", dated Oct. 21, 2015, 8 pages.
Schacht Law Office/ROY-G-BIV, "Preliminary Amendment, U.S. Appl. No. 14/794,057", dated Oct. 21, 2015, 8 pages.
Schacht Law Office/ROY-G-BIV, "Response to Non-Final Office Action, U.S. Appl. No. 13/651,446", dated Apr. 7, 2014, 11 pages.
Schacht Law Office/ROY-G-BIV, "Response to Non-Final Office Action, U.S. Appl. No. 13/719,112", dated Mar. 25, 2014, 11 pages.
Schacht Law Office/ROY-G-BIV, "Response to Non-Final Office Action, U.S. Appl. No. 14/298,567", dated Sep. 15, 2015, 14 pages.
Schacht Law Office/ROY-G-BIV, "Response to Non-Final Office Action, U.S. Appl. No. 14/595,108", dated Oct. 25, 2015, 11 pages.
Schacht, Michael, "Response to Office Action (U.S. Appl. No. 08/454,736) dated Oct. 2, 1996", U.S. Pat. No. 5,691,897, Jan. 2, 1997, RA v. AMS Ex. 1027, 14 pages.
Sercos Interface, "Digital interface for communication between controls and drives in numerically controlled machines", RA v. AMS Ex. 1012, 18 pages.
Snider Consultants, Inc., Compumotor Motion Toolbox User Guide—A Library of LabVIEW Virtual Instruments for Motion Control, Mar. 1994, RA v. AMS Ex. 1023, 113 pages.
USPTO, "Office Action—U.S. Appl. No. 08/454,736", dated Oct. 2, 1996, U.S. Pat. No. 5,691,897 RA v. AMS Ex. 1026, 6 pages.
USPTO, "Corrected Notice of Allowability, U.S. Appl. No. 14/298,567", dated Jan. 17, 2017, 15 pages.
USPTO, "Final Office Action, U.S. Appl. No. 13/651,446", dated Jul. 16, 2014, 11 pages.
USPTO, "Final Office Action, U.S. Appl. No. 13/719,112", dated Jun. 27, 2014, 7 pages.
USPTO, "Final Office Action, U.S. Appl. No. 13/941,327", dated Jan. 8, 2015, 60 pages.
USPTO,"Final Office Action, U.S. Appl. No. 14/595,108", dated Nov. 18, 2015, 29 pages.
USPTO, "Issue Notification, U.S. Appl. No. 14/298,567", dated Feb. 15, 2017, 1 page.
USPTO, "Non-Final Office Action, U.S. Appl. No. 12/271,724", dated Nov. 18, 2013, 255 pages.
USPTO,"Non-Final Office Action, U.S. Appl. No. 13/232,877", dated Dec. 6, 2013, 213 pages.
USPTO, "Non-Final Office Action, U.S. Appl. No. 13/651,446", dated Oct. 7, 2013, 137 pages.
USPTO, "Non-Final Office Action, U.S. Appl. No. 13/719,112", dated Sep. 25, 2013, 87 pages.
USPTO, "Non-Final Office Action, U.S. Appl. No. 13/911,031", dated May 7, 2014, 11 pages.
USPTO, "Non-Final Office Action, U.S. Appl. No. 14/298,567", dated Jun. 15, 2015, 12 pages.
USPTO, "Non-Final Office Action, U.S. Appl. No. 14/531,807", dated Jan. 19, 2016, 12 pages.
USPTO, "Non-Final Office Action, U.S. Appl. No. 14/595,108", dated Jul. 28, 2015, 19 pages.
USPTO, "Non-Final Office Action, U.S. Appl. No. 15/332,791,", dated Feb. 22, 2017, 22 pages.
USPTO, "Notice of Abandonment, U.S. Appl. No. 12/244,673,", dated Jul. 2, 2013, 2 pages.
USPTO, "Notice of Abandonment, U.S. Appl. No. 12/896,750,", dated Jan. 24, 2013, 2 pages.
USPTO, "Notice of Abandonment, U.S. Appl. No. 13/011,753,", dated Jul. 19, 2013, 2 pages.
USPTO, "Notice of Abandonment, U.S. Appl. No. 13/103,976,", dated Feb. 28, 2013, 2 pages.
USPTO, "Notice of Abandonment, U.S. Appl. No. 13/184,428,", dated Aug. 29, 2013, 3 pages.
USPTO, "Notice of Abandonment, U.S. Appl. No. 13/232,877,", dated Oct. 1, 2014, 2 pages.
USPTO, "Notice of Abandonment, U.S. Appl. No. 13/280,293,", dated Dec. 6, 2013, 1 page.
USPTO, "Notice of Abandonment, U.S. Appl. No. 13/651,446,", dated Feb. 6, 2015, 2 pages.
USPTO, "Notice of Abandonment, U.S. Appl. No. 13/719,112,", dated Jan. 28, 2015, 2 pages.

(56) References Cited

OTHER PUBLICATIONS

USPTO, "Notice of Abandonment, U.S. Appl. No. 13/875,261,", dated Feb. 27, 2014, 2 pages.
USPTO, "Notice of Abandonment, U.S. Appl. No. 13/911,031", dated Dec. 8, 2014, 2 pages.
USPTO, "Notice of Abandonment, U.S. Appl. No. 13/941,327", dated Jul. 28, 2015, 2 pages.
USPTO, "Notice of Abandonment, U.S. Appl. No. 14/531,807", dated Aug. 25, 2016, 2 pages.
USPTO, "Notice of Abandonment, U.S. Appl. No. 14/595,108", dated Jan. 9, 2017, 2 pages.
USPTO, "Notice of Allowance and Fee(s) Due, U.S. Appl. 14/298,567", dated Oct. 19, 2016, 16 pages.
USPTO, "Notice of Allowance, U.S. Appl. No. 13/280,293", dated May 14, 2013, 3 parts—650 total pages.
USPTO, "Notice of Allowance, U.S. Appl. No. 13/280,293", dated May 14, 2013, 650 pages.
USPTO, "Notice of Allowance, U.S. Appl. No. 13/280,293", dated Aug. 20, 2013, 31 pages.
USPTO, "Notice of Allowance, U.S. Appl. No. 14/298,567", dated Nov. 19, 2015, 17 pages.
USPTO, "Notice of Publication of Application, U.S. Appl. No. 15/332,791", dated Feb. 9, 2017, 1 page.
USPTO, "Supplemental Notice of Allowability, U.S. Appl. No. 13/280,293", dated Jul. 23, 2013, 12 pages.
USPTO, "Supplemental Notice of Allowability, U.S. Appl. No. 13/280,293", dated Aug. 2, 2013, 15 pages.
USPTO, "ReEx: U.S. Pat. No. 6,516,236 Interpartes Review—Decision Institution of Inter Partes Review", Apr. 18, 2013, 25 pages.
USPTO, "ReEx: U.S. Pat. No. 6,516,236 Interpartes Review—Scheduling Order for Institution of Inter Partes Review", Apr. 18, 2013, 6 pages.
USPTO, "ReEx: U.S. Pat. No. 8,073,557 Interpartes Review—Decision Institution of Inter Partes Review", Apr. 18, 2013, 19 pages.
USPTO, "ReEx: U.S. Pat. No. 8,073,557 Interpartes Review—Scheduling Order for Institution of Inter Partes Review", Apr. 18, 2013, 6 pages.
USPTO, "Non-Final Office Action, U.S. Appl. No. 14/794,057", dated May 11, 2017, 36 pages.
Schacht Law Office/AMS, "Response to Non-Final Office Action, U.S. Appl. No. 15/332,791", dated Jul. 24, 2017, 12 pages.
USPTO, "Final Office Action, U.S. Appl. No. 15/332,791", dated Oct. 4, 2017, 35 pages.
USPTO, "Non-Final Office Action, U.S. Appl. No. 14/572,611", dated Sep. 25, 2017, 36 pages.

* cited by examiner

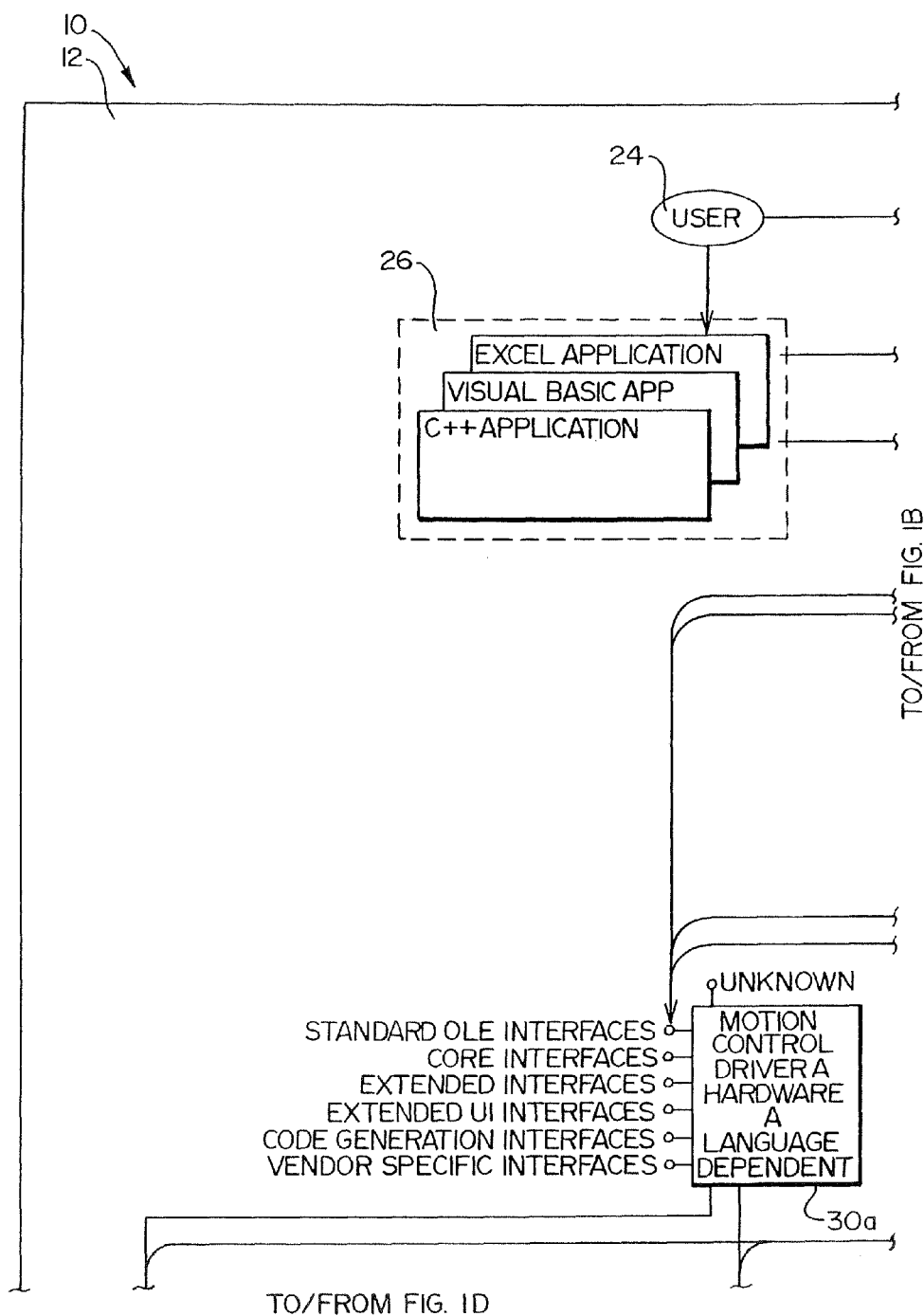

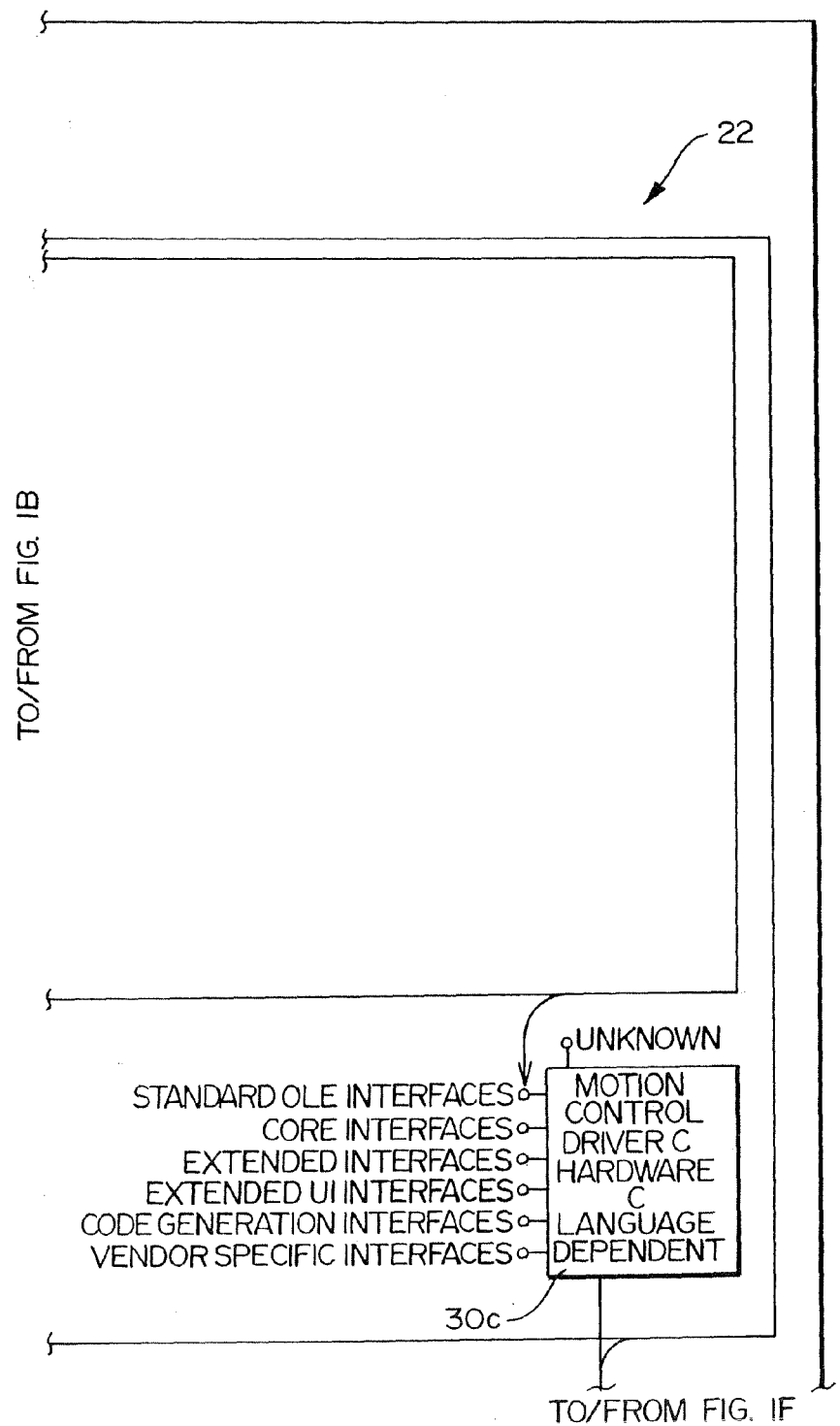

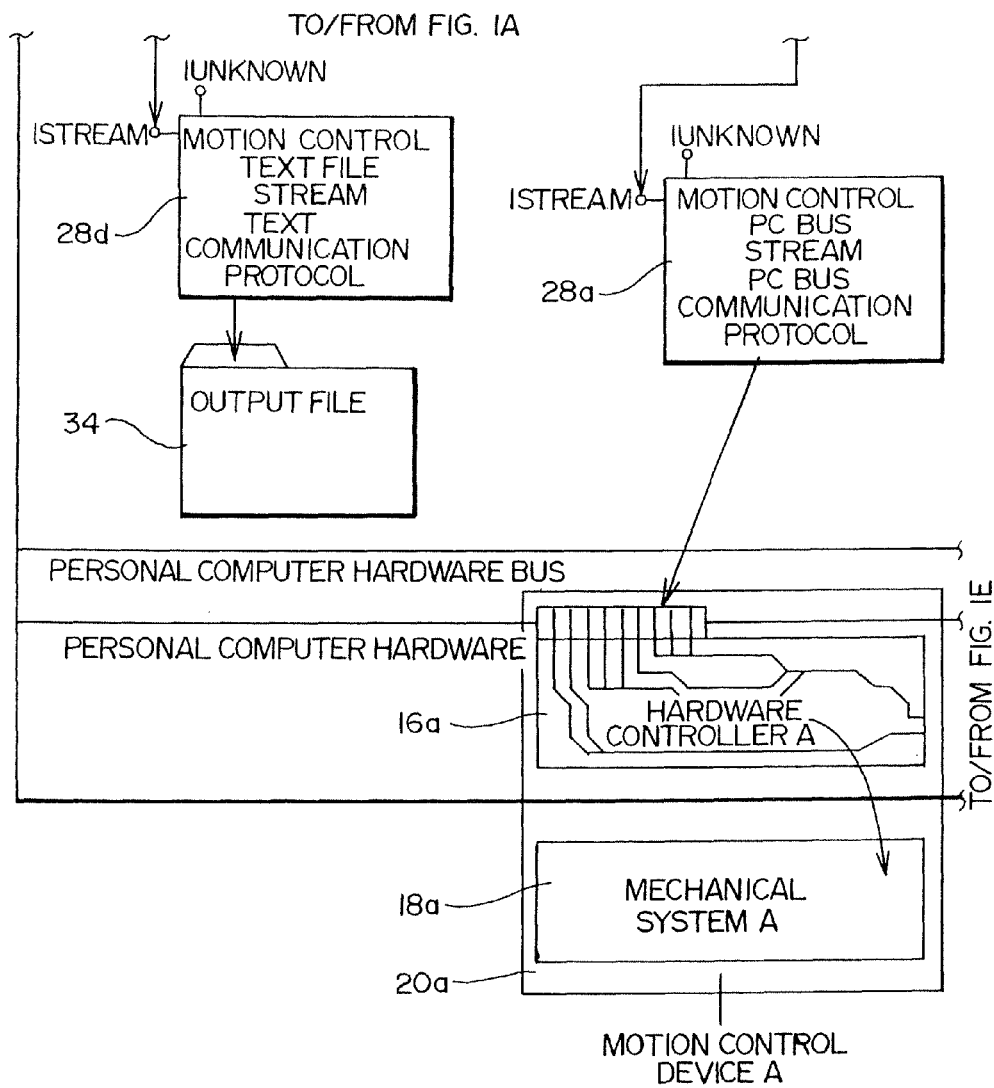

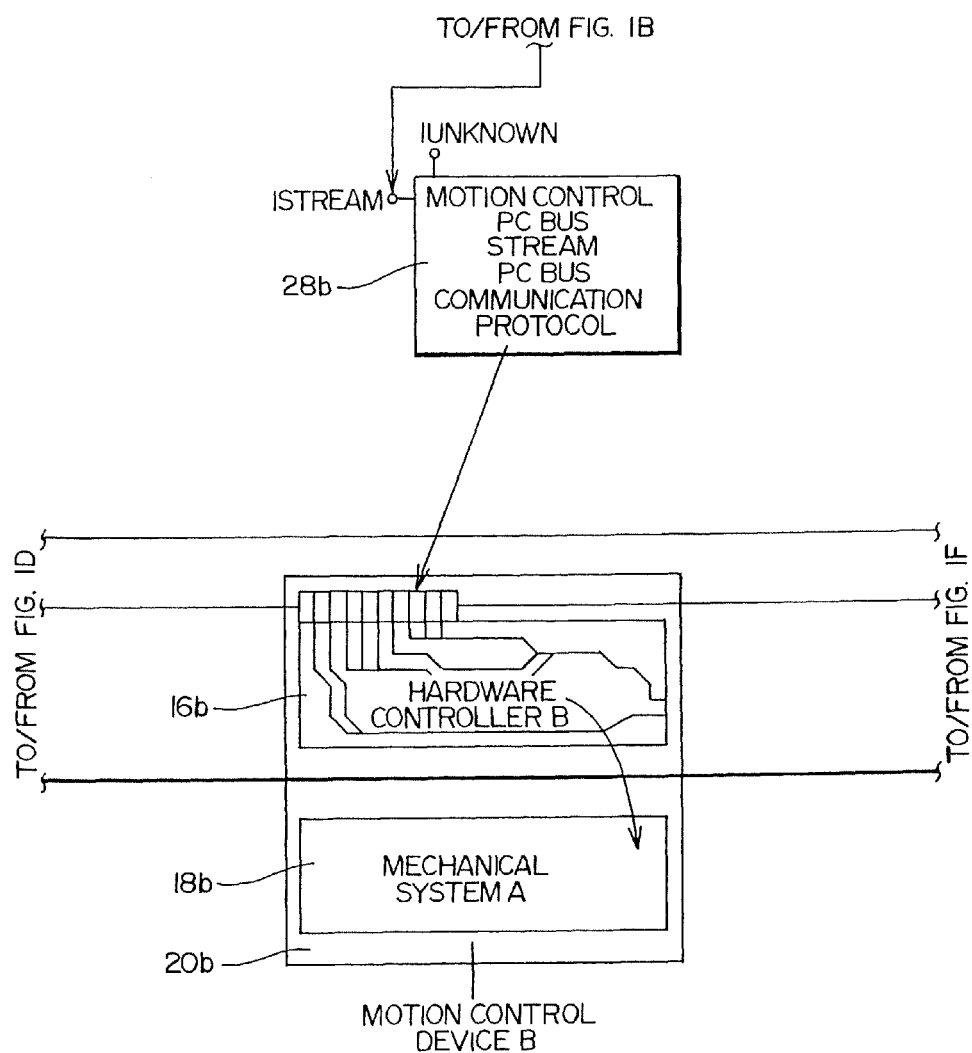

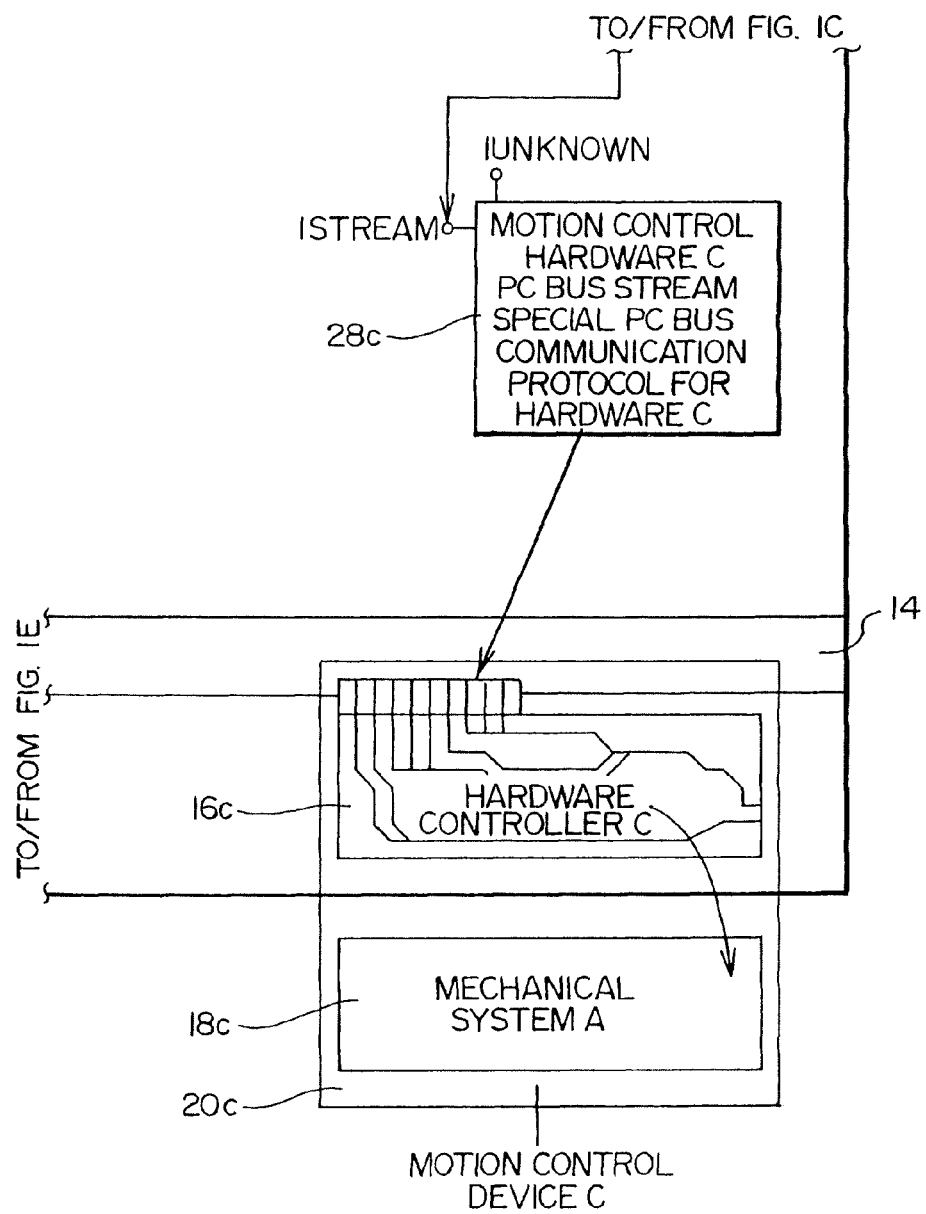

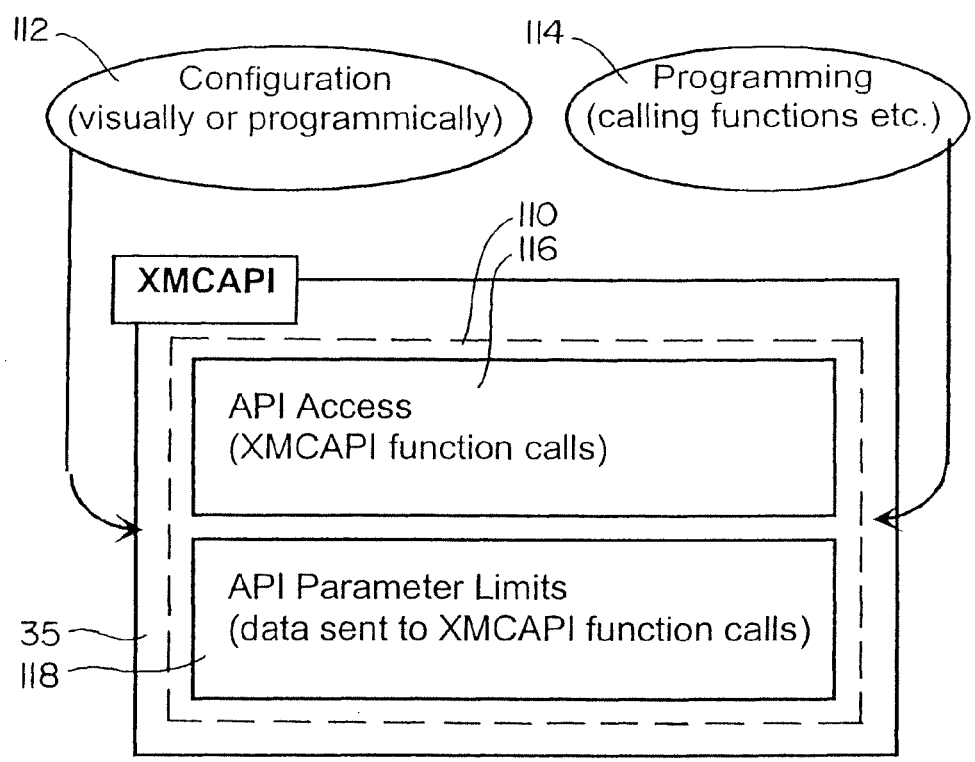
FIG. 2  General Use

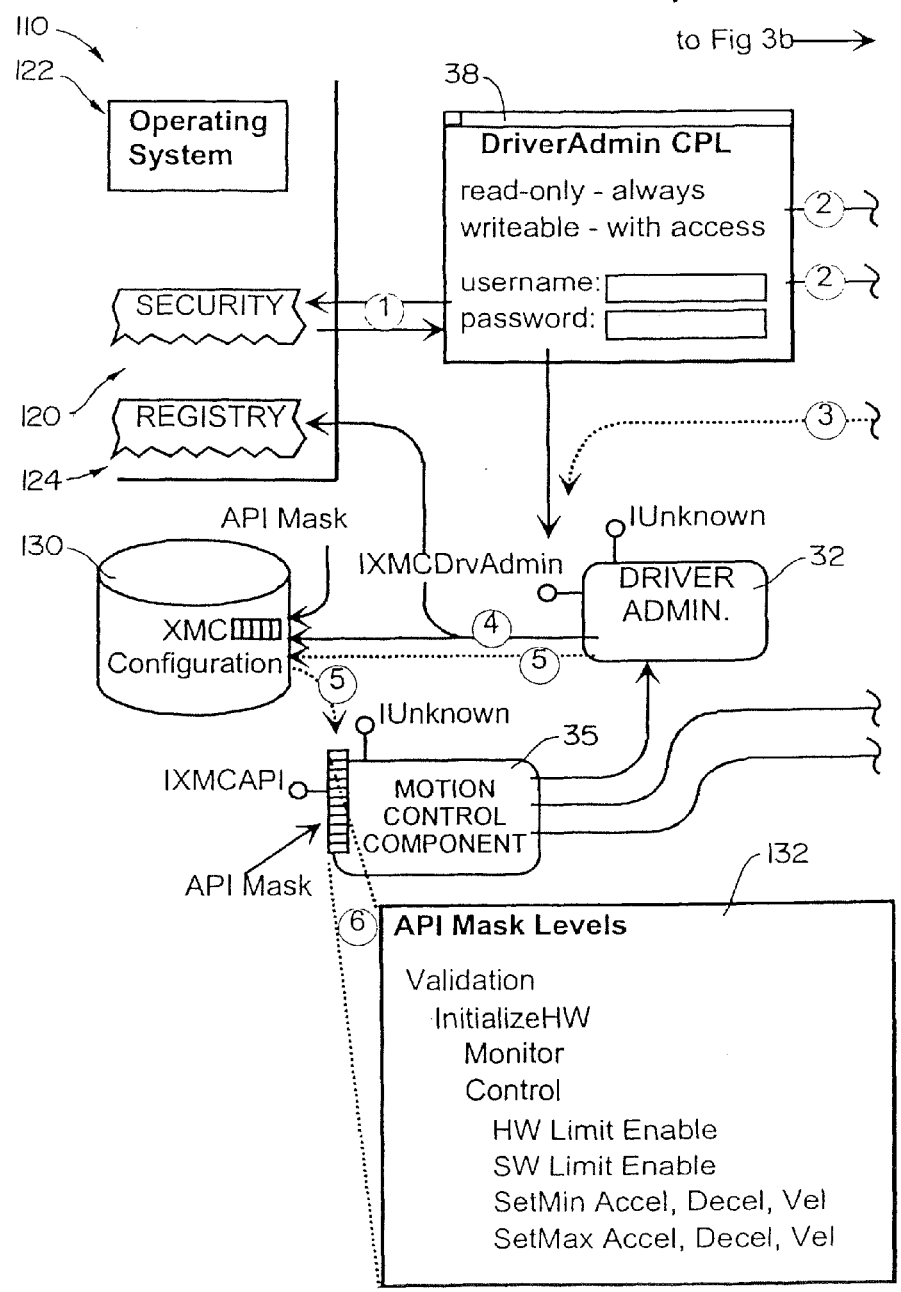
FIG. 3a Module Interaction Map

FIG. 3b Module Interaction Map
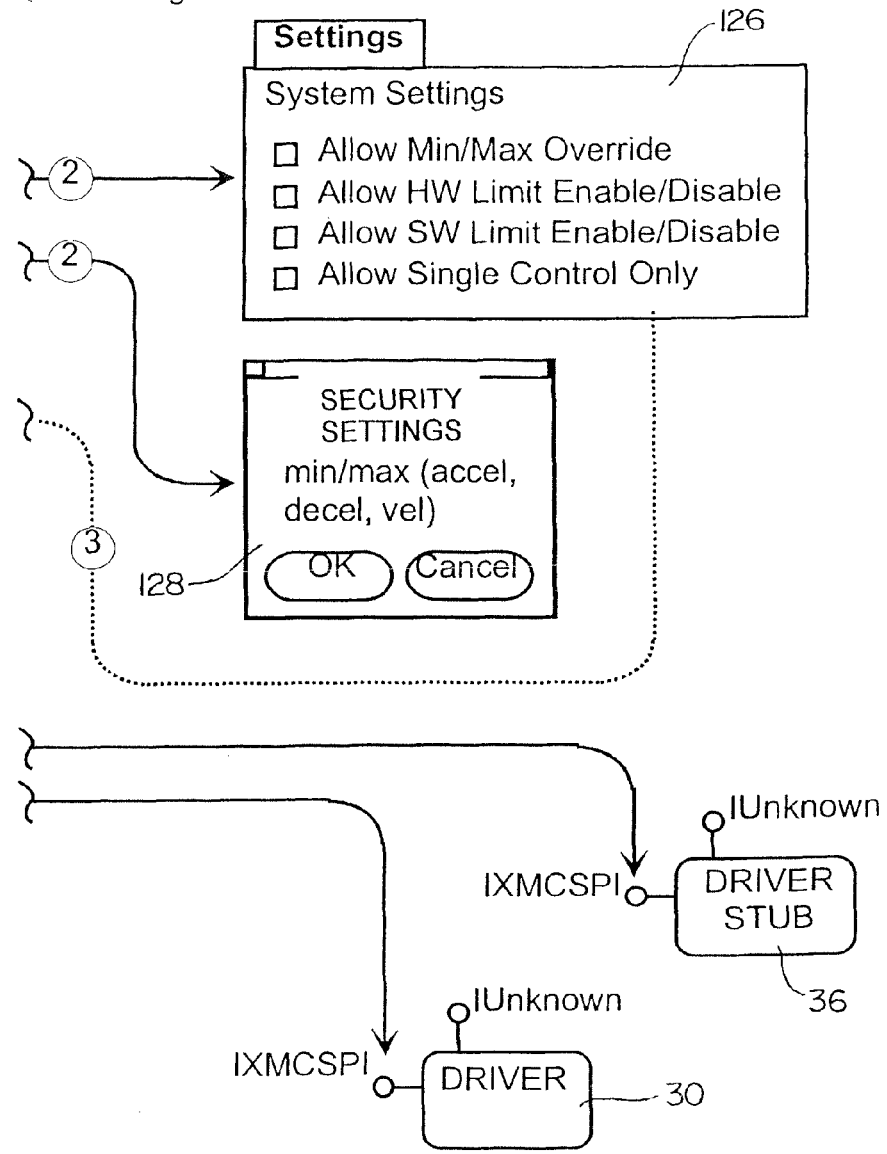

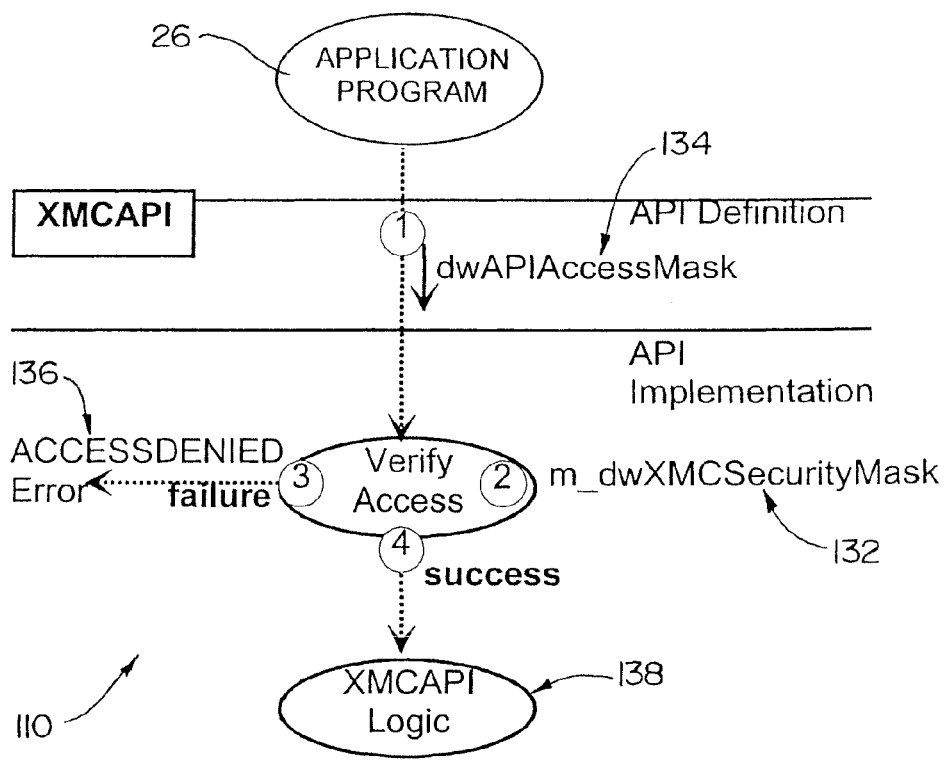
FIG. 4 Security Logic

FIG. 45

```
Dim xmcSys As XMCaSystemObj
Dim xmcVar As XMCaVariableObj
Dim xmcVarMap As XMCaVariableMappingObj
Dim xmcVarMapList As XMCaVariableMappingListObj
Dim val As Variant
Dim rgData(1 to 4) As Variant Set xmcVar = xmcSys.GetVariableObj()

'_____
' Read/Write item
'_____
val = xmcVar.Read( "Foo" )
xmcvar.Write "Foo", 1.0

'_____
' Read/Write array
'_____
xmcVar.Read "Boo", rgData()
xmcvar.Write "Boo", rgData()

'_____
' Variable Support
'_____
xmcVar.GetNameList rgNames()
xmcVar.GetAttributes "Boo", strAttrib '_____
' Variable mapping Support
'_____
Set xmcVarMap = xmcSys.GetVariableMappingObj()

xmcVarMap.AddMapping "Boo", "APC1:MULTI_SETUP:(0):(1){I4}"
xmcVarMap.RemoveMapping "Boo"
xmcVarMap.RemoveAllMappings Set xmcVarMapList = xmcVarMap.GetMappingList()

For Each varMapItem In xmcVarMapList
     If (Not varMapItem.ReadOnly) then
        varMapItem.Name = "Foo"
        varMapItem.Map  = _
":PI_FIXTURE_OFFSET_TABLE:(6)(7)(8..9)"_
".x_axis_value:(1)(1)(2)[{I4}]"
     End If
Next
```

SYSTEMS AND METHODS FOR COMMUNICATING WITH MOTION CONTROL SYSTEMS AND DEVICES

RELATED APPLICATIONS

This application U.S. patent application Ser. No. 15/187,324 filed Jun. 20, 2016 is a continuation of U.S. application Ser. No. 14/531,807 filed on Nov. 3, 2014, now abandoned.

U.S. application Ser. No. 14/531,807 is a continuation of U.S. patent application Ser. No. 13/911,031 filed on Jun. 5, 2013, now abandoned.

U.S. patent application Ser. No. 13/911,031 is a continuation of U.S. patent application Ser. No. 13/011,753 filed on Jan. 21, 2011, now abandoned.

U.S. patent application Ser. No. 13/011,753 is a continuation of Ser. No. 11/375,502 filed on Mar. 13, 2006, now abandoned.

U.S. patent application Ser. No. 11/375,502 is a continuation-in-part of U.S. patent application Ser. No. 11/063,696 filed on Feb. 22, 2005, now U.S. Pat. No. 7,035,697, which issued on Apr. 25, 2006.

U.S. patent application Ser. No. 11/063,696 is a continuation of U.S. patent application Ser. No. 10/447,185 filed on May 27, 2003, now U.S. Pat. No. 6,859,671, which issued on Feb. 22, 2005.

U.S. patent application Ser. No. 10/447,185 is a continuation of U.S. patent application Ser. No. 09/565,627 filed on May 4, 2000, now U.S. Pat. No. 6,571,141, which issued on May 27, 2003, which claims benefit of U.S. Provisional Application Ser. No. 60/132,693 filed on May 4, 1999, which is attached hereto as Exhibit 1.

U.S. patent application Ser. No. 11/375,502 is also a continuation-in-part of U.S. patent application Ser. No. 10/039,147 filed on Jan. 4, 2002, now abandoned, which claims benefit of U.S. Provisional Patent Application Ser. No. 60/260,061 filed on Jan. 4, 2001, which is attached hereto as Exhibit 3.

U.S. patent application Ser. No. 11/375,502 is also a continuation-in-part of U.S. application Ser. No. 10/353,604 filed on Jan. 28, 2003, now U.S. Pat. No. 7,024,666, which issued on Apr. 4, 2006, which claims benefit of U.S. Provisional Application Ser. No. 60/352,302 filed on Jan. 28, 2002, which is attached hereto as Exhibit 4, and U.S. Provisional Application Ser. No. 60/353,366 filed on Jan. 31, 2002, which is attached hereto as Exhibit 5.

U.S. patent application Ser. No. 11/375,502 is also a continuation-in-part of U.S. application Ser. No. 10/836,031 filed on Apr. 29, 2004, now U.S. Pat. No. 7,137,107, which issued on Nov. 14, 2006, which claims benefit of U.S. Provisional Patent Application Ser. No. 60/466,588 filed on Apr. 29, 2003, which is attached hereto as Exhibit 6, and U.S. Provisional Patent Application 60/467,667 filed on May 2, 2003, which is attached hereto as Exhibit 7.

The contents of all related applications listed above are incorporated herein by reference.

TECHNICAL FIELD

The present invention relates to motion control systems and, more particularly, to interface software that facilitates the creation of hardware independent motion control software that communicates with a motion control device.

BACKGROUND

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a mechanical system including at least one drive and electrical motor having a rotating shaft connected in some way to the object to be moved, and that application will be described in detail herein. But the principles of the present invention are generally applicable to any mechanical system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive such that the object is moved in the desired manner.

These basic components are normally placed into a larger system to accomplish a specific task. For example, one controller may operate in conjunction with several drives and motors in a multi-axis system for moving a tool along a predetermined path relative to a workpiece.

Additionally, the basic components described above are often used in conjunction with a host computer or programmable logic controller (PLC). The host computer or PLC allows the use of a high-level programming language to generate control commands that are passed to the controller. Software running on the host computer is thus designed to simplify the task of programming the controller.

Companies that manufacture motion control devices are, traditionally, hardware oriented companies that manufacture software dedicated to the hardware that they manufacture. These software products may be referred to as low level programs. Low level programs usually work directly with the motion control command language specific to a given motion control device. While such low level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

In this overall context, a number of different individuals are involved with creating and operating a motion control system dedicated to performing a particular task. Usually, these individuals have specialized backgrounds that enable them to perform a specific task in the overall process of creating a motion control system. The need thus exists for systems and methods that facilitate collaboration between individuals of disparate, complimentary backgrounds who are cooperating on the development and operation of motion control systems.

Motion control systems are often used in industrial settings to perform repetitive, well-defined tasks such as welding, parts assembly, and the like. Motion control systems have also been used in non-industrial settings in the form of toys, appliances, and the like for residential use.

The specific motion task to be performed by a given motion control system is defined by motion control data. Motion control data is a set of instructions conventionally written in a hardware dependent software language, but systems and methods now exist for creating hardware independent motion control data. In the following discussion, the term "application program" will be used to refer to a particular set of motion control data. The terms "application programmer" or "programmer" will be used to refer to the person who writes the application program.

Motion control systems typically employ a motion control device that converts the motion control data into physical movement. Often, the motion control device is connected to a general purpose computer that stores application programs and transfers these programs to the motion control device. In the following discussion, the person responsible for a given motion control device will be referred to as the system operator.

In both industrial and non-industrial settings, application programs are often written by the application programmer at a source location and then run on a motion control system at a remote location. In some situations, the application program is transferred from the source to the destination over a communications network such as the Internet.

From the perspective of the application programmer, the details of the motion control system can be either known or unknown. In addition, the application programmer may or may not know the details of the communications network over which the motion control data is transferred.

One scenario of particular relevance to the present invention is the situation in which an application programmer writes an application program for a given motion task where the programmer does not know or does not want to be limited to the details of a particular motion control system. In particular, the details of the software platform and motion control device(s) may be unknown to the programmer, or the system operator may wish to have the flexibility to change one or both of the software platform and motion control device in the future.

The need thus additionally exists for systems and methods that facilitate the transmission of motion control data from a source to a motion control system over a communications network. The present invention is of particular significance when the details of the motion control system are unknown to the application programmer.

The present invention is also of particular importance in the context of a motion control system in which multiple programming languages and language variants are used. As discussed above, companies that manufacture motion control devices are, traditionally, hardware oriented companies that manufacture low-level software products dedicated to the hardware that they manufacture. As generally described above, low-level programs usually work directly with the motion control command language specific to a given motion control device. While such low-level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

The present invention also optionally has more specific application to an environment in which a general motion device is used to implement an application program written for a CNC device. The principles of the present invention are, however, generally applicable to any target motion control device that generates movement based on an application program.

A typical motion control system created for a particular task may use one or more application programs written in any number of different programming languages. The need thus exists for systems and methods that facilitate the generation of motion control commands in a multi-language environment. In addition, because of the relatively low cost of controllers for general motion devices, the need exists for systems and methods that convert programs written for CNC devices into control commands for general motion devices.

As described above, motion control application is software that defines a sequence of motion steps required to perform a motion task. A motion controller is hardware and software that, in combination with a motion control device, is capable of converting motion commands into physical movement of an object. The term motion controller will be used herein to include the motion control device.

Typically, the motion commands executed by a motion controller are proprietary. The combination of a motion control software application and one or more motion controllers will be referred to herein as a motion control system.

In many cases, motion control software applications are specifically written for one or more proprietary motion controller. Therefore, if one or more new motion controllers are to be used in place of one or more original motion controllers, a motion control software application written for the original motion controller(s) must be rewritten to accommodate the new motion controller(s). A motion control software application written for one or more proprietary controllers is referred to as hardware dependent.

In general, hardware dependence is undesirable because the owner of the motion control system must either commit to the vendors of the proprietary controllers or discard the motion control application when a new motion controller is used.

The need thus further exists for systems and methods that may be used to facilitate the writing of motion control applications that are hardware independent.

RELATED ART

A number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; (f) WEB 3.0 Product Brochure, Trihedral Engineering Ltd. (1994); and (g) AIMAX-WIN Product Brochure, TA Engineering Co., Inc. The following documents disclose simulation software: (a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993-94 catalog, pages 10-11; (b) Aerotech Motion Control Product Guide, pages 233-34; (c) PMAC Product Catalog, page 43; (d) PC/DSP-Series Motion Controller C Programming Guide, pages 1-3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348-351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolates the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

The Applicants are additionally aware of application programming interface security schemes that are used in general programming to limit access by high-level programmers to certain programming variables. For example, Microsoft Corporation's Win32 programming environment implements such a security scheme. To the Applicants' knowledge, however, no such security scheme has ever been employed in programming systems designed to generate software for use in motion control systems.

SUMMARY

The present invention may be embodied as a motion control system for allowing at least one motion control system designer to cause at least one motion device to perform a motion task. The motion control system comprises at least one motion control application, a motion control component, and a security system. The at least one motion control application is generated by the at least one motion control system designer and comprises at least one API function call associated with the motion task. The motion control component defines an application programming interface comprising at least one API function. The security system comprises security settings for determining access by the at least one motion control application to at least one API function of the application programming interface defined by the motion control system. The at least one motion control application makes at least one API function call to the motion control component. The motion control component generates at least one motion control command based on the at least one API function call made by the at least one motion control application. The security system limits generation by the motion control component of at least one motion control command based on the security settings. The at least one motion device performs the motion task based on at least one motion control command generated by the motion control component and limited by the security system.

The present invention may also be embodied as a method of allowing at least one motion control system designer to create at least one motion control application for causing at least one motion device to perform a motion task comprising the following steps. An application programming interface comprising at least one API function is defined. Security settings are defined, where the security settings determine access by the at least one motion control application to at least one API function of the application programming interface defined by the motion control system. The at least one motion control application is caused to make at least one API function call. At least one motion control command is generated based on the at least one API function call made by the at least one motion control application. Generation of at least one motion control command is limited based on the security settings. The at least one motion device is caused to perform the motion task based on at least one motion control command.

BRIEF DESCRIPTION OF THE DRAWINGS

FIGS. 1A-F are system interaction maps of an exemplary motion control system in connection with which a security system of the present invention may be used;

FIG. 2 is a block diagram depicting how a security system of the present invention could be integrated with the motion control system of FIG. 1;

FIGS. 3a and 3b are module interaction maps depicting how the modules of the motion control system interact when modified to include the security system of FIG. 2; and FIG. 4 is a logic flow diagram illustrated exemplary logic employed by the security system of the present invention;

FIG. 43 is a representation of an object model used by

FIG. 45 depicts code illustrating the use of the variable support objects in the context of Microsoft Visual Basic;

DETAILED DESCRIPTION

The present invention is a security system for use with systems and methods for generating application programs for controlling motion control systems such as are described in U.S. Pat. No. 5,867,385, issued Feb. 2, 1999, to Brown et al, which is incorporated herein by reference. The present invention is intended to be used with systems and methods for generating software for controlling motion control systems, including such systems and methods other than what is described in the '385 patent; the security system of the present invention may, however, be used with other systems and methods for generating software or operating motion control systems. The following description of the systems and methods described in the '385 patent is thus included for illustrative purposes only and is not intended to limit the scope of the present invention.

Figure 1B:
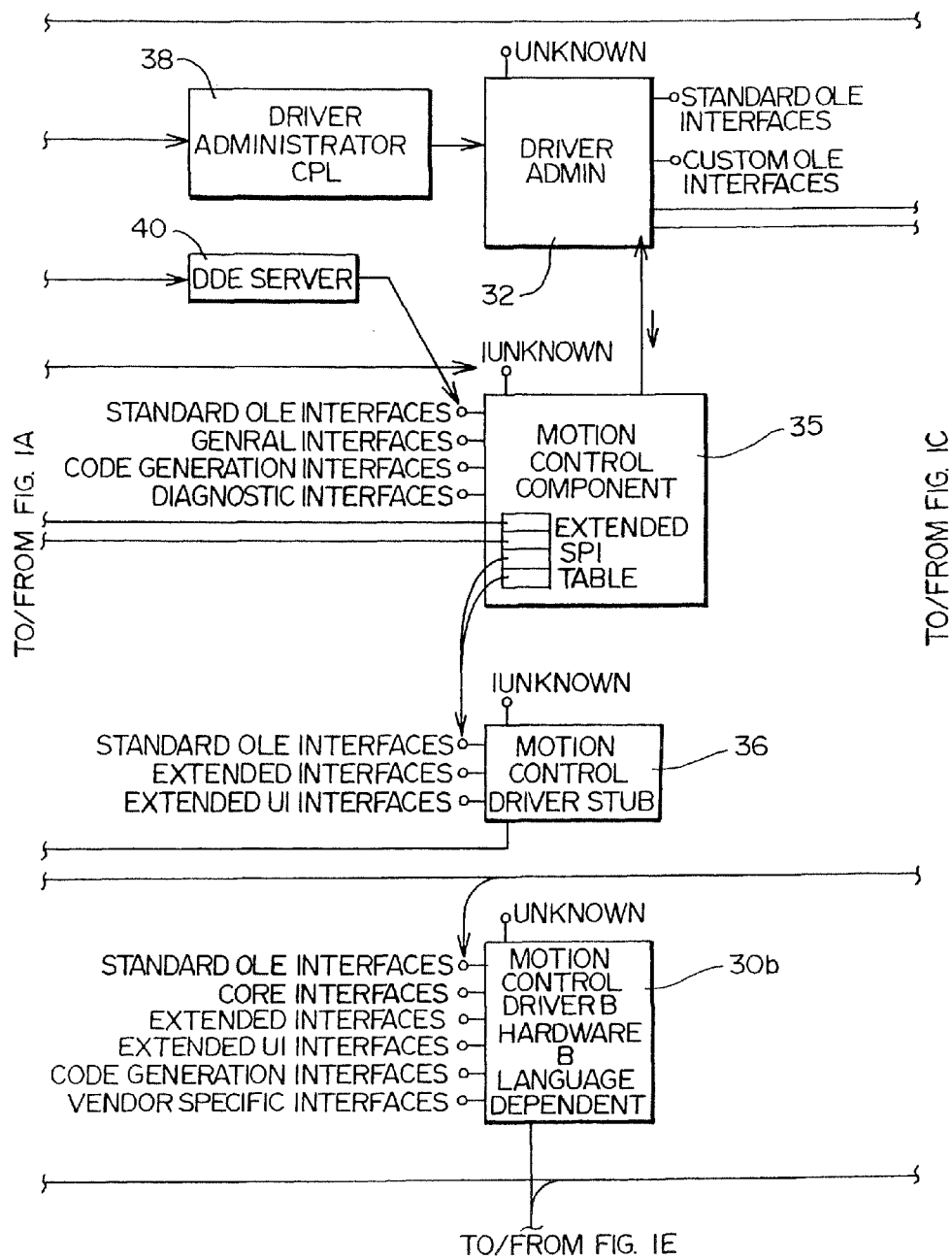

Referring now to the drawing, depicted therein at 10 in FIG. 1 is an exemplary motion control system as described in the '385 patent. The motion control system 10 comprises a personal computer portion 12 having a hardware bus 14, a plurality of motion control hardware controllers 16a, 16b, and 16c, and mechanical systems 18a, 18b, and 18c that interact with one or more objects (not shown) to be moved. The personal computer portion 12, hardware bus 14, hardware controllers 16, and mechanical systems 18 are all well-known in the art and will not be discussed herein beyond the extent necessary to provide a complete understanding of the present invention. The motion control hardware controllers 16 and their associated mechanical systems 18 form motion control devices 20 for moving objects.

The personal computer portion 12 contains a software system 22 that allows an application user 24 to create software applications 26 that control the motion control devices 20. More particularly, based on data input by the user 24 and the contents of the application program 26, the software system 22 generates control commands that are transmitted by one or more streams such as those indicated at 28a, 28b, 28c, and 28d. The streams 28 transmit control commands incorporating the hardware specific command language necessary to control a given motion control device 20 to perform in a desired manner. The streams 28 implement the communication protocol that allows the control commands to reach the appropriate motion control device 28 via an appropriate channel (i.e., PC bus, serial port).

As generally discussed above, the generation of software for controlling motion control devices normally (but not necessarily) involves the labors of at least two and perhaps three separate designers: a software system designer; a hardware designer familiar with the intricacies of the motion control device; and a motion control system designer.

The software system designer develops the software system 22 and will have generalized knowledge of motion control systems and devices but will not have detailed knowledge of specific motion control systems or devices. The application user 24 discussed above will normally be the motion control system designer.

The motion control system designer will understand and define the overall motion control system 10, but may not know the details of the individual motion control devices 20 employed by the system 10 or the software system 22 employed to generate the application program 26.

The hardware designer normally possesses very detailed knowledge of specific motion control hardware devices 20, but will normally not have knowledge of the system 10 in which the devices 20 are incorporated.

The present invention primarily relates to systems and methods for coordinating the knowledge of the motion control system designer and the hardware designer. In particular, the present invention is a system or method for allowing the hardware designer to customize or alter the software system 22 such that the motion control system designer can write application programs 26 that control the motion control hardware devices 20 such that these devices are operated within acceptable operating parameters.

As discussed in detail in the '385 patent, the software system designer initially defines a set of motion control operations that are used to perform motion control. The motion control operations are not specifically related to any particular motion control device hardware configuration, but are instead abstract operations that all motion control device hardware configurations must perform in order to function.

Motion control operations may either be primitive operations or non-primitive operations. Primitive operations are operations that are necessary for motion control and cannot be simulated using a combination of other motion control operations. Examples of primitive operations include GET POSITION and MOVE RELATIVE, which are necessary for motion control and cannot be emulated using other motion control operations. Non-primitive operations are motion control operations that do not meet the definition of a primitive operation. Examples of non-primitive operations include CONTOUR MOVE, which may be emulated using a combination of primitive motion control operations.

Given the set of motion control operations as defined above, the software system designer next defines a service provider interface (SPI) comprising a number of driver functions. Driver functions may be either core driver functions or extended driver functions. Core driver functions are associated with primitive operations, while extended driver functions are associated with non-primitive operations. As with motion control operations, driver functions are not related to a specific hardware configuration; basically, the driver functions define parameters necessary to implement motion control operations in a generic sense, but do not attach specific values or the like to these parameters.

The software system designer next defines an application programming interface (API) comprising a set of component functions. For these component functions, the software system designer writes component code that associates at least some of the component functions with at least some of the driver functions. The relationship between component functions and driver functions need not be one to one: for example, certain component functions are provided for administrative purposes and do not have a corresponding driver function. However, most component functions will have an associated driver function.

The overall software model implemented by the software program 22 thus contains an API comprising component functions and an SPI comprising driver functions, with the API being related to the SPI by component code associated with the component functions.

The motion control system designer (normally also the user 24) develops the application program 26. The application program 26 comprises a sequence of component functions arranged to define the motion control operations necessary to control a motion control device to move an object in a desired manner. The application program 26 is any application that uses the system 22 by programming the motion control component 35. As mentioned above, the component code associates many of the component functions with the driver functions, and the driver functions define the parameters necessary to carry out the motion control operations. Thus, with appropriately ordered component functions, the application program 26 contains the logic necessary to move the object in the desired manner.

The software system 22 thus generates control commands based on the component functions contained in the application program 26, the component code associated with the component functions, and the driver code associated with the selected software driver 28.

As the control commands are being generated as described above, they may be directly transmitted to a motion control device to control this device in real time or stored in an output file for later use. The software system 22 employs the streams 28 to handle the transmission of the control commands to a desired destination thereof. In the exemplary system 22, the destinations of the control commands may be one or more of an output file 34 and/or the controllers 16.

Referring again to FIG. 1, this Figure shows that the system 22 further comprises a motion control component 35 and a driver stub module 36. The motion control component module 35 is the portion of the software system 22 that relates the component functions to the driver functions. The motion control component module 35 thus contains the component code that makes the association between the component functions contained in the application program 26 and the driver functions.

Referring again for a moment to FIG. 1, this Figure illustrates that the system 22 additionally comprises a driver administrator CPL applet 38 and a DDE server 40. The driver administration CPL applet 38 generates the user interface through which the user 24 communicates with the driver administrator module 32. The DDE server 40 provides the software interface through which the application program 26 communicates with the motion control component module 35.

With the foregoing general understanding of an exemplary motion control system in mind, the block diagram of FIG. 2 will now be discussed. Depicted in FIG. 2 is a security system 110 constructed in accordance with, and embodying, the principles of the present invention. The exemplary security system 110 is implemented as part of the motion control component 35 of the motion control system 10 described above; the security system 110 may, however, be implemented in other systems.

The security system 110 places limits on what the motion control system designer can do when developing the application program 26. As schematically shown at 112 in FIG. 2, the motion control component 35 may be programmed, either visually or programmatically, with limitations related to an external system to be controlled such as a motion control device or devices. In practice, a hardware designer will likely determine what limitations are appropriate, and a program administrator in charge of a specific implementation of the software system 22 will program the motion control component 35 with the limitations determined by the hardware designer. The hardware designer and program administrator may be the same person, and the term "program administrator" will be used herein to refer to the person who configures the motion control component 35 with security settings as discussed above.

A primary purpose of the present invention is thus to allow the program administrator to control the operation of the software system 22 such that access to one or more API functions is restricted based on such factors as the identity of a particular user or account and the status of the motion control system 10. For example, a junior user may be given access to certain API functions but not others. Alternatively, the entire software system may be disabled based on the status of the motion control devices 20. The restrictions implemented by the security system 110 may be based on other factors as the program administrator deems necessary.

After the motion control component 35 has been configured by the program administrator, the motion control system designer interacts, as shown schematically at 114 in FIG. 2, with the component 35 to develop the application program 26. The limitations programmed into the component 35 by the configuration process 112 restrict the system designer's development of the application program 26.

More specifically, as shown in FIG. 3 the exemplary security system 110 is a software program that comprises at least one of an API access block 116 and an API parameter limit block 118.

The API access block 116 limits the motion control system designer's ability to call predetermined functions of the API defined by the software system 22. The predetermined functions access to which is controlled by the security system 110 will be referred to as controlled functions. When the controlled functions are called while programming an application program 26, the software system 22 will indicate that access to these programs is restricted by, for example, generating an error code (e.g., ACCESSDENIED).

The API parameter block 118 limits the motion control system designer's ability to set predetermined parameters used by API functions outside certain limits or beyond certain thresholds. The predetermined parameters limited by the security system 110 will be referred to as controlled or restricted parameters; a function having controlled or restricted parameters will be referred to herein as a parameter-control function. The parameter limitations associated with the controlled parameters can be enforced by, for example, returning an error code as described above or simply by clipping the controlled parameter to the closest allowed value for that parameter whenever an attempt to use an inappropriate parameter value is made.

Any controlled function or parameter-control function will be referred to herein as a restricted function. The term "restricted" as used herein thus includes both prohibiting use of a function as in the case of the exemplary controlled function described above and allowing use of a function in a limited manner as in the case of one of the examples of the exemplary parameter-control function described above.

Either or both of the API access block 116 and API parameter limits block 118 may be used in a given security system constructed in accordance with the principles of the present invention, but the benefits obtained by the present invention will be optimized in a security system, such as the system 110, incorporating both of these blocks 116 and 118.

Using the API access block 116 and the API parameter limit block 118, the security system 110 is segmented into several security zones. These security zones define the security areas configurable by the program administrator, and the sum of all of the security zones defines the security range of functions and/or parameters controlled by the security system 110. These security zones may overlap. For example, access to a given function may be limited by a security zone implemented by the API access block 116, and parameters employed by that given function may also be limited by a security zone implemented in the API parameter limit block 118.

The first security zone of the exemplary security system 110 is the min/max security zone. The min/max security zone, which is implemented as part of the API parameter limit block 118, allows the program administrator to set minimum and maximum acceleration, deceleration, and velocity parameter value limits for given functions defined by the API. If set properly, these limits will prevent the motion control system designer from writing application programs that could potentially damage the motion control device or devices that form part of the motion control system 10.

The second exemplary security zone is the Hardware Limit Enable security zone. This security zone is implemented as part of the API access block 116 and allows (or disallows) the programmer to enable or disable the hardware limits. When disabled, hardware limits designed to prevent damage to the motion control device are removed.

The third exemplary security zone is the Software Limit Enable security zone. This security zone is implemented as part of the API access block 116 and allows (or disallows) programmers to enable or disable the software limits. When enabled, all application programs are bound by the initial limit positions of the current device driver. The initial limits of the current device driver may be changed programmatically or visually through an Advanced Properties screen allowing access to the current device driver data. Generally speaking, but not necessarily, the performance envelope defined by the software limits of the Software Limit Enable security zone will be within the performance envelope defined by the hardware limits of the Hardware Limit Enable security zone.

The fourth exemplary security zone is the Single Control security zone. This security zone is implemented as part of the API access block 116. The system 10 can run more than one application program 26 at a given time. When enabled, the Single Control security zone allows only the first application program 26 that connects to the motion control component 35 to control the motion control device(s) 20. The types of functions that may be called by any subsequent application program 26 that connects to the motion control component 35 will be restricted as defined in the Single Control security zone. For example, the first application program 26 that connects to the motion control component 35 will be allowed to control movement a given motion control device (e.g., MOVE command), while the second application program that connects to the motion control component 35 will be restricted to functions that monitor the status of the given motion control device (e.g., GETPOSITION command).

The fifth exemplary security zone is the Hardware Initialize security zone. This security zone is also implemented as part of the API access block 116. The Hardware Initialize security zone requires any application program that connects to the motion control component 35 to call an initializing function such as INITIALIZEHARDWARE. Any application program that does not call the initializing function will be prevented from accessing any functions defined by the API.

As mentioned above, these security zones may overlap with each other. In addition, not all of these security zones need be employed in a given implementation of the security system 110. The program administrator may determine that some or all of the restrictions represented by the security zones described above are unnecessary and/or determine that other restrictions are in order.

In the exemplary system 110, access to all functions called by an application program is limited by the Hardware Initialize security zone. If more than one application program is connected to the motion control component 35, access to certain functions will likely further be limited by the Single Control security zone. If a given application meets the requirements of the Hardware Initialize and Single Control security zones, the Hardware Limit and Software Limit security zones will limit access by the application program to controlled functions. And if the given application program attempts to change a controlled parameter of a given function, that application must further meet any requirements of the Min/Max security zone.

Referring now to FIG. 3, shown therein is a module interaction map illustrating the interaction of the various modules of the exemplary system 10 that are used to implement the security system 110.

Initially, it should be noted that the exemplary security system 110 is implemented using a security portion 120 of an operating system 122 on which the software program 22 is designed to run. Most modern operating systems are designed with internal security for limiting user access to certain functions. The exemplary security system 110 is designed to make use of the security portion 120, but a separate piece of software external to the operating system 122 may be written specifically to limit user access in an equivalent manner.

As is conventional, the operating system 122 contains a registry database 124 that is accessible to the components that implement the security system 110.

The first step of using the security system 110 is for the user to logon to the system by communicating with the driver administrator CPL applet to input a username and a password. The user may be an individual or may be an account recognized by the security system 110, which may be used by a number of individuals. The term "user" as employed herein thus is interchangeable with the term "account" as conventionally used in computer software.

The security system 110 compares the username and password with an internal database, set or list to determine the user's level of access. If the user is not a program administrator, the user has access to the motion control component 35 but is subject to all access and parameter limitations. This situation will be described below with reference to steps five through six of the process depicted in FIG. 1.

If the user is a program administrator, the user can alter the security system 110 and/or override any access or parameter limitations as shown by the second step in FIG. 3. More specifically, the Driver Administrator CPL applet 38 displays a Settings panel 126 and/or an Advanced Properties panel 128 that allows the user visually to alter the settings of security system 110 through the Driver Administrator CPL applet 38. The user so logged on may change these settings programmatically as well.

As shown in the third step in FIG. 3, upon closing the Driver Administrator CPL applet 38, all security settings are passed to the Driver Administrator Component 32. The Driver Administrator Component 32 stores the security settings in a persistent file 130, as shown in the fourth step shown in FIG. 3.

Subsequently, the security settings stored in the file 130 are used by the motion control component 35. In particular, as shown in the fifth step, when the component 35 is created, it queries the Driver Administrator Component 32 for the security settings. The motion control component 35 later uses the settings to limit API access and/or to limit access to or clip parameters that are out of the pre-designated ranges defined by the security settings.

In the sixth step of the process depicted in FIG. 3, the motion control component 35 organizes the security settings into an API security mask 132 that implements the security zones discussed above.

Once the API security mask 132 is established, the software system 22 prevents non-authorized users from changing the security settings using the Settings panel 126 and/or the Advanced Properties panel 128. The system 22 will also limit such a non-authorized user's ability to use the motion control component 35 according to the limitations embodied in the API security mask 132.

An API function call can be secured in a number of ways. First, upon receiving a function call, the internal API code can be configured to use the operating system's underlying security settings to verify whether or not the call should be allowed.

Another method of implementing secure API function calls is depicted in FIG. 4. The method depicted in FIG. 4 verifies secure access to the API call by comparing the access required by the API function call with the current security settings allowed. In particular, in the first step of FIG. 4, the application program 26 connected to the motion control component 35 calls one of the API functions, which within its definition contains the access rights necessary to run the logic making up the function.

In the second step of FIG. 4, the security system 110 compares a function mask 134 defining the access rights required by the API to the security mask 132 defining the system access rights previously set either programmatically or via a visual user-interface. The two masks are logically ANDed together. If the result of the mask AND operation does not exactly equal the access rights required by the API (step 3 in FIG. 4), the function call fails and the security system 110 generates an appropriate error 136 such as ACCESSDENIED. If, on the other hand, the result of the mask AND operation does equal the access rights required by the API, the function continues running the body of logic 138 that defines the called function (step 4 in FIG. 4).

An alternative to the mask AND operation would be to use a username/password check on each API call to verify that the user has proper access. In this case, each API function is associated with a security level. Each user and/or account would also be associated with a security level, and the system 110 simply checks the security level of each called function against the security level of the user or account to determine whether to allow access to the function.

From the foregoing, it should be clear that the present invention may be embodied in forms other than those described above. In particular, while the exemplary security system 110 is optimized for use with the exemplary motion control system 10 described herein, one of ordinary skill in the art will understand that the principles of the present invention may be applied more generally to other systems for generating command code and more specifically to other systems for generating control commands for controlling motion control devices.

With reference now to FIGS. 5-27 of the drawing, the present invention may be embodied as a motion control server system comprising a number of modules. In the following discussion, the overall environment in which the present invention is typically used will first be described. Following that will be a detailed discussion of the interaction of the various modules that form one example embodiment of the present invention. The example embodiment operates in a number of scenarios, and a number of these scenarios will then be described. Finally, certain components of the example motion control server system, and typical use scenarios for these components, will be described in further detail.

Overview of Motion Control Server System

Figure 5:
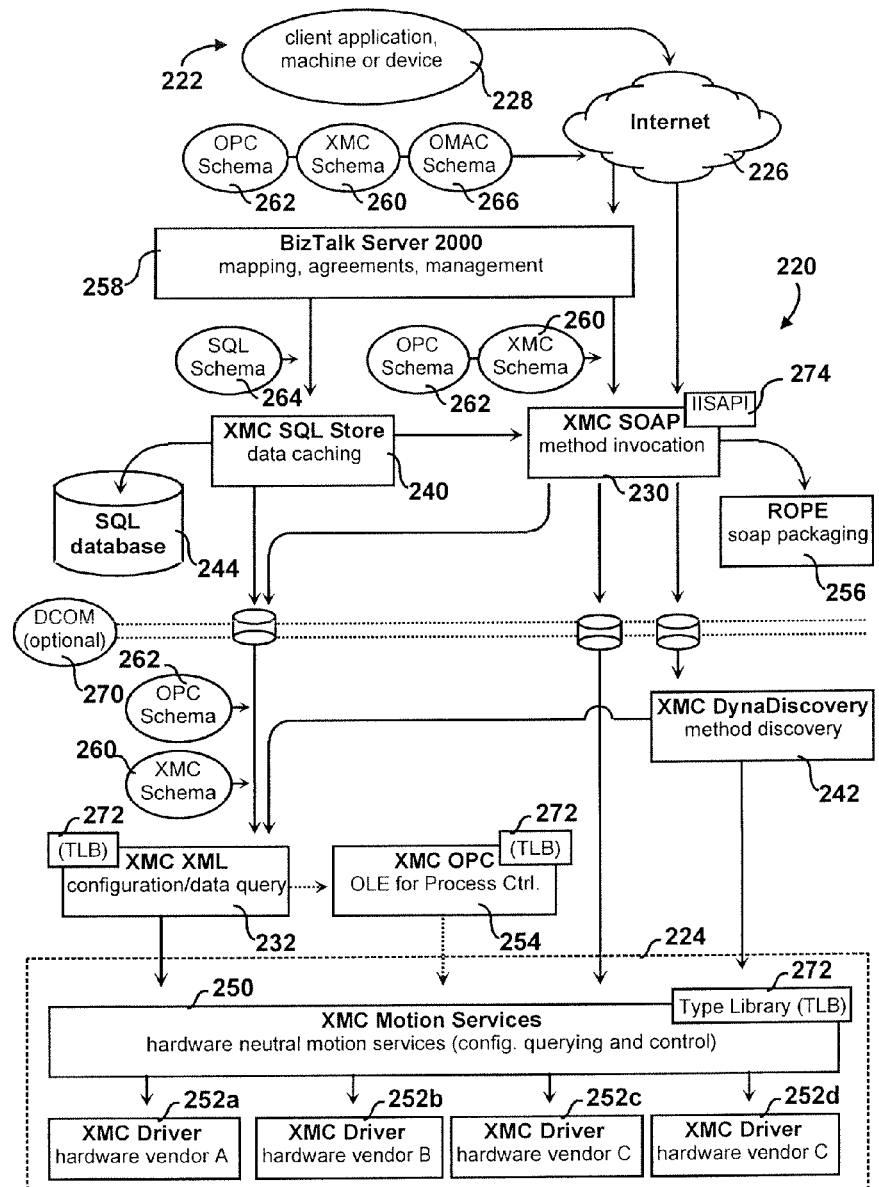
FIG. 5 is a module interaction map depicting the interaction of the primary modules of one example server system of the present invention.
Figure 5A:
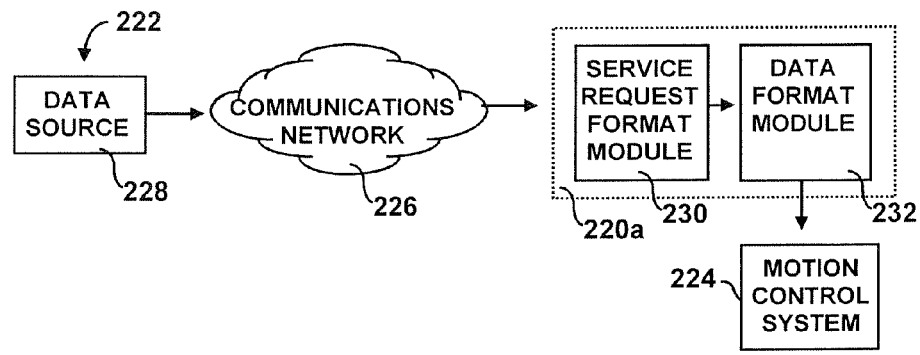
FIGS. 5A-C are block diagrams illustrating the basic environment in which one example of a motion control server system of the present invention may be used.

Referring now to FIG. 5A of the drawing, depicted at 220a therein is a motion control server system constructed in accordance with, and embodying, the principles of the present invention. The example motion control server system 220a is configured to transmit motion control data between a data source 222 and a motion control system 224 through a communications system 226. The data source 222 comprises or is formed at least in part by (see, for example FIG. 6) an application program 228 comprising methods, function calls, and/or data.

The example motion control server system 220a comprises a service request format module 230 and a data format module 232. The service request format module 230 converts service requests (methods and/or function calls) of the application program 228 between a network service request format and a native service request format defined by the motion control system 224. The data format module 232 converts data sets transferred between the source 222 and the motion control system 224 between a network data format and a native data format defined by the motion control system 224.

Figure 5B:
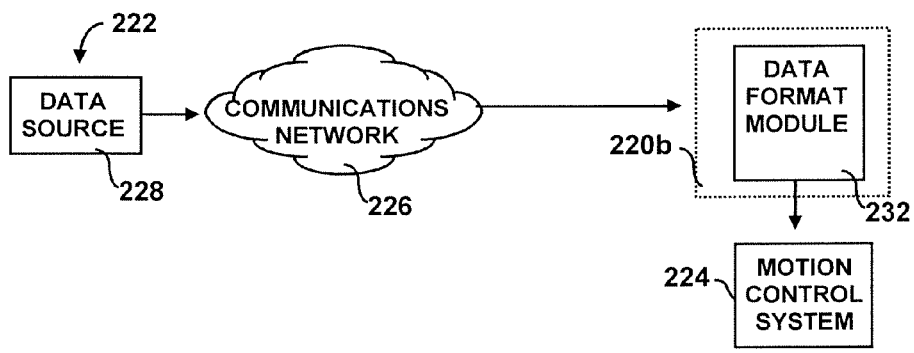
Figure 5C:
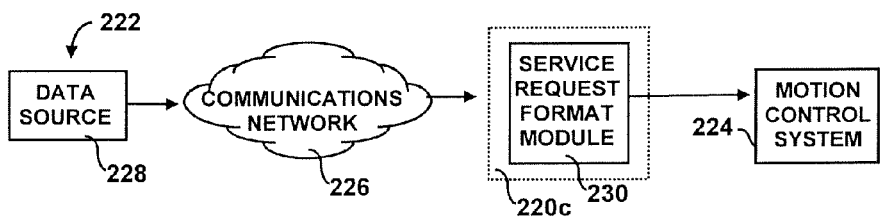

FIGS. 5B and 5C indicate that some benefits of the present invention may be obtained by using either one of the service request format module 230 and the data format module 232. Depicted in FIG. 5B is an alternative example motion control server system 220b that employs only the data format module 232, while FIG. 5C depicts yet another example motion control server system 220c employing only the service request format module 230.

Example Motion Control Server System

Referring now to FIG. 5, depicted at 220 therein is one preferred embodiment of a motion control server system of the present invention. The motion control server system 220 will be described herein in the context of a particular data source 222, motion control system 224, and communications system 226. However, the present invention may be embodied in forms appropriate for other data sources, motion control systems, and communications systems. In addition, the preferred motion control server system 220 comprises a number of optional modules that are not necessary to carry out the principles of the present invention in a basic form.

Two sets of terminology will be used with reference to the motion control server system 220. The first set is generic and is applicable to any environment in which a motion control server system of the present invention may be used. The second is specific to the example motion control server system 220 and the data source 222, motion control system 224, and communications system 226 in connection with which the server system 220 is used. In the following discussion, the major elements will be initially identified using the generic terminology, with the specific terminology being identified in parenthesis. After this initial introduction, both sets of terminology will be used interchangeably.

The example motion control server system (XMC Internet Connect system) 220 comprises both the service request format module (XMC SOAP Engine) 230 and data format module (XMC XML Engine) 232. In addition, the example server system 220 comprises two optional modules: a data caching module (XMC SQL Store) 240 and a method discovery module (XMC DynaDiscovery) 242. These components allow virtually any client application 228 to utilize the underlying motion control system 224 regardless of the client application's location, underlying hardware platform, or underlying software operating system.

These modules 230, 232, 240, and 242 are optimized to connect the data source (client machine or device) 222 to a motion services module (XMC Motion Services) 250 forming a part of the motion control system 224 over the communications system (Internet) 226. The XMC Motion Services module 250 is a hardware independent connection to the underlying motion control hardware system (not shown). The example XMC Motion Services module 250 is described in detail in one or more of the following U.S. Pat. Nos. 5,691,897, 5,867,385, and 6,209,037 B1 and will not be described herein in further detail.

The example XMC SOAP Engine module 230 is based on an industry standard technology referred to as SOAP (Simple Object Access Protocol). SOAP is an internet enabled communication protocol used to communicate in a platform and operating system independent manner with systems across the Internet. SOAP thus allows software applications to talk to one another in a manner that is independent of the communication connection or platform on which each application may be running. SOAP frees each application to run on the platform best suited for the application yet communicate with other systems as needed in a manner that connects all applications seamlessly. SOAP itself is based on two other industry standard technologies: HTML and XML. HTML defines an industry standard communication protocol for transferring data and instructions between applications connected to a network, while XML defines the structure of the data packets sent between such applications. SOAP, HTML, and XML are well-known and will not be described herein in further detail.

The XMC XML Engine module 232 is used to translate network (XML) data sets into native (motion control) operations that are defined by and run on the XMC Motion Service 250 (also referred to as the native system). In addition, the XMC XML Engine 232 is used to query data from the native system 250 and build XML data sets that are returned to the calling client application 228.

The XMC SQL Store module 240 is used to cache data queried from the XMC XML Engine 232 (or directly from the native XMC Motion Services module 250). The example XMC SQL Store module 40 caches data in database module 244 (SQL database or other database such as Microsoft Access or Oracle, etc).

The XMC DynaDiscovery module 242 is used to 'discover' the services supported by both the XMC XML Engine 232 and native XMC Motion Service module 250. The example method discovery module 242 is based on the industry standard DISCO (Discovery of Web Services) protocol.

As noted in FIG. 5, there are also several other modules that optionally may be used with or incorporated into the XMC Internet Connection server system 220. In particular, the server system 220 uses the motion services (XMC Motion Services) module 250, motion drivers (XMC Driver) 252, a process control (XMC OPC) module 254, a packet processing (ROPE) module 256, and a data management (Biztalk Server system 2000) module 258.

The XMC Motion Services module 250 controls the motion control device to perform operations such as querying data, setting data, and performing actions to occur (like live physical moves). As generally discussed above, the XMC Motion Services module 250 is a hardware independent technology that supports many different hardware based and software based motion controllers. The present invention may, however, be embodied without the motion services module 250 or its equivalent in a hardware dependent manner.

The motion services module 250 defines a group of supported motion control devices. One XMC Driver 252 is specifically written for each of the supported motion devices based on interfaces defined by the motion services module 250. The motion drivers 252 are known and will also not be described herein in detail.

The example process control module 254 is a standard OPC (OLE for Process Control) server used to query and set data sets using the OPC protocols as defined by the OLE for Process Control Foundation.

The example packet processing module 256 is a DLL module released by Microsoft and referred to as ROPE (Remote Object Proxy Engine). The ROPE module is specifically designed to build and parse SOAP data packets.

The example data management module 258 is or may be the Microsoft BizTalk 2000 server. The Biztalk 2000 server is used to map data between XML Schemas, set up data agreements between companies, and manage data connections between organizations.

FIG. 5 further illustrates that the example server system 220 employs a number of 'schemas' that are passed between modules. A 'schema' is a data format specification for XML data. Each schema determines how data following the protocol of the schema is organized. The example server system 220 makes use of the following schemas: motion control (XMC) schemas 260, process control (OPC) schemas 262, database management (SQL) schemas 264, and third party schemas 266 such as the OMAC schema.

The XMC schemas are defined to support configuration data, system state data, motion meta program data, and actions defined by the XMC Motion Services module 250. The OPC Schema is an XML schema designed to support OPC servers. The SQL Schema is an XML schema designed to describe SQL data sets queried from a SQL database. The OMAC Schema is designed to support data sets developed by the OMAC group.

One of the functions of the Microsoft BizTalk Server system 2000 module 258 is to map between schemas. Many groups and organizations will develop various data schemas that meet their particular needs. The Microsoft BizTalk Server system 2000 module 258 is capable of mapping between the schemas developed by different groups and organizations.

Operational Scenarios

Service Discovery

Before a web service can be used, the services that service offers are determined or "discovered". Before discovering what a single web service can do, the web server is queried to determine what the web services that it offers. In the example server system 220, the optional method discovery module 242 is used to discover the services available from the motion services module 250 using one or more of a plurality of protocols such as the Dynamic Web Discovery (DISCO) protocol, SNMP, LDAP, and the like. The example XMC DynaDiscovery module 242 uses the DISCO protocol because the DISCO protocol is based on XML, which allows a very thin client to use the discovery service.

Figure 6:
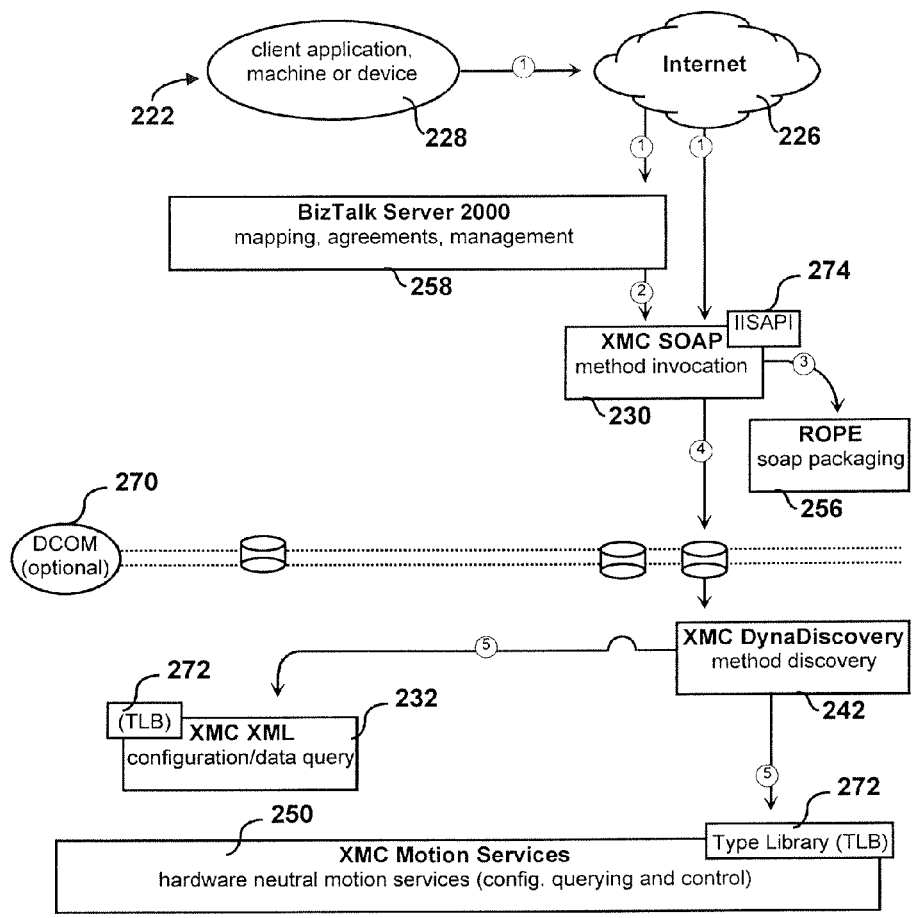
FIG. 6 is a scenario map illustrating the service discovery process implemented by the server system of FIG. 5.

FIG. 6 of the drawing illustrates the steps that occur when the example server system 220 uses the method discovery module 242 to discover the services available from the motion services module 250. First, the client application (or machine or device) 228, queries the motion control server system 220 for the services provided. This request may go through the BizTalk Server 258 or directly to the SOAP enabled server module 230.

If the request goes to the BizTalk Server 258, the BizTalk Server 258 maps the request to the appropriate format supported by the SOAP enabled server 230 and passes the request on to the SOAP server 230. The BizTalk server 258 may also just pass the request straight through to the SOAP server if no mapping is needed.

Next, upon receiving the request, the XMC SOAP server 230 uses the ROPE module 256 to parse out the request. The XMC SOAP server module 230 could also use its own native parsing, but the use of the ROPE module 256 is preferred.

The XMC SOAP Server 230 next uses the XMC DynaDiscovery module 242 to determine what services are available on the local motion services module 250. Communication between the module 242 and the module 250 may be direct or may utilize an industry standard interface protocol such as a DCOM enabled connection; the interface protocol is schematically indicated by reference character 270 in FIG. 6.

Upon receiving the request, the XMC DynaDiscovery module 242 queries all modules that it 'knows about'. Such modules typically include or define type libraries (TLB) 272 that define the offered services. The example module 242 thus examines the Type Libraries 272 to 'discover' the services that they offer. Upon discovering the available services, the DynaDiscovery module 242 dynamically builds an SDL (Services Description Language) data set and returns it to the requesting SOAP server 230. When dynamic discovery is not used, the SDL file is a static file that resides on the SOAP enabled server.

After determining what services are available from the motion services module 250, the client application program 228 may perform any of the operations offered by the module 250. When working with motion systems, these operations usually fall into one of three categories: configuration, monitoring/diagnostic, and actions. Each of these actions will be discussed in more detail below.

Machine Configuration

Configuration operations are used to configure the underlying motion system. For example, servo gains, velocities and accelerations may be set when performing configuration situations.

Configuration settings are usually separated into two categories: Initialization and Live Settings. Initialization configuration properties are usually set once when the machine first initialized. Live settings are changed dynamically to affect how the machine operates. The scenario discussed applies to changing both types of configuration settings.

Figure 7:
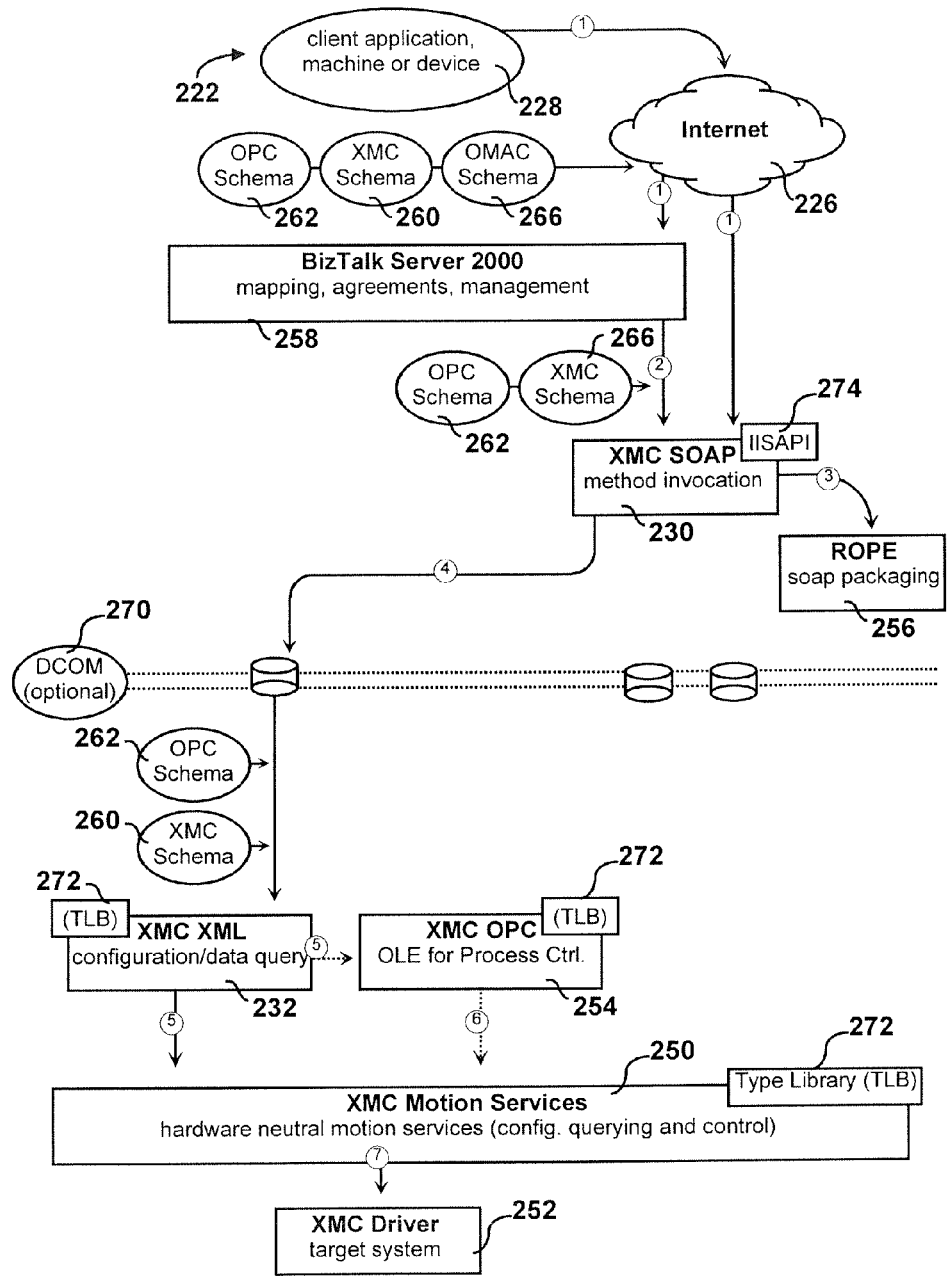
FIG. 7 is a scenario map illustrating the machine configuration process implemented by the server system of FIG. 5.

Referring now to FIG. 7, depicted therein is a scenario map depicting the process of making configuration settings.

First, the client application 228 sends the configuration change request (along with all data needed to make the change) to the server system 220. This request may be sent to a BizTalk Server 258 or directly to the XMC SOAP Server 230, depending on the Schema used.

If the configuration change request is sent to the BizTalk Server 258, the BizTalk server 258 maps the data received from original schema to one of the schemas supported on the SOAP enabled server system 220; the Biztalk server 258 then sends the request on to the XMC SOAP Engine server 230. Upon receiving the SOAP request, the XMC SOAP Engine 230 optionally but preferably uses the ROPE module 256 to parse the request.

Next, the XMC SOAP Engine 230 passes the request data to the XMC XML Engine 232. The XMC XML Engine 230 configures the underlying native system (in this case the XMC Motion Service 250). The XMC SOAP Engine 230 may communicate with the XMC XML Engine 232 either locally or across a DCOM connection 270.

Depending on the schema used in the request, the XMC XML Engine 232 either uses the XMC OPC Server 254 to configure the native system 250 or configures the XMC Motion Services 250 directly. The XMC XML Engine 232 may also use any other module to carry out the request as long as the XMC XML engine 232 has support for the external module's schema installed.

If the XMC OPC Server 254 is used, the XMC OPC server 254 then changes the configuration data as specified in the request made to it by the XMC XML Engine 232.

When requested, the XMC Motion Services 250 uses the current XMC Driver 252 to change the settings on the target motion hardware.

Machine Monitoring/Diagnostics

Monitoring/Diagnostic operations are used to query the system for information. For example when monitoring the system the current motor positions, velocities etc may be monitored to see what the machine is doing. When performing diagnostic operations, the actual state of the machine (such as the programs that reside on the hardware) may be queried. This information may be displayed to the user running the client, used for immediate analysis, or stored for future analysis. Machine diagnostics is similar to monitoring the machine except that a higher level of data detail is usually queried. The following scenario applied to both monitoring and querying diagnostic information from the machine.

Figure 8:
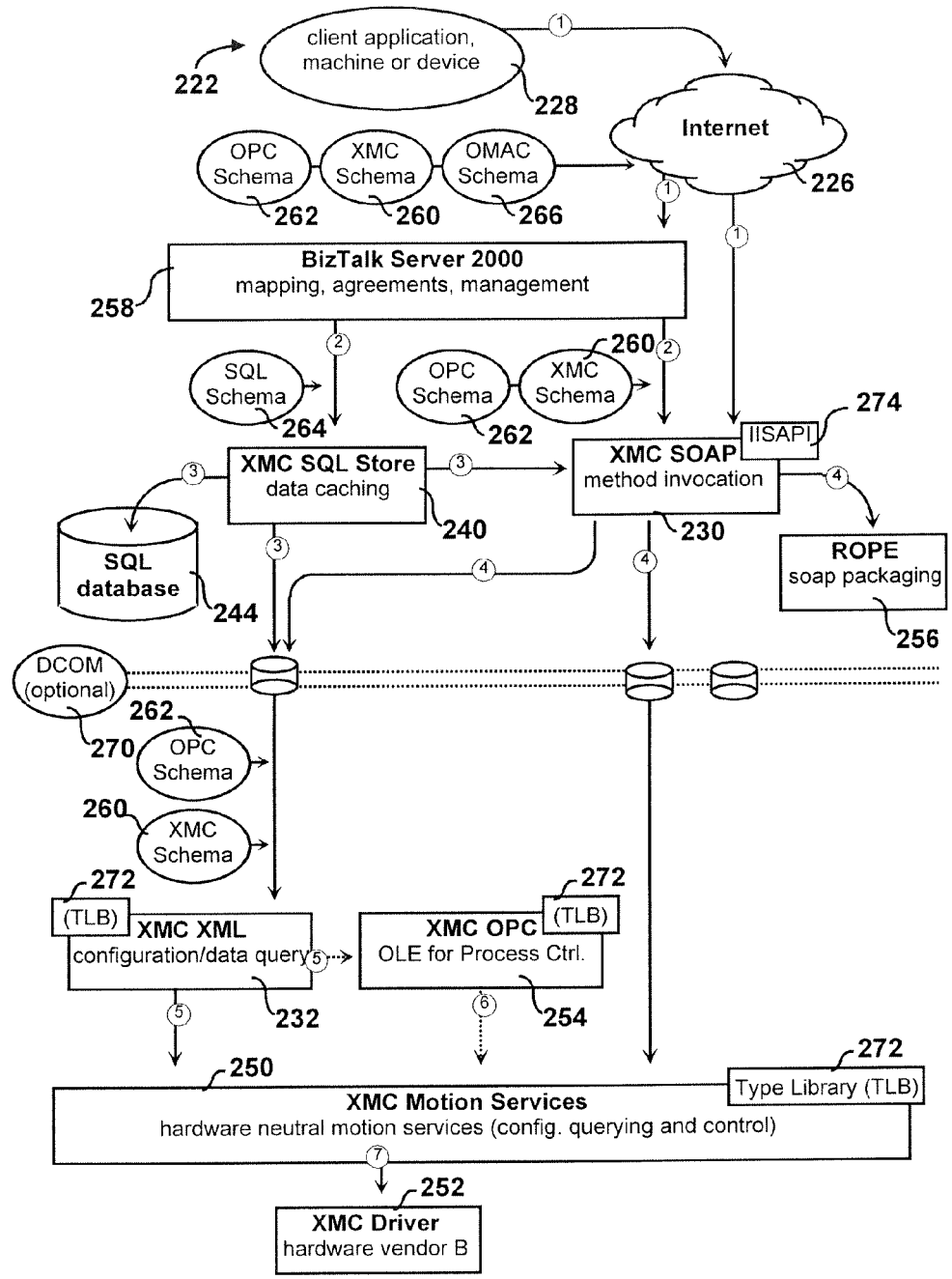
FIG. 8 is a scenario map illustrating the machine monitoring process implemented by the server system of FIG. 5.
Figure 9:
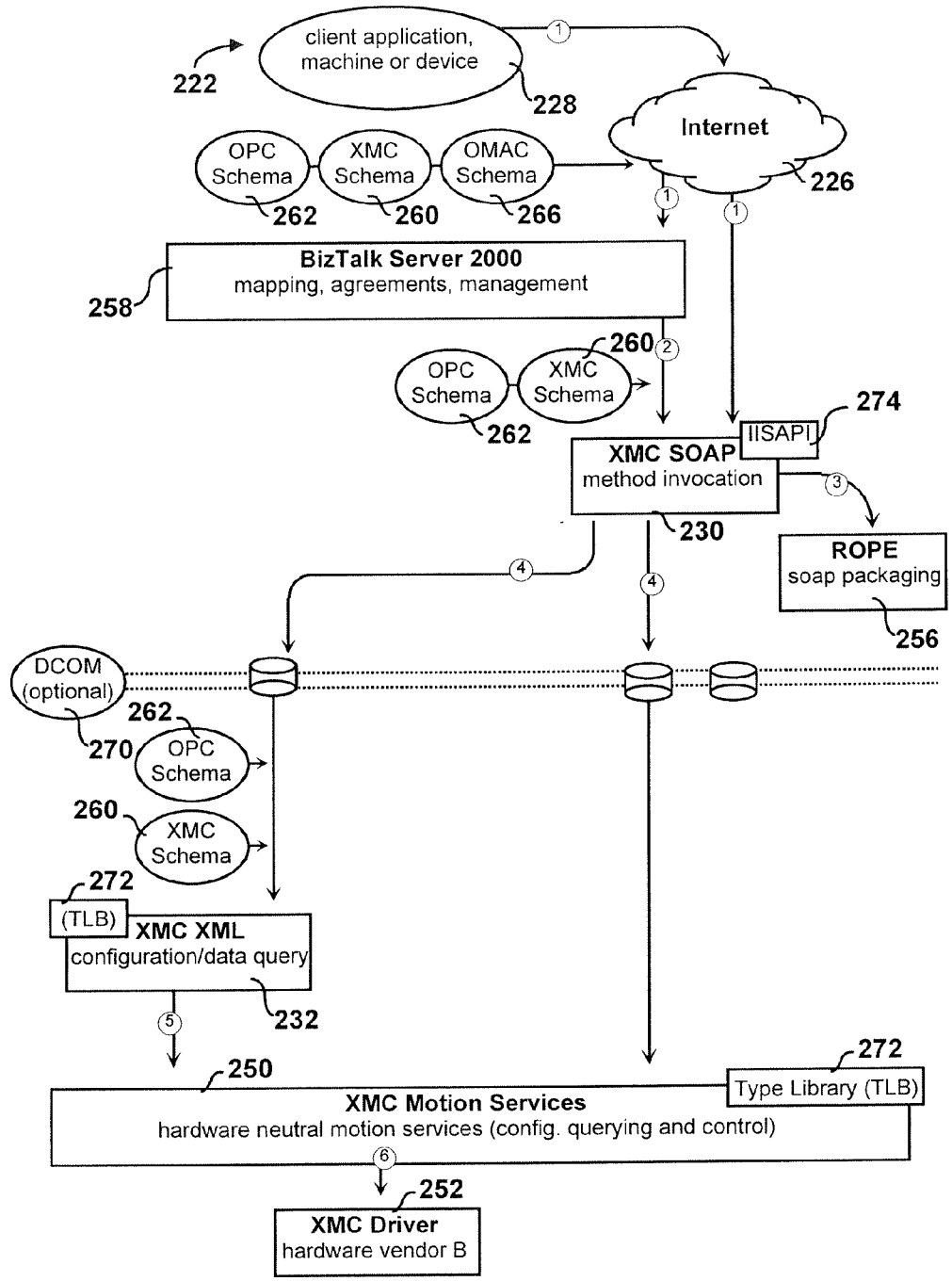
FIG. 9 is a scenario map illustrating the machine control process implemented by the server system of FIG. 5.

Referring now to FIG. 8, the following steps occur when monitoring (or querying diagnostic information from) the machine.

First the client application 228 queries the machine (one time, intermittently, or periodically) for the information required. The client application 228 may use one of various different schemas. The data, configured according to the schema used, is sent to XMC SOAP Engine 230 either directly or indirectly through the BizTalk Server 258.

If the BizTalk Server 258 receives the request, it either directs the request to the XMC SQL Store module 240 or directly to the XMC SOAP Engine 230, depending on the schema mapping used and whether or not data caching is used.

If data caching is enabled, the XMC SQL Store module 240 queries the SQL database 244 (or any other database used) for the data. To update the cache, the XMC SQL Store module 240 either directly queries the XMC XML Engine 232 or uses the XMC SOAP Engine 230 to query the XMC XML Engine 232 for the data to be cached.

When requested, the XMC SOAP Engine 230 uses the ROPE engine 256 to parse the request and then either directly queries data specified in the request from the XMC Motion Services module 250, or routes the request to the XMC XML Engine 232.

If used, the XMC XML Engine 232 determines the data schema used and then either routes the request to the XMC Motion Services module 250 either directly or indirectly through the XMC OPC Server 254. If the XMC OPC Server 254 is used, it directly queries the data from the XMC Motion Services. The XMC Motion Services module 250 then uses the XMC Driver 252 to query the data from the target motion hardware.

Action Operations (Machine Control)

Action operations cause the machine to do things such as run programs or make moves. For example, the machine may be directed to move to its home state. The scenario depicted in FIG. 9 describes the process of performing such control operations.

The following steps occur when performing a machine control operation.

First, the client application 228 requests the machine control operation to be performed and passes all parameter data needed. This request is sent to the SOAP Enabled Server 230 directly or indirectly through the BizTalk Server 258. The client application 228 may use one or more of various schemas to describe the operation to be performed.

If the BizTalk Server 258 is used, the BizTalk server 258 will, if necessary, map from the original schema used by the client application 228 to a different schema supported by the motion server system 220. Once properly mapped, the request is passed to the XMC SOAP Engine 230.

When requested, the example XMC SOAP Engine uses the ROPE module 256 to parse the request and determine what service operation is to be performed. As discussed above, the use of the ROPE module 256 is not required but is preferred.

Next, the XMC SOAP Engine 230 sends the request to the XMC Motion Services module 250 for processing either directly or indirectly through the XMC XML Engine 232. As discussed above, this communication may be on a local machine or may occur across a DCOM connection 270 (or even to another SOAP Engine if appropriate). If used, the XMC XML Engine 232 connects with the XMC Motion Services module 250 to perform the requested machine control operations.

The XMC Motion Services module 250 uses the selected XMC Driver 252 to direct the target hardware to perform the desired machine control operations.

DATA FORMAT MODULE

The data format, or XMC XML Engine, module 232 acts as a container for multiple schemas, both XMC XML and non-XMC XML Schemas. The XMC XML Engine thus forms a schema repository that is available to other components of the system 220 such as the service request format module 230 or the data management module 258.

Once enabled with several schemas, the XMC XML Engine 232 uses polymorphism to work with each schema in the same manner. Each schema itself is the definition of a data set used to either query or set motion configuration data and motion properties, or cause motion actions on the target machine.

This section describes the how the XMC XML Engine works internally was well as how it interacts with the modules around it in a software system.

XML Engine Module Interactions

The XMC XML Engine 232 is designed to be a 'middleware' component that translates data between a native system and XML. In the example system 220, this translation is bi-directional. Translations from the XML data format to the data format of the native motion services module 250 are used to change configuration data and properties and to cause actions. Translations from the native data format of the motion services module 250 to XML data format are used when querying configuration data or properties.

Figure 10:
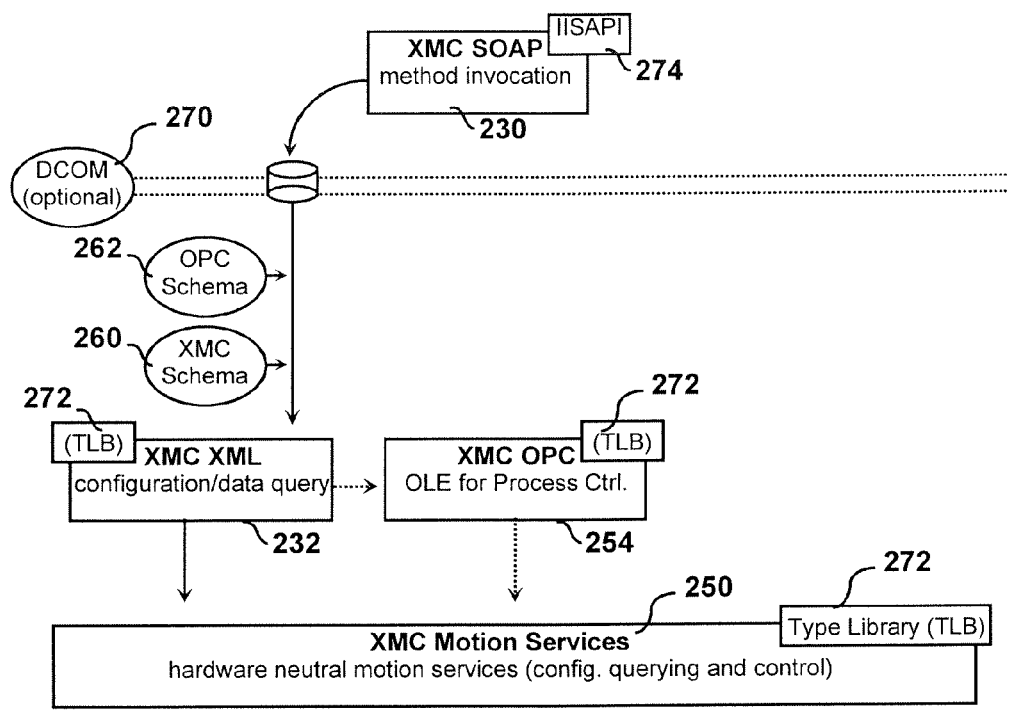
FIG. 10 is a module interaction map depicting the interaction of the primary modules of a data format module portion of the server system of FIG. 5.

FIG. 10 is a module interaction map illustrating the interaction of the XMC SOAP Engine 230 and the XMC XML Engine 232 when the SOAP Engine 230 calls methods on the XML Engine 232. The methods called allow the XMC SOAP Engine 230 to query and set data or cause other actions on the native system implemented by the XMC Motion Services module 250.

As noted above, the XMC XML Engine 232 may work with several native systems. FIG. 10 illustrates that the XMC XML Engine 232 also can work with the XMC OPC component 254 to query/set data sets using the OLE for Process Control data formats.

Even though only the XMC Soap Engine 230 is displayed as the only client, many other clients could use the XMC XML Engine 232. For example, a Microsoft BizTalk server 258 might be used to query specific data from the XMC XML Engine 232 and then map that data into a completely different schema, such as the OMAC data schema 266.

FIG. 10 illustrates that the example XMC XML Engine module 232 interacts with the XMC SOAP Engine 230, the XMC Motion Services module 250, and the XMC OPC module 254. As generally discussed above, the XMC XML Engine module 232 is used to build data sets based on the active XML Schema 260. In addition, this engine 254 translates data sets received and enables requested operations, such as setting configuration or property data, to be performed by the native motion control system 224.

Figure 11:
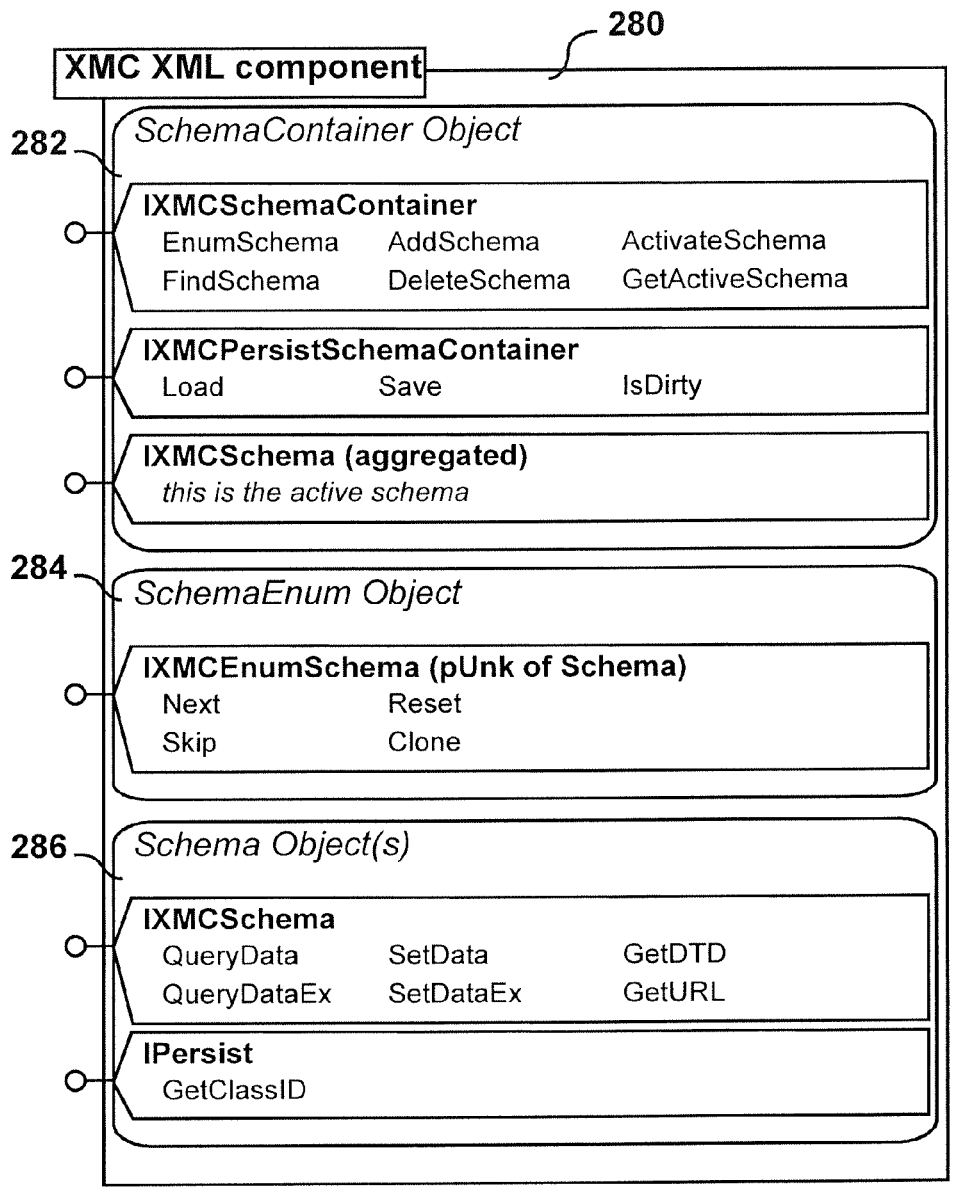
FIG. 11 is an interface map illustrating the interface of the data format module of FIG. 10.

Referring now to FIG. 11, depicted at 280 therein is an interface map for the XMC XML Engine module 232. The example XMC XML Engine module 232 implemented as a COM component that houses several objects. Each object exposes one or more OLE interfaces.

FIG. 11 illustrates that the XMC XML Engine module 232 houses two primary objects: the SchemaContainer object 282 and SchemaEnum objects 284. In addition, the XMC XML Engine 232 supports several default Schema objects 286, although an infinite number of external Schema objects can be supported. When querying and setting schema data, the SchemaContainer object 282 is used because it aggregates to the active Schema object. The SchemaEnum object 284 is used to enumerate across all Schema objects installed.

The SchemaContainer object 282 manages all Schema objects installed and is the main object used by the client applications 228. The container 282 stores all Schema objects 286, one of which is designated as the active schema. The SchemaContainer object 282 contains the IXMCSchemaContainer interface, the IXMCPersistSchemaContainer interface, and the IXMCSchema interface. The IXMCSchemaContainer interface is used to add/remove schema objects and get access to the schema enumeration. In addition, this interface allows the caller to activate one schema or another. The IXMCPersistSchemaContainer interface is used to persist all information with regard to the schema collection, including the active schema. The IXMCSchema interface is an aggregation of the active schema object's IXMCSchema interface.

The SchemaEnum object is responsible for enumerating across the set of installed schema objects and contains the IXMCEnumSchema interface. The IXMCEnumSchema interface is a standard COM enumeration interface.

The Schema objects are responsible for implementing the specific schema supported. To support a schema, the schema object is responsible for translating Native System data into the XML data set defined by the schema. In addition, XML data sets may be translated and used to change configuration and property settings in the native system. And finally, XML data sets may be translated and used to cause actions on the native system such as physical moves.

The Schema objects define the IXMCSchema interface and IPersist interface. The IXMCSchema interface allows clients to Set and Query data sets based on the XML schema supported.

The XMC XML Engine object interactions will now be described with reference to FIG. 12. In particular, FIG. 12 illustrates how the COM components making up the XMC XML Engine interact to service client requests with data supported by several different schemas.

Figure 12:
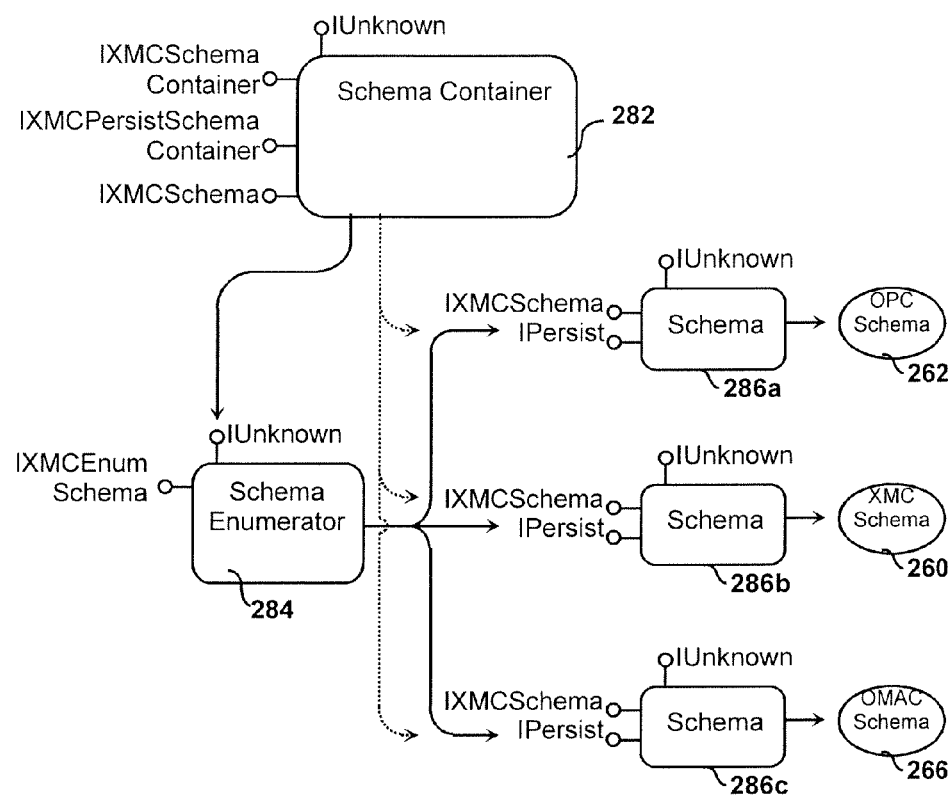
FIG. 12 is an object interaction map illustrating the interaction of the modules of the data format module of FIG. 10.

As shown in FIG. 12, the Schema Container object 282 is the main object that manages all other objects. Client applications may interact with each object directly at times, but the Schema Container object 282 is one of the first that the client application will encounter.

The Schema Container object 282 gives the client application access to the Schema Enumerator object 284 used to enumerate across all schema objects 286 installed. Access to the Schema Enumerator object 284 is useful when working with several different schemas at the same time or when browsing the set of installed schemas. For example, if the Schema Container object 282 has schemas installed that support OPC, XMC and OMAC objects or data sets 286, the enumerator object 284 allows the calling application to enumerate across each of these objects 286.

From the Schema Container object 282, the client application may also install new Schemas 286 and set the active schema out of those installed. Specifying the one of the schema 286 as the active schema directs the Schema Container 282 to aggregate the IXMCSchema interface from the specified active schema object so that the active schema 286 may be used in future data query/set/action operations.

Specifying, selecting, or "activating" a schema is the process of directing the Schema Container to make a schema in a group of previously installed schema the active schema. The 'active' state means that the Schema Container 282 aggregates the specified schema's IXMCSchema interface so that all calls to the Schema Container 282 appears to be housing this object; in actuality, the Schema Container routs the interface to the actual schema object.

Figure 13:
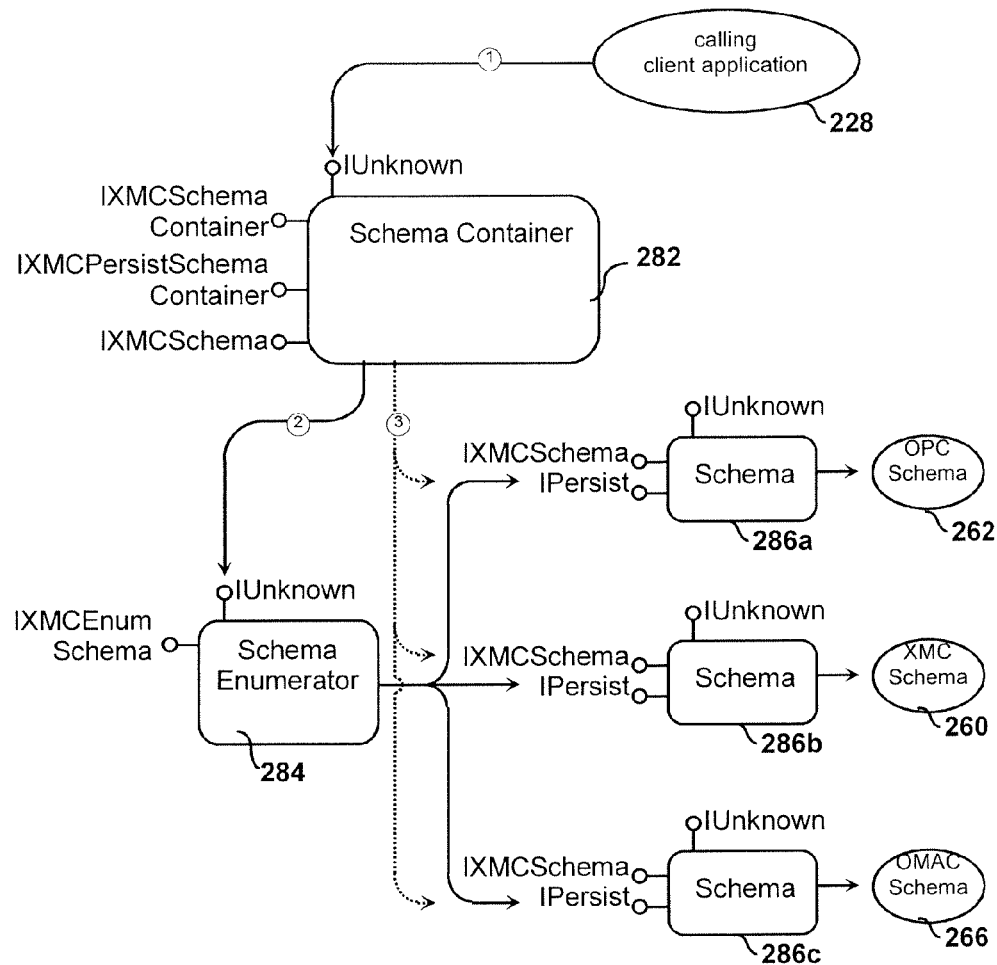
FIG. 13 is a scenario map illustrating the schema activation process implemented by the data format module of FIG. 10.

The process of "activating" a schema will now be described in further detail with reference to FIG. 13. Initially, the calling client application 228 using the XMC XML Engine 232 calls the Schema Container object 282 and directs the object 282 to specify one of the support schema as the active schema. A special ID, GUID, text name, or some other unique identifier may identify each schema. This identifier is used to tell the Schema Container which schema to activate.

Once notified, the Schema Container 282 uses its internal Schema Enumerator 284 to query for the specified schema. If the specified schema is not found an error is returned.

Upon finding the target schema, the Schema Container 282 aggregates the IXMCSchema interface of the activated Schema object 286, making it appear to the client application 228 that the Schema Container 282 actually implements the activated Schema object 286.

Figure 14:
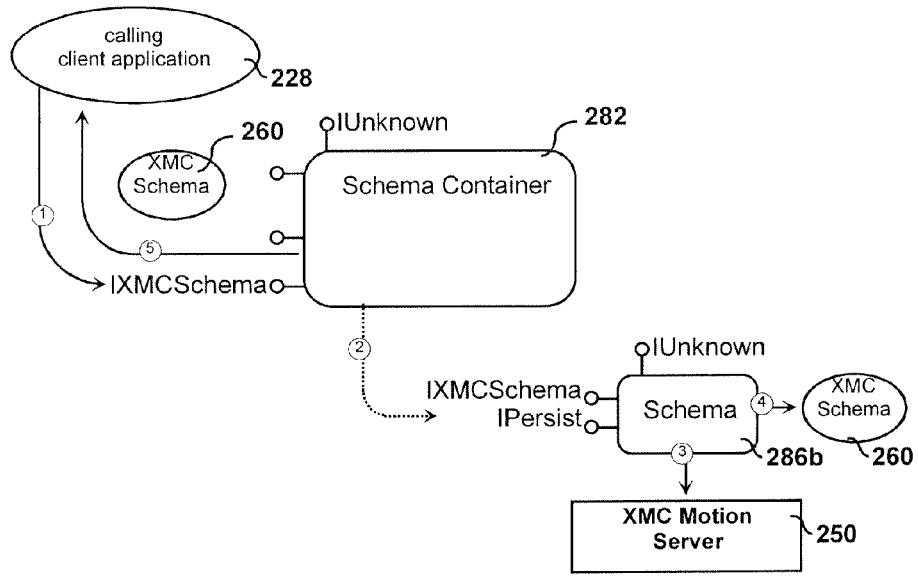
FIG. 14 is a scenario map illustrating the schema data query process implemented by the data format module of FIG. 10.

Once a schema 286 is activated, the client application 228 may choose to query data from the active schema. Such a query may be used to query all configuration settings on a machine or query the overall state of the machine. FIG. 14 illustrates the steps that take place when querying data.

First, the client application 228 queries the Schema Container 282 for the data from the active Schema object. Upon receiving the request, the request actually routes directly to the active Schema object 286 through the aggregated IXMC-Schema interface.

Based on the schema supported, the Schema object 286 queries the native system (in this case the XMC Motion Server 250) for all data needed to fill out the data request. The data required to fill out the data request is then packaged into an XML data packet as specified by the supported Schema. The XML data packet is then passed back to the calling client application 228.

In addition to querying data, the native system configuration and properties may also be set or actions may be performed. Setting data on the native system is very similar to the reverse of the querying process.

Figure 15:
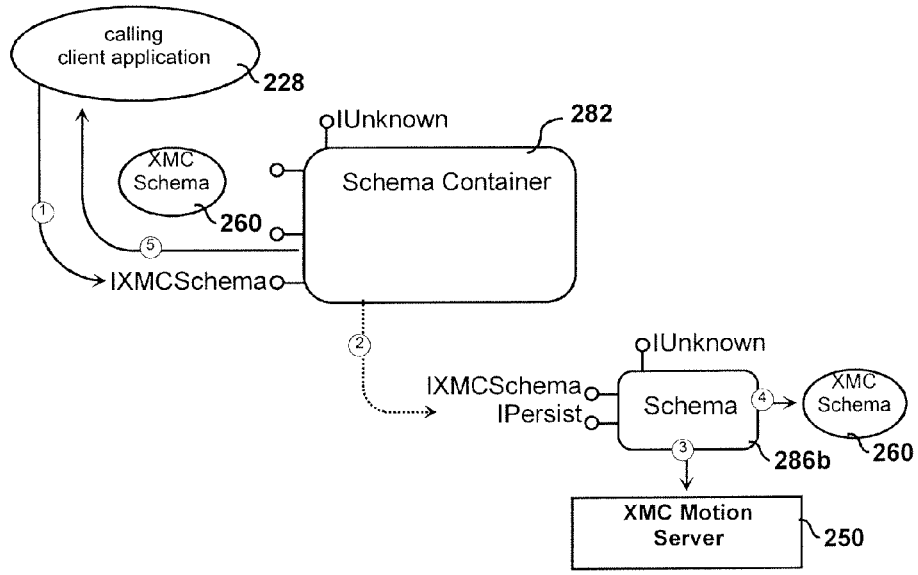
FIG. 15 is a scenario map illustrating the schema data set process implemented by the data format module of FIG. 10.

In particular, FIG. 15 illustrates the steps that occur when setting data on the native system.

First, the client application sends a 'set' request to the Schema Container 282, making sure to pass the XML data packet specifying the data to be set. Upon receiving the request, the call is routed directly to the active Schema object 286 through the aggregated connection to the active Schema's IXMCSchema interface. The Schema object then parses the XML data packet based on the Schema that it supports.

As data is parsed from the XML data packet (or upon completing the parsing), the Schema object 286 directs the native system (in this case the XMC Motion Server 250) to set all data items specified. If an action is requested, the Schema object 286 would parse the data packet pulling from it the data parameters to pass along to the native system 250 when directing it to perform the action requested. The action requested would be specified as part of the data packet. For example, an action identifier may be used to specify an operation to perform from a set of supported operations.

Upon completing the request, the system 220 returns the status (success or failure) of the operation to the client application 228.

To use schemas other than the set of default schemas supported by the XMC XML Engine 232, the client application must add new ones.

Figure 16:
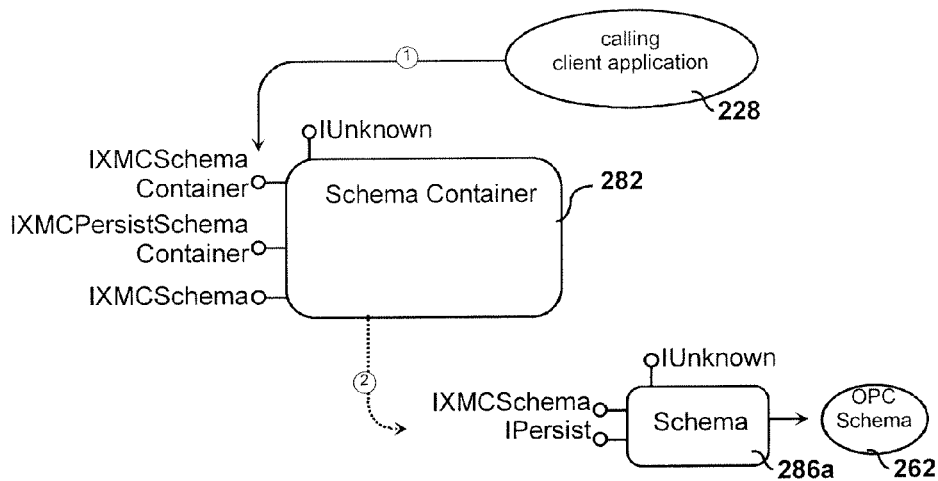
FIG. 16 is a scenario map illustrating the schema adding process implemented by the data format module of FIG. 10.

FIG. 16 illustrates the steps that occur when adding new schema support to the Schema Container. Initially, the client application must request the Schema Container 282 to add a new schema 286, making sure to specify the CLSID (or other identifier) of the schema and URL (or other location identifier) identifying the location of the new Schema object 286.

Upon receiving the request, the Schema Container 282 creates an instance of the new Schema object 286 and adds it to its list of supported schemas. When persisting its information, the Schema Container 282 saves the schema identifier and location so that it can later load the schema object.

Schema Examples

This section shows several example schemas, each of which would be supported by one or more Schema objects 286.

XMC Configuration Schema

The XMC configuration schema describes all data used to configure an XMC software system.

```
<?xml version='1.0' encoding='UTF-8' ?>
<!ELEMENT XMCConfiguration (Systems)>
<!ATTLIST XMCConfiguration Version CDATA #IMPLIED >
<!ELEMENT Systems (System+)>
<!ATTLIST Systems Count CDATA #IMPLIED >
<!ELEMENT System (DefUnits , DefMode , SecurityOptions, Drivers)>
<!ATTLIST System Number CDATA #IMPLIED >
<!ELEMENT DefUnits (#PCDATA)>
<!ELEMENT DefMode (#PCDATA)>
<!ELEMENT SecurityOptions (Security.control , Security.monitoronly)>
<!ELEMENT Security.control (#PCDATA)>
<!ELEMENT Security.monitoronly (#PCDATA)>
<!ELEMENT Drivers (Driver+)>
<!ATTLIST Drivers Count CDATA #IMPLIED >
<!ELEMENT Driver (Enabled , Filters , Properties , Streams)>
<!ELEMENT Filters (Filter*)>
<!ATTLIST Filters Count CDATA #IMPLIED >
<!ELEMENT Filter (Streams)>
<!ELEMENT Properties (Property*)>
<!ATTLIST Properties Count CDATA #IMPLIED >
<!ELEMENT Property (Name , Value)>
<!ELEMENT Streams (Stream*)>
<!ATTLIST Streams Count CDATA #IMPLIED >
<!ELEMENT Stream (Enabled , (Stream.PCBus | Stream.TextFile | Stream.DbgMon))>
<!ELEMENT Stream.PCBus (Port , PortSize)>
<!ELEMENT Stream.TextFile (FileName)>
<!ELEMENT Stream.DbgMon EMPTY>
<!ELEMENT FileName (#PCDATA)>
<!ELEMENT Name (#PCDATA)>
<!ELEMENT Value (#PCDATA)>
<!ELEMENT Enabled (#PCDATA)>
<!ELEMENT Port (#PCDATA)>
<!ELEMENT PortSize (#PCDATA)>
```

XMC Meta Programs Schema

The XMC Meta Program schema describes data making up a meta program which is a hardware independent motion control program.

```
<?xml version='1.0' encoding='UTF-8' ?>
<!ELEMENT XMCMetaProject (Programs)>
<!ATTLIST XMCMetaProject Version CDATA #IMPLIED >
<!ELEMENT Programs (Program*)>
<!ATTLIST Programs Count CDATA #IMPLIED >
<!ELEMENT Program (Name , Commands)>
<!ATTLIST Program SystemNum CDATA #IMPLIED >
<!ELEMENT Commands (Command*)>
<!ATTLIST Commands Count CDATA #IMPLIED >
<!ELEMENT Command (Name , Parameters)>
<!ELEMENT Parameters (Parameter*)>
<!ATTLIST Parameters Count CDATA #IMPLIED >
<!ELEMENT Parameter (#PCDATA)>
<!ATTLIST Parameter Type CDATA #IMPLIED >
<!ELEMENT Name (#PCDATA)>
XMC System State Schema
```

The XMC System State schema is used to query/set all aspects of the motion control system.

```
<?xml version='1.0' encoding='UTF-8' ?>
<!ELEMENT XMCState (Configuration, Axes, Programs, RawData,
ErrorStatus)>
<!ATTLIST XMCState Version CDATA #IMPLIED >
<!ELEMENT Configuration (Config.ActiveCFGFile ,
Config.ActiveMPFFile)>
    <!ELEMENT Config.ActiveCFGFile (#PCDATA)>
    <!ELEMENT Config.ActiveMPFFile (#PCDATA)>
    <!ELEMENT Axes (Axis+)>
    <!ATTLIST Axes Count CDATA #IMPLIED >
    <!ELEMENT Axis (CommandedData, ActualData, HomingData, Limits
,
State)>
    <!ATTLIST Axis Index CDATA #IMPLIED >
    <!ELEMENT CommandedData (Commanded.MotionProfile,
        Commanded.Position)>
    <!ELEMENT ActualData (Actual.MotionProfile,
        Actual.MotorPosition,
        Actual.EncoderPosition)>
    <!ELEMENT Commanded.MotionProfile (MotionProfile)>
    <!ELEMENT Homing.MotionProfile (MotionProfile)>
    <!ELEMENT Actual.MotionProfile (MotionProfile)>
    <!ELEMENT HomingData (Homing.MotionProfile ,
        Homing.FinalVelocity)>
    <!ELEMENT Homing.FinalVelocity (#PCDATA)>
    <!ELEMENT MotionProfile (Velocity , Acceleration , Deceleration)>
    <!ELEMENT Velocity (#PCDATA)>
    <!ELEMENT Acceleration (#PCDATA)>
    <!ELEMENT Deceleration (#PCDATA)>
    <!ELEMENT Commanded.Position (#PCDATA)>
    <!ELEMENT Actual.Position (#PCDATA)>
    <!ELEMENT Actual.MotorPosition (#PCDATA)>
    <!ELEMENT Actual.EncoderPosition (#PCDATA)>
    <!ELEMENT RawData (RawData.Programs , RawData.Configuration)>
    <!ELEMENT RawData.Programs (#PCDATA)>
    <!ATTLIST RawData.Programs DataSize CDATA #IMPLIED >
    <!ELEMENT RawData.Configuration (#PCDATA)>
    <!ATTLIST RawData.Configuration DataSize CDATA #IMPLIED >
    <!ELEMENT Limits (Limits.IsHit_HWCCW,
        Limits.IsHit_HWCW,
        Limits.IsHit_SWCCW,
        Limits.IsHit_Home,
        Limits.IsHit_SWCW,
        Limits.SWCCWPos,
        Limits.SWCWPos )>
    <!ELEMENT State (IsMoving , IsHoming , IsFaulted)>
    <!ELEMENT IsMoving (#PCDATA)>
    <!ELEMENT IsHoming (#PCDATA)>
    <!ELEMENT IsFaulted (#PCDATA)>
    <!ELEMENT ErrorStatus (Error.Internal , Error.Source)>
    <!ELEMENT Error.Internal (Error)>
    <!ELEMENT Error.Source (Error)>
    <!ELEMENT Error (#PCDATA)>
    <!ATTLIST Error ErrorCode CDATA #IMPLIED >
    <!ELEMENT Programs (Program+)>
    <!ATTLIST Programs Count    CDATA #IMPLIED
        ActiveProgram CDATA #IMPLIED >
    <!ELEMENT ActiveProgram (#PCDATA)>
    <!ELEMENT Program (Name)>
    <!ATTLIST Program IsRunning CDATA #IMPLIED
        Index   CDATA #IMPLIED >
    <!ELEMENT Name (#PCDATA)>
```

XMC OPC Schemas

In addition to the XMC specific schemas previously described, non XMC schemas may also be supported. This section shows OLE for Process Control schemas designed for motion. The XMC OPC schema is actually an OPC schema designed for XMC data that is formatted specifically for an OPC server.

```
<?xml version='1.0' encoding='UTF-8' ?>
<!ELEMENT Server (Groups)>
<!ATTLIST Server Version CDATA #IMPLIED >
<!ELEMENT Groups (Group+)>
<!ATTLIST Groups Count CDATA #IMPLIED >
<!ELEMENT Group (Type , UpdateRate , Items)>
<!ELEMENT Type (#PCDATA)>
<!ELEMENT UpdateRate (#PCDATA)>
<!ELEMENT Items (Count , Item+)>
<!ATTLIST Items Count CDATA #IMPLIED >
<!ELEMENT Item (ID , Description , DataType , Data)>
<!ELEMENT ID (#PCDATA)>
<!ELEMENT Description (#PCDATA)>
<!ELEMENT DataType (#PCDATA)>
<!ELEMENT Data (#PCDATA)>
<!ELEMENT Count (#PCDATA)>
```

SERVICE REQUEST FORMAT MODULE

This section contains further description of the SOAP (Simple Object Access Protocol), how SOAP is implemented in the context of the data server system 220, and how to setup the service request format module 230 in the context of the XMC SOAP Engine.

To request an operation in another application, the client application sends an HTML 'POST' instruction containing an XML 'SOAP Envelope'. The XML Soap Envelope defines the operation to be performed.

Figure 17:
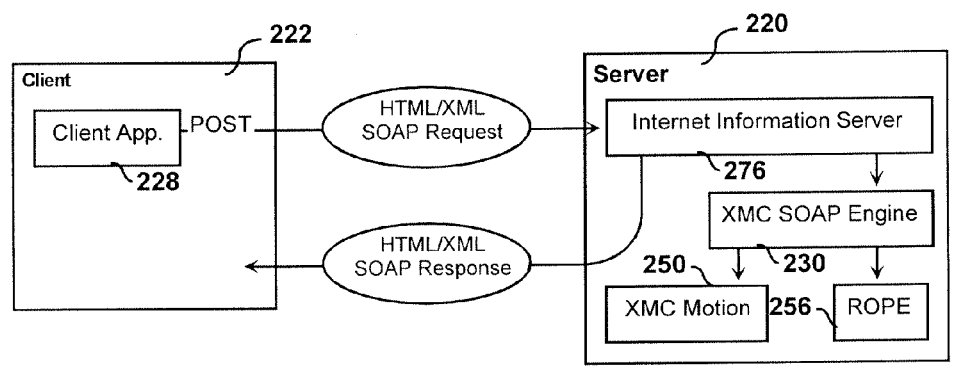
FIG. 17 is a scenario map depicting the basic transfer of a service request from a client application and the server system of FIG. 5.

Referring initially to FIG. 17, depicted therein is the basic HTML Soap request as implemented using the data server system 220 of the present invention. To operate over a communications network 224 such as the Internet, the data server system 220 must be capable of receiving Internet/Web requests. FIG. 5 illustrates this capability by an internet information application programming interface (IIAPI) 74. FIG. 17 illustrates that the interface 274 is defined by an information server module 276; in the example system 220, the information server module 276 is formed by a Microsoft Internet Information Server (IIS) based server installed with the XMC SOAP Engine 30.

Upon receiving a request, the information server module 276 passes the request to the XMC Soap Engine 230, which in turn performs the requested motion operation. Once complete, the Server responds with a HTML header and XML 'SOAP Envelope' that describes the results of the operation.

In addition to using basic HTML, a data packet processing technology is available from Microsoft Corporation called 'Remote Object Proxy Engine' or ROPE. ROPE performs all basic tasks of generating the HTML/XML SOAP data packets sent to the server system 220 when requesting operations. In addition ROPE parses the responses retrieved from the server system 220. While optional, the use of the ROPE technology is preferred.

Figure 18:
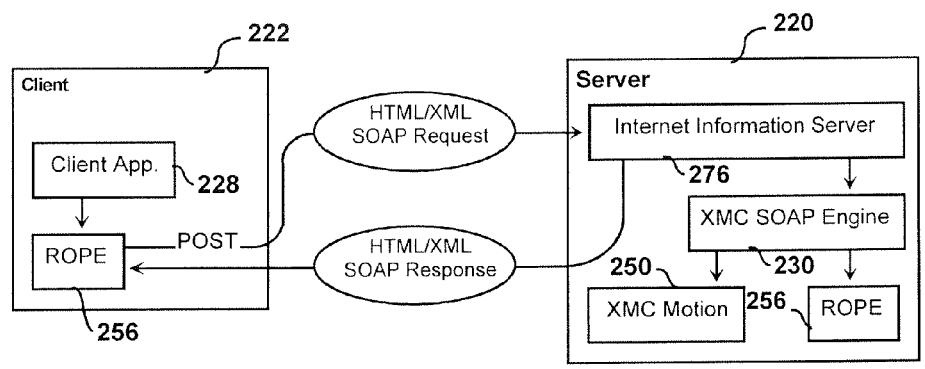
FIG. 18 is a scenario map depicting the use of packet processing to transfer a service request response from the server system of FIG. 5 to a client application.

FIG. 18 illustrates the process of using ROPE technology for parsing of packets sent to and retrieved from the server system 220. ROPE builds and sends the same HTML 'POST' instruction with the same SOAP Envelope containing the XML data describing the requested operations and any parameters used.

When making a SOAP request, a particular sequence of steps must be performed to carry out the request. This sequence of steps forms what will be referred to herein as the "SOAP Pipeline". The SOAP Pipeline will be described below from two different perspectives. In the first, the pipeline is described making a SOAP request just using basic HTML on the client side. The second scenario describes making a SOAP request using the Microsoft ROPE technology.

SOAP Request Using Basic HTML

SOAP requests are available to any client application that supports HTML and XML. This section describes the specific steps taking place when making a basic HTML based SOAP request.

Initial connection is not required, but is helpful in that establishing an initial connection informs the client machine about the services available on the SOAP Server. If the client is informed in advance about the services that are available, the initial connection step is not necessary.

Figure 19:
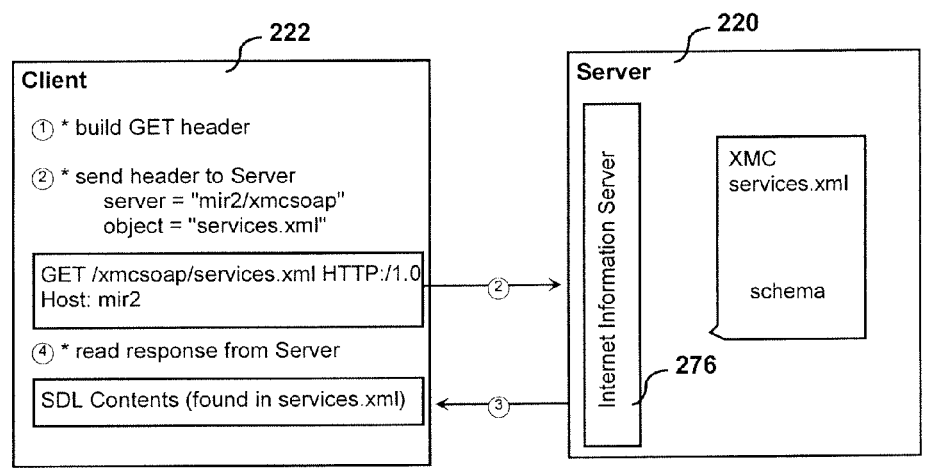
FIG. 19 is a scenario map depicting one example initial connection process implemented by the server system of FIG. 5.

Referring now to FIG. 19, the HTML Connect process will be described in further detail.

When making the initial connection, following steps take place.

First, the client must build a standard HTML 'GET' header used to query the 'services.xml' file that contains the 'Services Description'. This is often referred to as the SDL or Services Description Language and is an XML based document that describes the operations available on the SOAP enabled server. The file containing the Service Description Language document may be given any name but must be an XML file.

Next, the client must send the HTML request to the server to query the server for the XML services file. Upon receiving the request, the server returns the services description (the contents of the services.xml file) to the client. The client may then parse the services description to 'learn' what services are supported by the SOAP server (including the method and parameter names and types).

Once the client 222 has identified the services available on the SOAP server 230, the client 222 is ready to make method calls directing the server to perform the supported operations.

Figure 20:
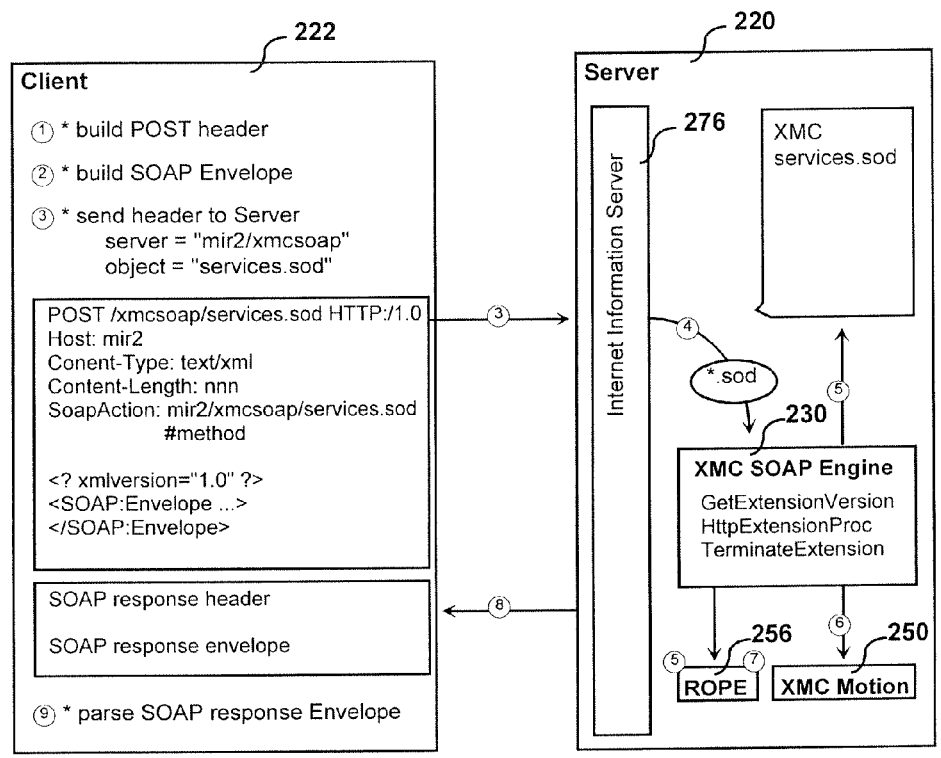
FIG. 20 is a scenario map depicting one example method call process implemented by the server system of FIG. 5.

FIG. 20 illustrates the process of making an HTML Method Call. The client must first build a standard HTML 'POST' header specifying the host and 'SoapAction', where the SoapAction includes both the location of the '*.SOD' file and the service requested. The SOD file describes the actual COM component that will be used to carry out the operation, whereas the service requested is the method exposed by that component.

Next, the client application 228 must build the SOAP envelope that describes the service requested. Using XML, the envelope is built to describe the method and all parameter data used to perform the service request.

The client then sends the request to the SOAP enabled server system 220, making sure to send the request to the location where the XMC SOAP Engine 230 is installed. Upon receiving the request, information server module 276 routes the .SOD based request to the XMC SOAP Engine 230 for processing.

On the Server side, the XMC SOAP Engine 230 uses the ROPE module 256 to load and parse the .SOD file to get the component object to use for the request. In addition, the ROPE module 256 is used to parse the actual XML contained within the request that describes the SOAP operation to be performed (i.e. method name and parameters).

The XMC SOAP Engine 230 then actually makes the call to the component method passing all parameters sent via the previous SOAP call.

Next, the XMC SOAP Engine 230 again uses the ROPE module 256 to build the response packet, making sure to build into the packet the results of the component method call. If any data is to be returned (as in the case of querying the component, such as with the XMC XML Engine 232), the data is packed into the response SOAP envelope using the ROPE module 256.

The ROPE module then sends the response SOAP envelope back to the client application 228. Upon receiving the response, the client application 228 may parse the HTML and XML to get the response results and queried data, if any.

The previous sections have described communicating to a SOAP enabled motion control server system 220 using native HTML. One skilled in the art will recognize that, in both the general GET and POST operations, the client is required to build the header and SOAP request Envelope as well as parse the SOAP response envelope. The next section describes how using the ROPE module 256 simplifies significantly these steps because the ROPE module 256 handles all parsing and envelope building programmer.

The Remote Object Proxy Engine (ROPE) was designed specifically to build and parse SOAP envelopes. In addition, ROPE takes care of sending each packet to the server as well as receiving responses from the server. This section describes the same SOAP pipeline but from the perspective of using ROPE instead of native HTML.

When using ROPE, the initial connection between the client application 228 and the server system 220 is required, for this connection identified for the ROPE module 56 what services are available on the SOAP enabled server system 220.

Figure 21:
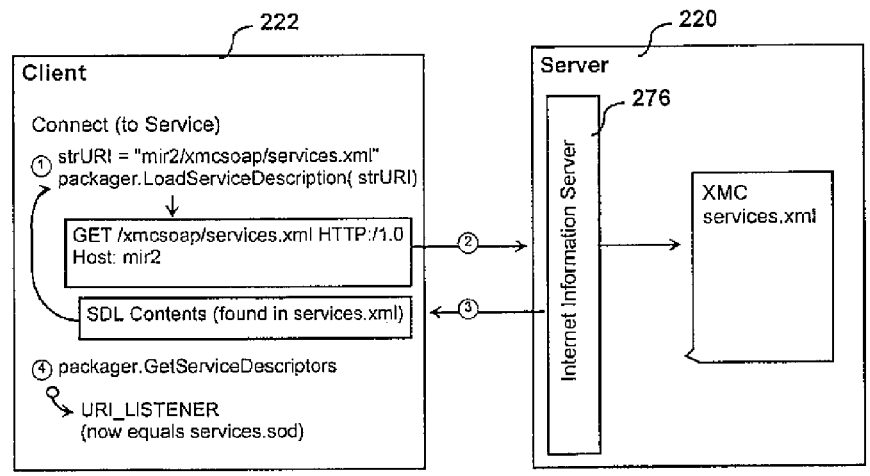
FIG. 21 is a scenario map depicting another initial connection process implemented by the server system of FIG. 5.

FIG. 21 illustrates the steps that occur when making the initial connection using ROPE.

First, using the SOAPPackager object, the client application 222 loads the service description by passing the services description file ('services.xml) URI to the LoadServiceDescription method. Internally, the SOAPPackager object builds the "get" request and sends this request to the SOAP enabled server system 220. This is the same get request described in the native HTML initial connection.

Upon receiving the request, the information server module 276 responds by sending back the contents of the services.XML file.

The SOAPPackager object is then used on the client side to parse out the listener information, which is the URI of the services.SOD file on the server module 276. At this point, the SOAPPackager object has all the information necessary to determine what services are available on the server, along with the specific format of each service.

Once the initial connection is made, the client application 222 is able to use the ROPE 256 to invoke services (make method or service request calls) on the SOAP enabled server system 220.

Figure 22:
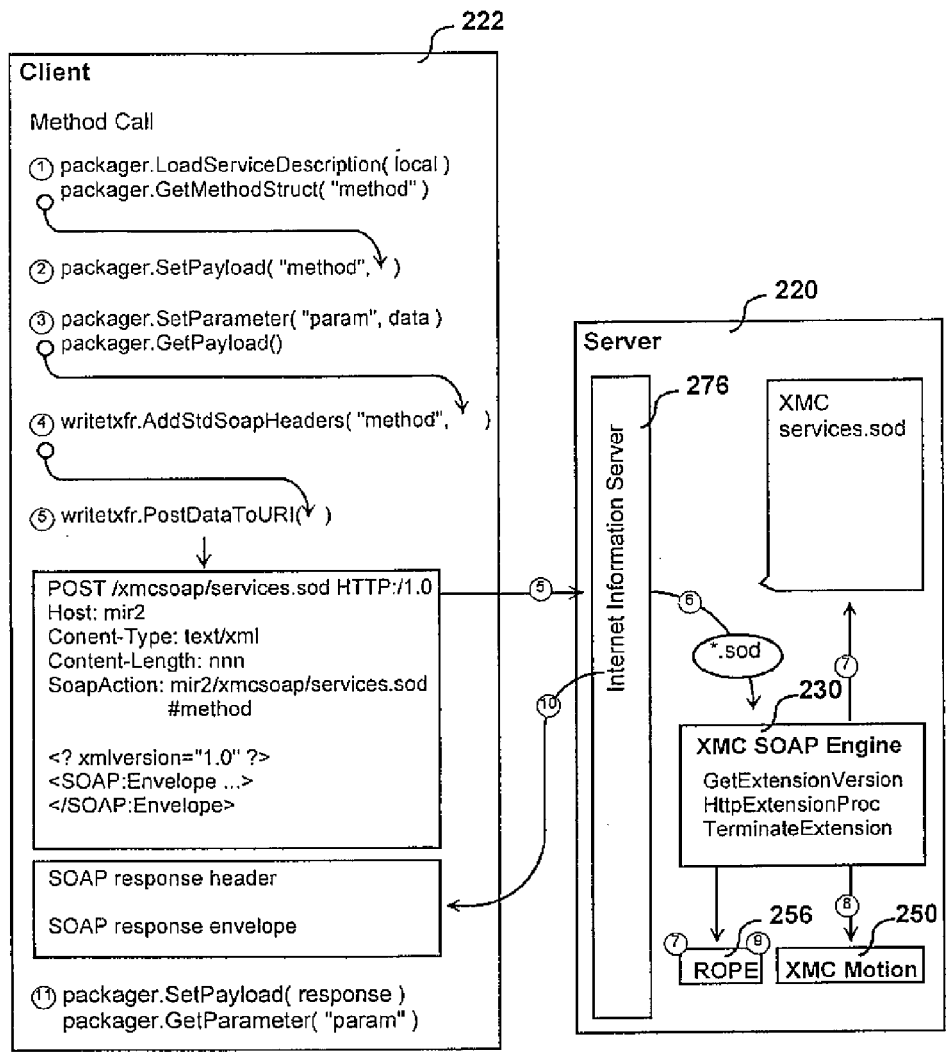
FIG. 22 is a scenario map depicting another example method call process implemented by the server system of FIG. 5.

As shown in FIG. 22, the following steps occur when invoking services using the ROPE module 256.

Using the SOAPPackager object, the local copy of the service description is loaded (this is the same one previously loaded but cached by ROPE). The SOAPPackager object is then used to build the payload for the service that is to be called by specifying the 'method name' of the service. In addition, the SOAPPackager object is used to add the parameter data for the method call, if any such parameter data is required.

Using the WireTransfer object, the standard SOAP headers are added to build the actual HTML header and SOAP envelope that will eventually be sent. This is the same HTML 'POST' header and SOAP envelope described above with calling methods using native HTML.

The WireTransfer object is then used to send the header and SOAP envelope containing the service request to the server system 220, thereby requesting the that the server system 220 instruct the motion control system 224 to perform the contained service request.

Upon receiving the request, information server module 276 detects the .SOD based request and routes the request to the XMC SOAP Engine 230. The XMC SOAP Engine 230 uses the local ROPE module 256 to parse the COM component name from the .SOD file as well as parse out the service request information from the XML SOAP envelope contained in the original request.

Next, the XMC SOAP Engine 230 calls the method on the XMC Motion Server 250 as requested by the service request contained in the original SOAP envelope.

All results from the service request (method) invocation and all return data are packed into a response SOAP envelope built by the ROPE module 256. The response SOAP envelope is the returned to the client application 222 by the ROPE module at the XMC SOAP Engine 230. The client application 222 then uses the SOAPPackager object to parse the response SOAP envelope and make available to the client application 222 all return parameters contained in the response SOAP envelope.

A close comparison of the steps discussed with reference to FIGS. 20 and 21 indicates that the use of the ROPE module 256 eliminates many of the native HTML based SOAP steps by generating and parsing the SOAP envelope for the programmer.

With the foregoing understanding of how the client application 228 interacts with the SOAP enabled server system 220, the construction and operation of the server system 220 will now be described in detail.

The XMC SOAP Engine 230 builds on SOAP technology to obtain the data server system 220 that is enabled for motion-based application. In particular, the example XMC SOAP Engine 230 extends information server module 276 to support SOAP requests and routes each request appropriately to the method on the component implementing the service requested. The following sections describe how the XMC SOAP Engine 230 performs these tasks to support SOAP requests.

The XMC SOAP Engine 230 handles SOAP requests received through the Internet 226. Such requests may originate from any client application 222 or may actually be routed to the XMC SOAP Engine 230 from a BizTalk server 258.

Figure 23:
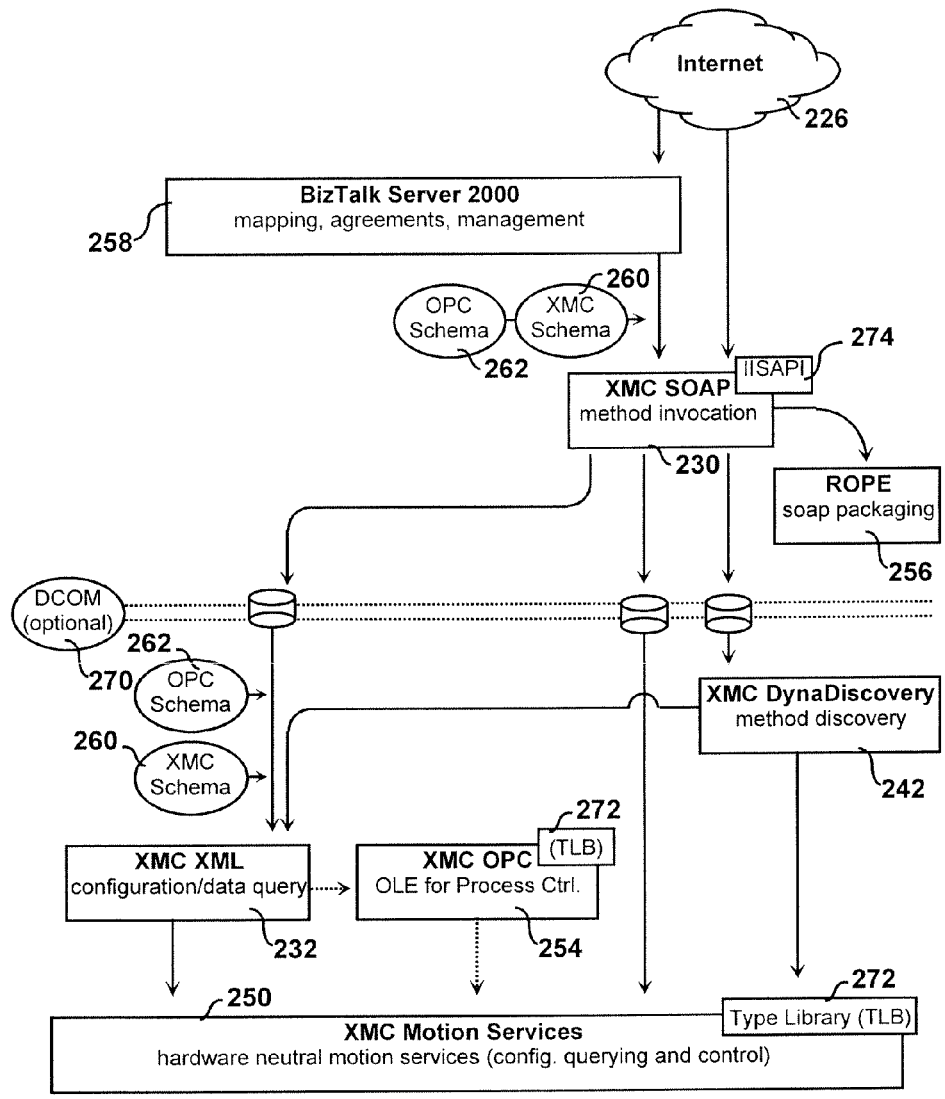
FIG. 23 is a module interaction map depicting the interaction of the primary modules of a service request format module of the server system of FIG. 5.
Figure 25:
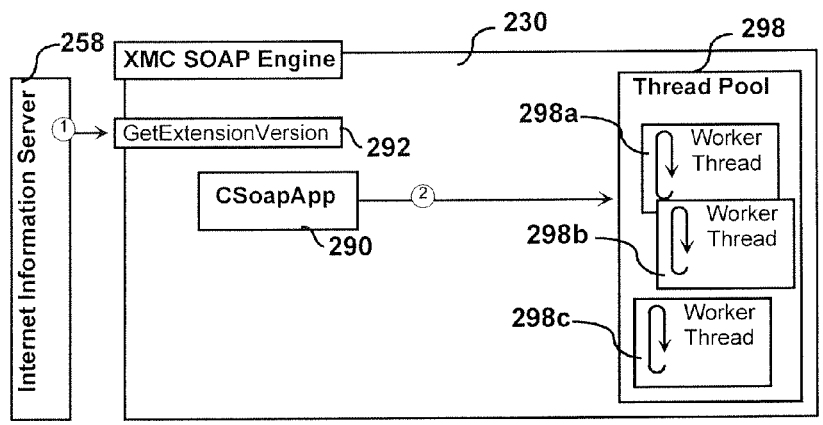
FIG. 25 is a scenario map depicting the initialization process implemented by the service request format module of FIG. 24.

In particular, the XMC SOAP Engine 230 interacts with several modules in the system 220 as will be described below with reference to FIG. 23.

Similar to any other SOAP client, the Microsoft BizTalk server 258 may send SOAP requests to the XMC SOAP Engine 230 as well to request data that as necessary to fill out data within supported schemas. For example, a BizTalk server 258 may be used to map an OMAC schema 262 to an XMC schema 260. When filling out the data in the OMAC schema 262, the BizTalk server 258 may query data from the XMC SOAP Engine 230 to fill out the end data mapping.

In addition, other clients may talk to the XMC SOAP Engine 230 via the Internet as previously discussed in the sections above describing the SOAP Pipeline.

To fulfill SOAP requests, the XMC SOAP Engine 230 works with both the XMC XML Engine 232 and with the XMC Motion Server 250. Data queries and configuration settings are made using the XMC XML Engine 232, and service requests are carried out directly by the XMC Motion Server 250 or indirectly through the XMC XML Engine 232.

The example XMC SOAP Engine 230 comprises several objects. These objects work together to perform each requested SOAP operation. In addition, the XMC SOAP Engine 230 uses the XMC Motion Server 250 to eventually carry out the actual service request, either directly or using the ROPE module 256.

The example XMC SOAP Engine 230 is a standard extension module for the Microsoft Internet Information module 274. As such, the XMC SOAP Engine 230 exposes the GetExtensionVersion, HttpExtensionProc, and TerminateExtension functions. These functions are called by module 274 on each request.

Figure 24:
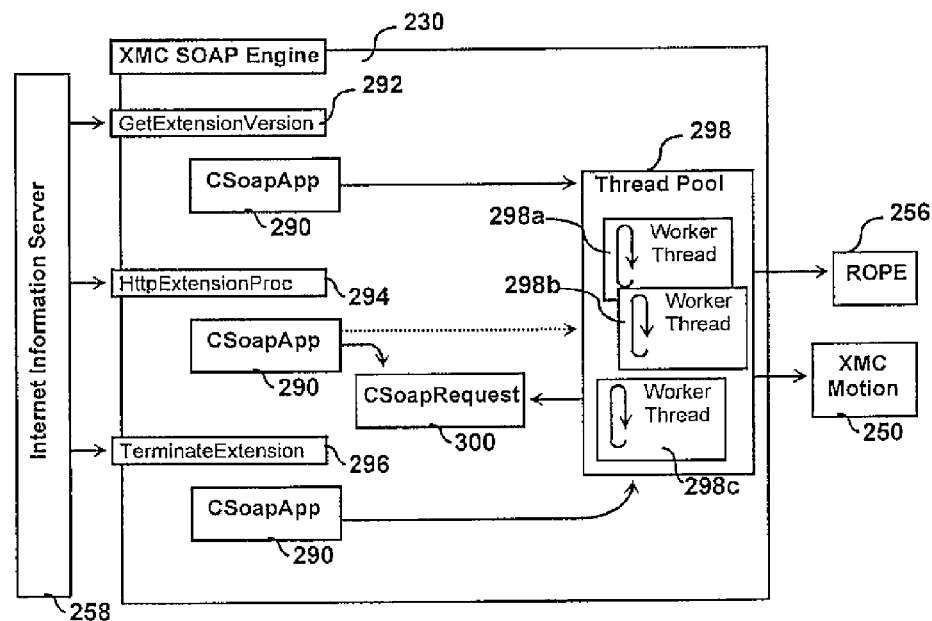
FIG. 24 is a module interaction map depicting the interaction of the primary modules of the service request format module of the server system of FIG. 5.

Referring now to FIG. 24 of the drawing, that figure shows that the XMC SOAP Engine 230 comprises a CsoapApp object 290, a GetExtensionVersion module 292, an HTTPExtension module 294, a TerminateExtension module 296, a Thread Pool 298 comprising one or more worker threads 298a, and a CsoapRequest module 300.

The CSoapApp object 290 manages each of the extension DLL entry points and routes each request appropriately to either the thread pool 298 or the CSoapRequest object 300. In addition, the CsoapApp object 290 is responsible for creating and destroying the worker thread pool 298.

The CSoapRequest object 300 is responsible for managing the data describing the actual service request. A new object is created for each service request and passed to a worker thread 298a for processing.

The thread pool 298 is a collection of threads 298a each of which is used to process one service request.

As generally described above, the ROPE DLL module 256 is used to parse each SOAP envelope and also to build the response SOAP envelopes that are sent back to the client application 228.

As generally discussed above, the XMC Motion Server 250 and XMC XML Engine 232 are used to carry out the requested operations (ie data query, configuration setting, or motion action).

Before the XMC SOAP Engine 230 can be used, it must be initialized. Initialization occurs on the first request when information server module 276 first loads the extension DLL.

The following steps occur during the XMC SOAP Engine Initialization. Upon receiving the first service request, the information server module 276 loads the extension DLL and calls the GetExtensionVersion module or function 292. Upon receiving this call, the CSoapApp object 290 creates the thread pool 298.

When processing a service request, the XMC SOAP Engine 230 creates a CSoapRequest object 300 and passes it to one of the threads 298a in the thread-pool 298 for processing. The thread 298a then in turn directs the specific motion operations to occur on the XMC Motion Server 250.

Figure 26:
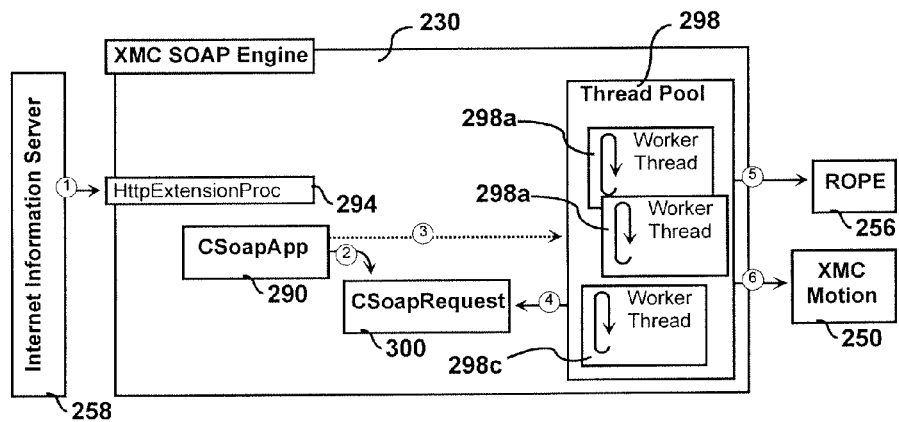
FIG. 26 is a scenario map depicting the service request transfer process implemented by the service request format module of FIG. 24.
Figure 27:
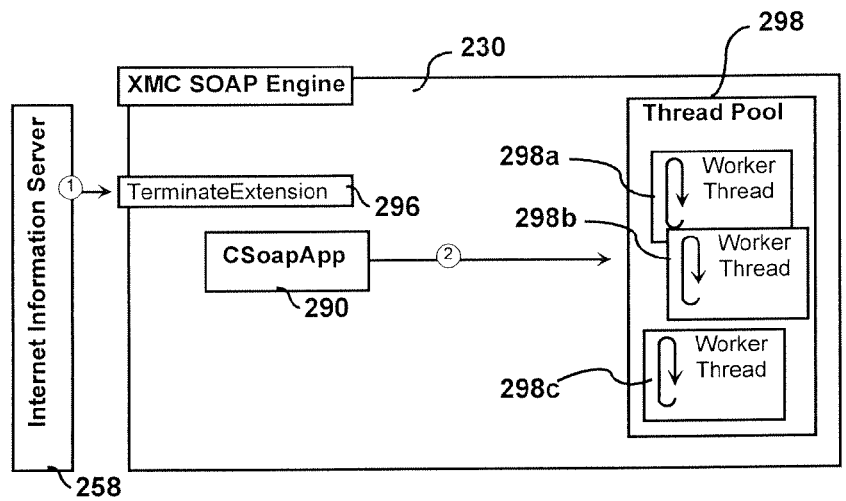
FIG. 27 is a scenario map depicting the clean-up process implemented by the service request format module of FIG. 24.

Referring now to FIG. 26, the following steps occur when the XMC SOAP Engine 230 processes a SOAP request.

First, upon receiving the SOAP service request, the information server module 276 calls the HttpExtensionProc 294, passing along all information about the service request. Inside the function call, the CSoapApp object 290 is used to process the request.

When called, the CSoapApp object 290 creates a CSoapRequest object 300 and passes to it the service request information. Next, the CSoapApp object 290 passes the new CSoapRequest object 300 to a free thread 298a in the thread pool 298 and directs the thread 298a to start processing the request. To process the request, the worker thread 298a first accesses the CSoapRequest object 300 passed thereto by the CsoapApp object 290.

Next, the worker thread 298a uses the ROPE module 256 to parse the response and get the PROGID of the designated component to be used to carry out the request.

The designated object or component specified by the request is accessed from either the XMC Motion Server 250 or the XMC XML Engine 232, and the appropriate method is called based on the SOAP request. Once the method completes, the result and any data returned is packed into a SOAP response envelope and sent back to the client application 228.

Upon termination of the motion control server system 220, the information server module 276 shuts down the XMC SOAP Engine 230. During this process, the XMC SOAP Engine 230 frees all resources used. This clean-up process will now be described in further detail with reference to FIG. 27.

Initially, upon termination of the motion control server system 220, the information server module 276 terminates the extension DLL by calling its TerminateExtension function 296. When called, the CSoapApp object 290 destroys the worker thread pool 298.

The following discussion will describe how to setup the XMC Soap Engine 230 to run with Microsoft Internet Information Server 276 on a Windows 2000 system. The requirements for the setup process are a Windows NT 2000 Server with NTFS formatted hard drives and Microsoft Internet Information (IIS), version 5.0 or above. Internet Explorer 5.0 or above is recommended but is not required.

This section describes how to configure IIS for use with the XMC Soap Engine. To setup IIS, a virtual directory is created where the XMC SOAP engine 230 is to run. When creating the virtual directory, the following settings should be followed:

| | | |
|---|---|---|
| Application Protection | Low (IIS Service) | Run the programs in the virtual directory (ie the XMC SOAP Engine and all COM components that it uses) with the IWAM_<machname> user account access level. |
| Read Access | Enable | Turn on read access so that data files (ie the service.xml and service.sod files) can be read. |
| Execute Permissions | Scripts & Executables | Allow scripts and executables to run (ie the XMC Soap Engine and all COM objects that it uses). |
| Directory Security | Defaults (Anonymous, Integrated Windows authentication) | Use the default directory security settings. |

Next, the XMC Soap Engine IIS Extension is installed and several NT services are prepared to run with the XMC Soap Engine 230. The following sections describe each of these tasks. Please note that the virtual directory must be placed on an NTFS file system and the services.xml and services.sod files must be granted both Read and Execute access.

To setup the XMC Soap Engine ISAPI Extension, the 'Configuration . . . ' button is selected from the 'Properties' page for the virtual directory. On the 'App Mappings' tab, select the 'Add' button to add a new mapping.

Browse for the location of the XMCSOAP.DLL and enter the location into the 'Executable' field. Make sure the location of the XMC Soap Engine 230 is the full path of the file on a Local hard drive; the access level at which the engine 230 runs does not have network access. Next, enter '*.sod' as the 'Extension'. Both the 'All Verbs' and 'Script engine' check boxes should be selected.

This mapping associates the *.sod file extension to the XMC Soap Engine ISAPI Extension DLL. Once mapped, the XMC Soap Engine ISAPI Extension DLL is called by IIS each time IIS encounters a file with the extension .sod from within the virtual directory.

Both the IIS Admin Service and World Wide Web NT services must have 'interact with use' access. To enable each service with this access level, open the 'Computer Management' console by selecting the 'Start|Programs|Administrative Tools|Computer Management' menu item. From the console, select the 'Services and Applications|Services' tree item.

Next for both the 'IIS Admin Service' and 'World Wide Web' services, the following steps are performed. First, the service is opened by double clicking. The 'Log on' tab is then selected. The 'Local system account' radio button is next selected. Finally, the 'Allow service to interact with the desktop' check box is selected, just below the 'Local system account' radio button Since the XMC Soap Engine uses several COM components and NT services. Each of these services should be configured in the following manner to allow proper interaction with the XMC Soap Engine 230.

Using DCOMCNFG.EXE the COM security level on all components as well as on the specific components used by the XMC Soap Engine shall be configured by making the following default properties using DCOMCNFG.EXE:

| Setting | Value | Description |
|---|---|---|
| Enable Distributed COM on this computer | Yes | This will allow the NT services to talk COM objects. |
| Enable COM Internet Services on this computer | No | Not used. |
| Default authentication level | Connect | |
| Default impersonation level | Identity | |

In addition, the following default security settings should be made using DCOMCNFG.EXE:

| Setting | Value | Description |
|---|---|---|
| Default Access Permissions | None set | For extra security, these will only be set on the specific servers. |
| Default Launch Permissions | IUSR_<machinename> | Internet Web User (browsing the site) |
| Default Launch Permissions (cont.) | IWAM_<machinename> | IIS Process access level. |

Each XMC Motion executable must be configured using the DCOMCNFG.EXE utility as well. In particular, the following XMC binaries must be configured: XMC-SRVC.EXE and XMCDBGWN.EXE.

All other XMC modules (which are DLLs) will run under the IIS Process security access level.

For each of the executables listed above, the following security settings should be made using the DCOMCNFG.EXE utility.

| Setting | Value | Description |
|---|---|---|
| Default Access Permissions | IWAM_<machinename> | Internet Web User (browsing the site). |
| Default Launch Permissions | IUSR_<machinename> | Internet Web User (browsing the site) |

As a final security check, each and every EXE and DLL used by the XMC Soap Engine (including the XMC Soap Engine) must have both Read and Execute file permissions. All server files MUST be installed on a local hard drive for they will be accessed from within the IIS Process, which does not have network access.

Similar to the IIS Admin Service and World Wide Web service, the XMC Service must be configured to 'Allow service to interact with the desktop'.

PROGRAM TRANSLATION

Referring now to FIGS. 28-36 of the drawing, depicted therein is a translation system 420 constructed in accordance with, and embodying, the principles of the present invention. The translation system 420 generates commands based on one or more application programs 422 written in one or more source languages. The commands may be sent in real time to a motion device (not shown) but will more typically be sent to a motion services module 424 and/or stored in a command file 426 for use at a later time.

The translation system 420 comprises a program engine 430, a parse engine 432, and an emit engine 434. Generally speaking, the parse engine 432 parses a source application program to obtain a parsed program, and the emit engine 434 converts the parsed program into a target program comprising one or more target commands. The commands may be machine specific but are more likely to conform to one or more hardware independent application programming interfaces (APIs) associated with the motion services module 424. In either case, the target application program conforms to a different language specification than the source application program. The target program is then sent either directly or indirectly to a target device 428.

All logic for translating a source application program to a target application program may be included in one or more parser components 440 and emitter components 442. Preferably, however, the parse engine 432 and emit engine 434 contain logic that is universal to the conversion of all source languages, while the parser components 440 and emitter components 442 contain only the logic required to perform the parsing and converting operations for a particular language. As new languages are developed or adopted, new parser components 440 and emitter components 442 may be developed and "plugged into" the parse engine 432 and the emit engine 434.

The motion services module 424 is or may be conventional and will be described herein only to the extent necessary for a complete understanding of the present invention. The motion services module 424 defines at least one and typically a plurality of APIs 450. As generally described above, the target commands conform to one or more of the APIs 450. For example, a first API 450a represents a standardized API to which hardware manufacturers may conform when designing motion control devices. A second API 450b represents a proprietary API as described, for example, in U.S. Pat. Nos. 5,691,897, 5,867,385, and 6,209,037. As discussed above, the motion services module 24 is not required in all of the scenarios in which the translation system 420 may be used and implemented.

The details of construction and operation of the translation system 420 will now be described in further detail.

The program engine 430 is designed to run any type of ASCII based application program regardless of its internal format. To do this, the program engine 430 uses the parser component 440 files 440 and emitter components 442 to understand (and optionally export) any application program written in a supported source language. The motion services module 424 is then used to run any target programs in an online or offline manner. When run in an online mode, motions occur immediately as the program is run; when running in an offline mode, the command file 426 is generated based on whatever target is in use by the motion services module 424.

The program engine 430, parse engine 432, and emit engine 434 work together to run programs in an online, offline or translated manner. Clients of the motion services module 424 can select or pre-configure the mode for which the program engine 430 runs when processing a source program.

The program engine 430 component is the main component used by the client. The program engine 430 coordinates all other components to carry out tasks necessary to process a given application program file. STEP, RS274D or other program files (ASCII or Binary) are example program file formats that may be passed to the program engine 430 for processing.

The parse engine 432 is responsible for managing all specific data parser component 440s. A primary purpose of the exemplary parse engine 432 is to provide a universal base of functionality within the parse engine 432. Each specific parser component 440 may be as slim and simple as possible to create. As described above, a separate parse engine 432 and parser component 440 is not mandatory; however if the parse engine 432 is not used, the parser component 440 must then implement all parse functionality, including the universal base functionality that would otherwise be provided in the parse engine 432.

The parser components 440 are responsible for parsing the contents of the data format that the parser component 440 understands. For example, a standard EIA-274 parser component 440 would be expected to parse all standard EIA-274 based programs, whereas GE Fanuc G&M Code specific parser component 440 would be expected to parse a GE Fanuc G&M Code variant of the EIA-274 language (or other G&M code language). On another extreme, a STEP-238 parser component 440 would be expected to parse STEP-238 programs.

Like the parse engine 432, the emit engine 434 manages a set of components with the overall task of outputting a specific program format or directly performing actions that represent the actions requested by each line in a program previously parsed. Like the parse engine 432, the emit engine 434 is not required. If the emit engine 434 is not used, each emitter component 442 is expected to implement all specific emit functionality for a given output type and also to implement all generic functionality normally implemented by the emit engine 434.

Each emitter component 442 is responsible for outputting a specific output format. For example, a GE Fanuc type of emitter component 442 may output a GE Fanuc G&M Code variant. On the other hand, a direct emitter type of emitter component 442 may make direct calls to the XMC Motion Service to carry out the operations requested.

The application programs 422 are each associated with a particular language such as G&M Code files or STEP Code files. G&M Code files are CNC program files based on the EIA-274 ANSI standard format and variants thereof. STEP Code files are STEP program files designed to replace the need for G&M Code Files.

Figure 29:
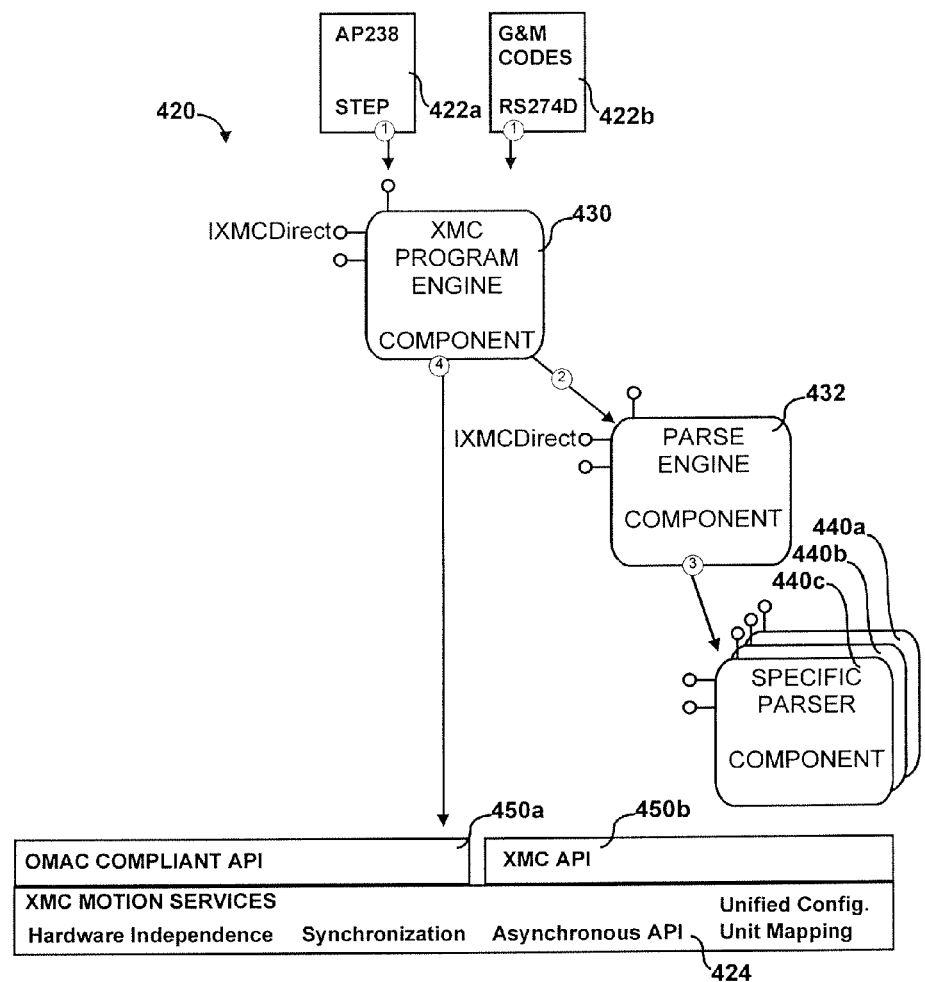
FIGS. 29-31 are scenario maps depicting typical scenarios in which the system of FIG. 28 may be used.

Referring now to FIG. 29, depicted therein is an online run scenario in which the translation system 420 may be used. When programs are run in an online manner, the actions specified in each line of the program are immediately run by the motion services module 424. This mode can be useful when single-stepping and/or testing programs where immediate feedback is needed.

The following steps occur when running a program in the on-line mode.

First the source application program or a portion of the program (via a program buffer) is sent to the program engine 430. Next, the program engine 430 directs the parse engine 432 to parse each line of the program (or program buffer). Optionally, a parser component 440 may take over the operations of the parse engine 432. In this case, the program engine 430 would communicate directly to the appropriate parser component 440.

When using the parse engine 432, the parse engine 432 performs all generic operations (such as file management, etc) and passes the data to the parser component 440 in a data buffer for the parser component 440 to parse. During the process, the parser component 440 tokenizes the data and parses out all parameter data into a universal format.

The tokens and universal data format created by the parse engine 432 and parser component 440 are then used by the program engine 430 to direct the XMC Motion Services (via the XMCAPI or OMAC compliant API) to carry out each operation corresponding to each token.

Figure 30:
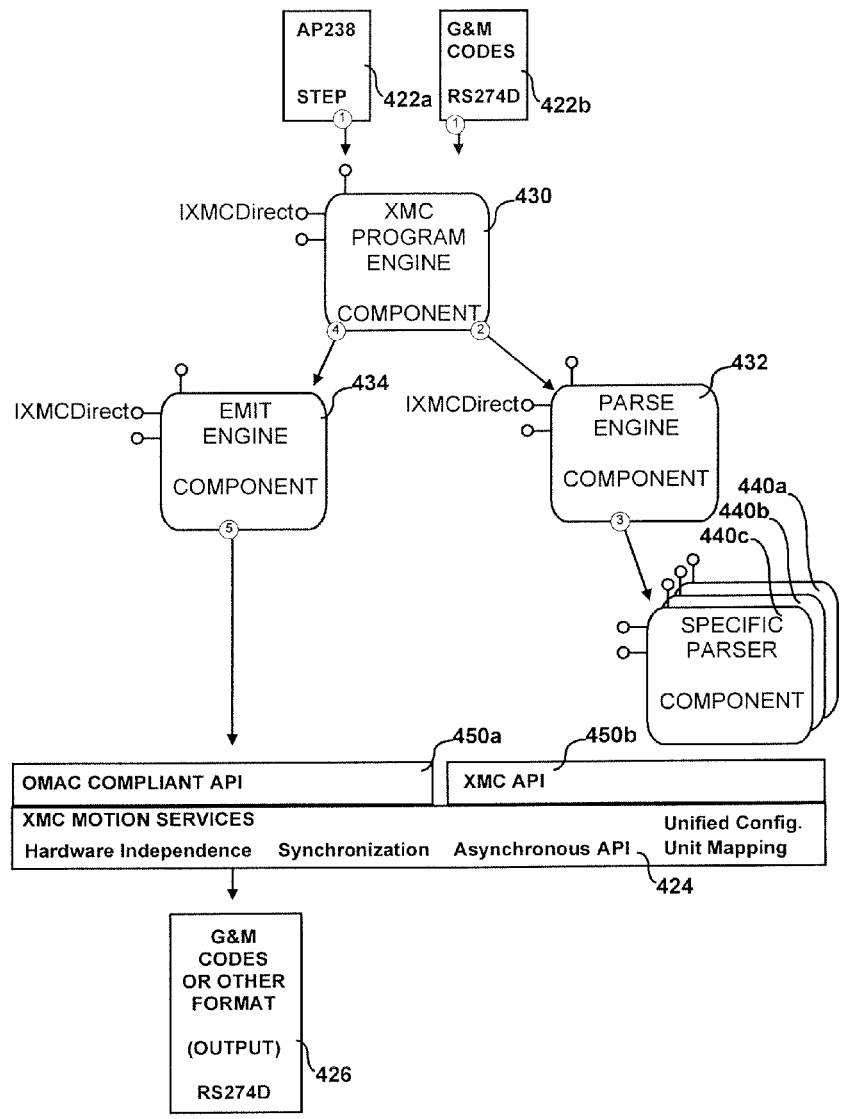

Referring now to FIG. 30, depicted therein is an offline run scenario. When running a program in an offline mode, physical motion may not occur; instead, a target program 426 defining the physical motions that are to take place is created. This new target program 426 is generated based on the specific target driver (not shown) used by the motion services module 424. In addition, the target driver used by the motion services module 424 determines the location of the target program 426. For example, the target program generated may end up residing on the target hardware motion controller in a native program format 'known' by that controller.

The following steps occur when running a program in the on-line mode. First, the source program or a portion thereof is sent (via a program buffer) to the program engine 430. Next, the program engine 430 directs the parse engine 432 to parse each line of the program (or program buffer). As above, one of the optional parser components 440 may take over the operations of the parse engine 432. In this case, the program engine 430 would communicate directly to the parser component 440.

When the parse engine 432 is used, the parse engine 432 performs all generic operations (such as file management, etc) and passes the data to the parser component 440. The data is stored in a data buffer and parsed by the parser component 440. During the process, the parser component 440 tokenizes the data and parses out all parameter data into a universal format. The tokens and universal data format created by the parse engine 432 and parser component 440 are then passed to the emit engine 434 for processing.

When processing the universal tokens, the emit engine 434 first directs the XMC Motion Services to 'Define' a new program or sub-program (for each specified in the universal data). After defining the program (or sub-program) the emit engine 434 calls one of the APIs 450, such as the industry standard first API 450a or the proprietary second API 450b as necessary to perform the actions specified by each token. As described above, the emit component 442 may be used to replace the emit engine 434 and perform specific algorithms (or improvements therein) that the existing emit engine 434 does not perform.

Figure 31:
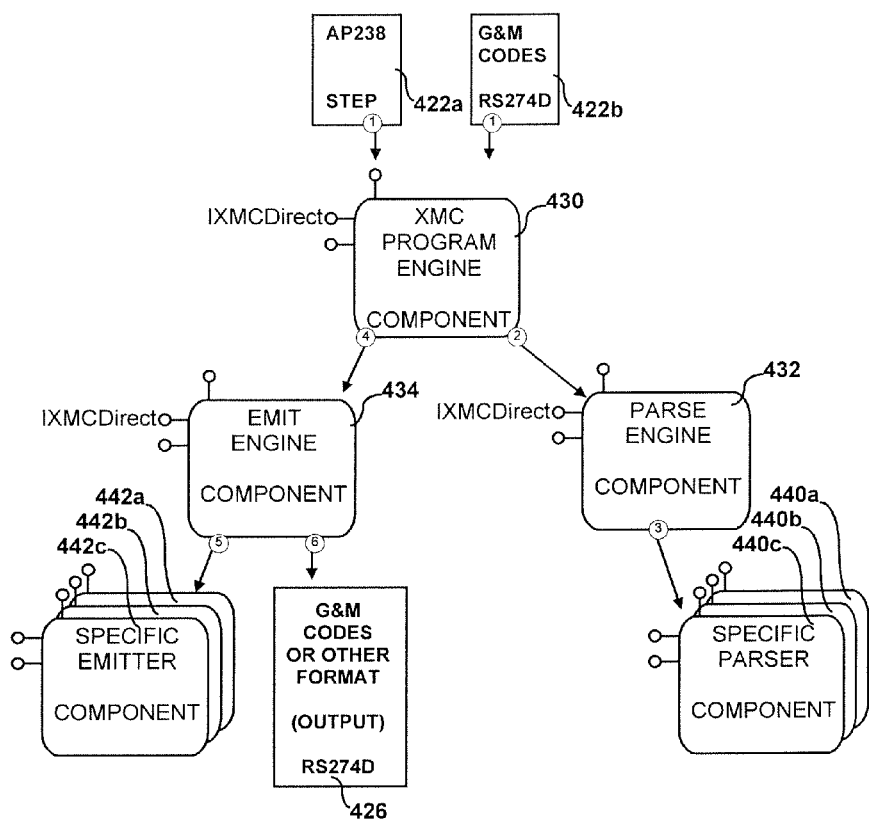

Referring now to FIG. 31, depicted therein is a translation run scenario in which the system 420 may be used. The following steps occur when running a program in the on-line mode. First the source program 422 or a portion thereof is sent (via a program buffer) to the program engine 430. Next, the program engine 430 directs the parse engine 432 to parse each line of the program (or program buffer). As above, an optional parser component 440 may take over the operations of the parse engine 432. In this case, the program engine 430 would communicate directly to the parser component 440.

When using the parse engine 432, the parse engine performs all generic operations (such as file management, etc) and passes the data to the parser component 440 in a data buffer for the parser component 440 to parse. During the process, the parser component 440 tokenizes the data and parses out all parameter data into a universal format. The tokens and universal data format created by the parse engine 432 and parser component 440 are then passed to the emit engine 434 for processing.

When processing the universal tokens, the emit engine 434 directs the emitter component 442 to output each token in the format that it supports. The output information is passed back to the emit engine 434. As above, a specific emit component 442 may be used to replace the emit engine 434 and perform specific algorithms (or improvements therein) that the existing emit engine 434 does not perform.

When the specific data format is received from the emitter component 442, the emit engine 434 then outputs the data buffer to the target data format (i.e. a file, data buffer, or other target). Again, a specific emit component 442 may be used to replace the emit engine 434 and perform specific algorithms (or improvements therein) that the existing emit engine 434 does not perform.

Figure 32:
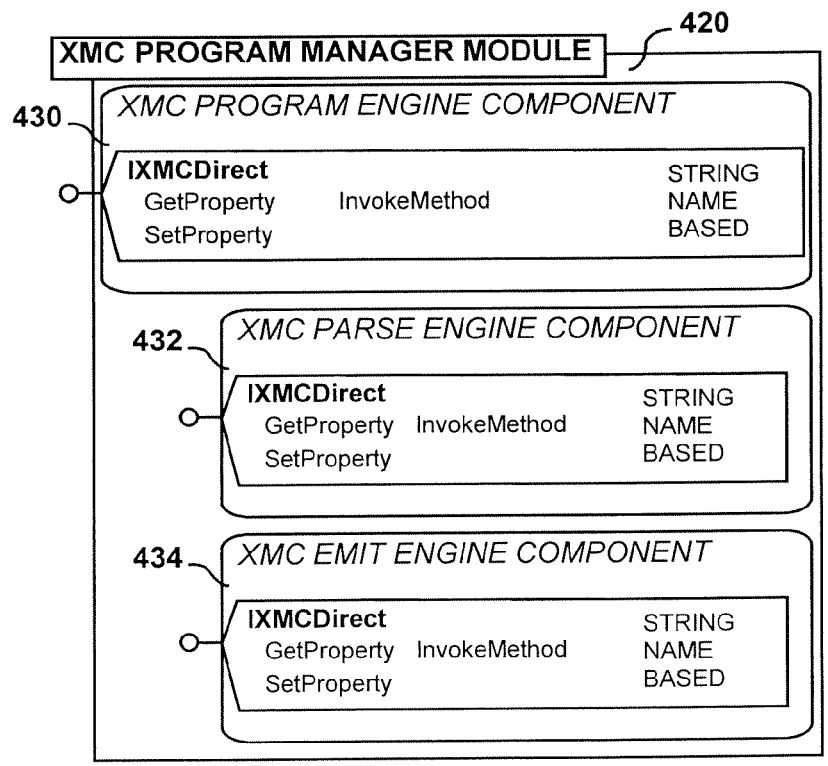
FIG. 32 is a block diagram of a program manager that may be used as part of the software system of FIG. 28.
Figure 28:
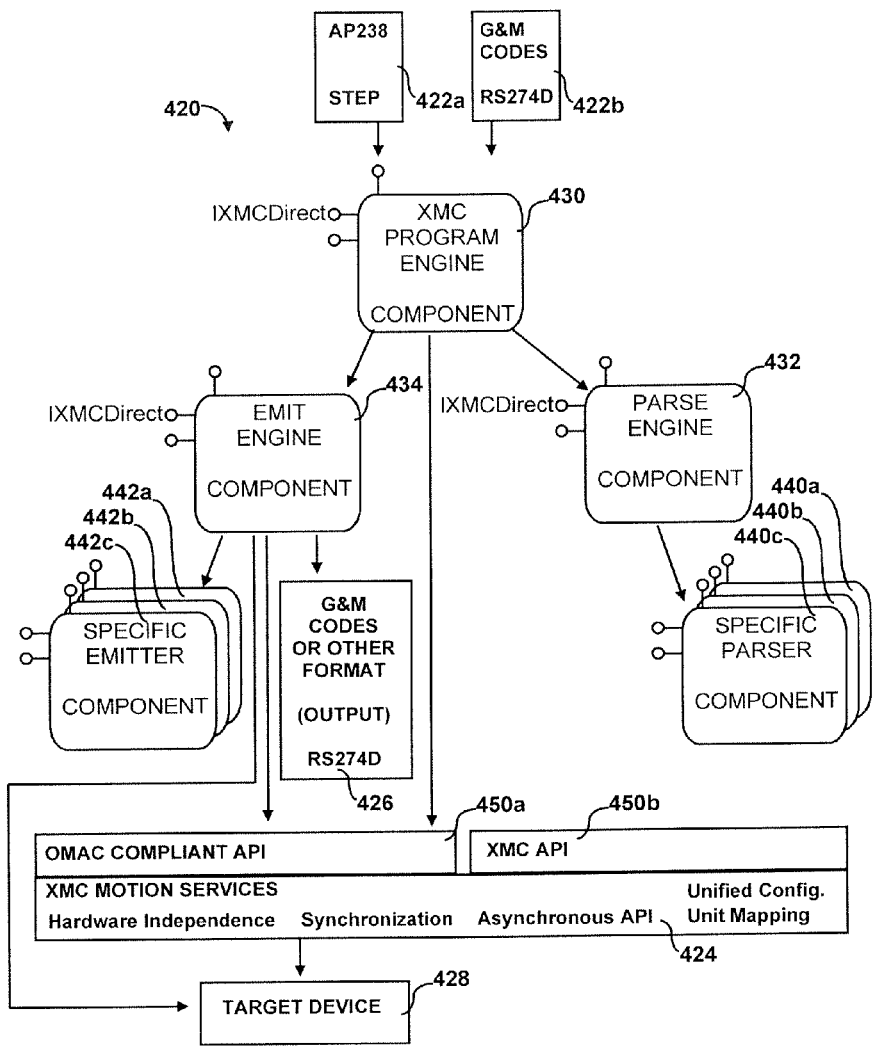
FIG. 28 is a module interaction map of an exemplary software translator system constructed in accordance with the principles of the present invention.

Referring now to FIG. 32, it can be seen that the translation system 420 exposes one and encapsulates several other components. In the exemplary system 420, these components are based on a component technology such as OLE/COM from Microsoft Corporation. Bundling each object within one module is not required as they may be located at any location (i.e. across a network, and so forth), but doing so optimizes all communication between modules. The following diagram shows an example organization of all components making up the translation system 420, where all are housed within a single module such as a DLL (dynamic link library), executable, .NET package or other binary organization.

In the example above, the program engine 430, parse engine 432 and emit engine 434 are all contained within one module. This organization is not required but optimal for overall performance. The specific parser components 440 and specific emitter components 442 will more than likely be housed in separate binary modules to allow third party support for such modules. Again, the location of each component can vary as the program engine 430 can also implement and house specific parser component 440 and emitter components within the main program module. As shown with both the parser engine 432 and emit engine 434 in the diagram above, all specific parser components 440 and emitter components 442 preferably expose the IXMCDirect interface to allow seamless communications between all other modules.

The IXMCDirect interface is used for most communications between all components making up the program engine 430. The IXMCDirect interface comprises the following methods as specified in the standard OLE/COM IDL format:

GetProperty—This method is used to query a specific property from the component implementing the interface.

SetProperty—This method is used to set a specific property from the component implementing the interface.

InvokeMethod—This method is used to invoke a specific action on the component implementing the interface. It should be noted that an action can cause an event to occur, carry out a certain operation, query a value and/or set a value within the component implementing the method.

A more detailed description of each method implemented by the object is described below.

```
IXMCDirect::GetProperty:
  Syntax       HRESULT GetProperty( LPCTSTR pszPropName,
                 LPXMC_PARAM_DATA rgData,
                 DWORD dwCount );
  Parameters   LPCTSTR pszPropName-string name of the property
                 to query.
                 LPXMC_PARAM_DATA rgData-array of
                 XMC_PARAM_DATA types that specify each parameter
                 corresponding to the property. For example, a certain
                 property may be made up of a number of elements-in
                 this case an array of XMC_PARAM_DATA items is
                 returned, one for each element making up the property.
                 In most cases a property is made up of a single element,
                 thus a single element array is passed to this method.
                 For more information on the XMC_PARAM_DATA type,
                 see below.
                 DWORD dwCount-number of XMC_PARAM_DATA
                 elements in the rgData array.
  Return       HRESULT-NOERROR on success, or error code on
  Value        failure.
```

The IXMCDirect::GetProperty method is used to query the property corresponding to the property name 'pszPropName'. Each component defines the properties that it supports.

```
IXMCDirect::SetProperty
  Syntax       HRESULT SetProperty( LPCTSTR pszPropName,
                 LPXMC_PARAM_DATA rgData,
                 DWORD dwCount );
  Parameters   LPCTSTR pszPropName-string name of the property to
                 set.
                 LPXMC_PARAM_DATA rgData-array of
                 XMC_PARAM_DATA types that specify each parameter
                 corresponding to the property. For example, a certain
                 property may be made up of a number of elements-in
                 this case an array of XMC_PARAM_DATA items is
                 returned, one for each element making up the property.
                 In most cases a property is made up of a single element,
                 thus a single element array is passed to this method. For
                 more information on the XMC_PARAM_DATA type, see
                 below.
```

-continued

```
                 DWORD dwCount-number of XMC_PARAM_DATA
                 elements in the rgData array.
  Return Value HRESULT-NOERROR on success, or error code on
                 failure.
```

The IXMCDirect::SetProperty method is used to set a property in the component corresponding to the 'pszPropName' property. For the set of properties supported by the component, see the specific component description.

```
IXMCDirect::InvokeMethod
  Syntax       HRESULT InvokeMethod( DWORD dwMethodIdx,
                 LPXMC_PARAM_DATA rgData,
                 DWORD dwCount );
  Parameters   DWORD dwMethodIdx-number corresponding to the
                 specific method to invoke. For more information on the
                 method indexes available, see the set of namespaces
                 defined for the component.
                 LPXMC_PARAM_DATA rgData [optional]-array of
                 XMC_PARAM_DATA types that specify each parameter
                 for the method called. For more information on the
                 XMC_PARAM_DATA type, see below.
                 NOTE: if no parameters exist for the method called, a
                 value of NULL must be passed in.
                 DWORD dwCount [optional]-number of
                 XMC_PARAM_DATA elements in the rgData array.
                 NOTE: if no parameters exist for the method called, a
                 value of 0 (zero) must be passed in for this parameter.
                 LPXMC_PARAM_DATA rgData [optional]-namespace
                 associated with the instance of the custom extension
                 module added.
  Return Value HRESULT-NOERROR on success, or error code on
                 failure.
```

The IXMCDirect::InvokeMethod method is used to call a specific method implemented by the motion services module 424. For more information on the methods supported, see the description of the specific component.

The following discussion describes the specific methods and properties that each component supports.

The program engine 430 component exposes the following properties and methods via the IXMCDirect interface described above.

Property Summary

No properties are specified for this component at this time.

Methods Summary

The following methods are implemented by the program engine 430 component:

SetComponents—used to set specific parser component 440 and emitter components.

SetInputPath—used to set the root path for all programs that do not specify a path in their name.

SetInputProgram—used to set the active program for which the program engine 430 is to process.

SetInputProgramBuffer—used to set a program buffer (as an alternative to setting the program name) for the program engine 430 to process. When setting a program buffer, previous calls to SetProgram are ignored.

SetOutputPath—used to set the root path for all programs that do not specify a path in their name.

SetOutputProgram—used to set the active program for which the program engine 30 is to process.

SetOutputProgramBuffer—used to set a program buffer (as an alternative to setting the program name) for the program engine 430 to process. When setting a program buffer, previous calls to SetProgram are ignored.

SetBreak—used to set a break-point within a program. Break-points are used when running a program with the 'debug' option enabled.

GetInputProgram—returns the name of the program currently set as the active program in the program engine 430.

GetOutputProgram—returns the name of the program currently set as the active program in the program engine 430.

GetState—returns the state of the program engine 430. For example the run state (single step, run, or idle) are returned.

Run—runs a program (and all sub-programs) from star to finish. If the debug option is enabled, the program is run from the current location to the next break point (if one exists) or to the end of the program.

Reset—resets the current location of the program to the beginning of the program.

RemoveBreak—removes a break-point from the program.

RemoveAllBreaks—removes all break-points from the program.

| IDX_XMC_PROGENG_SetComponents | |
|---|---|
| Namespace | IDX_XMC_NS_PROGENGINE |
| Syntax | IDX_XMC_PROGENG_SetComponents, rgData[ ], dwCount = 2 |
| Parameters | rgData[0]—(string) prog-id or CLSID (in string format) of the parser component 440 to use. |
| | rgData[1]—(string) prog-id or CLSID (in string format) of the emitter component 442 to use. NOTE: if no emitter is provided (i.e. this parameter is not present) then the XMC Motion Services are used directly in either an online or offline mode. |
| Return Val | NOERROR on success, or an error code on failure. |

The IDX_XMC_PROGENG_SetComponents method is used to set specific parser component 440 and emitter components used to process both input and output data.

| IDX_XMC_PROGENG_SetInputPath | |
|---|---|
| Namespace | IDX_XMC_NS_PROGENGINE |
| Syntax | IDX_XMC_PROGENG_SetInputPath, rgData[ ], dwCount = 1 |
| Parameters | rgData[0]—(string) name of the program path in standard UNC format. Unless otherwise specified in the specific program name, the path specified by this method is used as the root path for all programs. |
| Return Val | NOERROR on success, or an error code on failure. |

The IDX_XMC_PROGENG_SetInputPath method is used to set the root path for all programs. Unless a program name already has a path pre-pended to it, the path specified by this method is used to reference all programs and sub-programs.

| IDX_XMC_PROGENG_SetInputProgram | |
|---|---|
| Namespace | IDX_XMC_NS_PROGENGINE |
| Syntax | IDX_XMC_PROGENG_SetInputProgram, rgData[ ], dwCount = 1 |
| Parameters | rgData[0]—(string) name of the program to set as the active program. |
| Return Val | NOERROR on success, or an error code on failure. |

The IDX_XMC_PROGENG_SetInputProgram method is used to set the active program that the program engine 430 is to process.

| IDX_XMC_PROGENG_SetInputProgramBuffer | |
|---|---|
| Namespace | IDX_XMC_NS_PROGENGINE |
| Syntax | IDX_XMC_PROGENG_SetInputProgramBuffer, rgData[ ], dwCount = 2 |
| Parameters | rgData[0]—(string) pointer to the string buffer containing the program data. |
| | rgData[1]—(number) number of characters in the string buffer. |
| Return Val | NOERROR on success, or an error code on failure. |

The IDX_XMC_PROGENG_SetInputProgramBuffer method is used to set the active program buffer that the program engine 430 is to process. Any previous calls to SetInputProgram are overridden after making this call.

| IDX_XMC_PROGENG_SetOutputPath | |
|---|---|
| Namespace | IDX_XMC_NS_PROGENGINE |
| Syntax | IDX_XMC_PROGENG_SetOutputPath, rgData[ ], dwCount = 1 |
| Parameters | rgData[0]—(string) name of the program path in standard UNC format. Unless otherwise specified in the specific program name, the path specified by this method is used as the root path for all programs. |
| Return Val | NOERROR on success, or an error code on failure. |

The IDX_XMC_PROGENG_SetOutputPath method is used to set the root path for all output programs. Unless a program name already has a path pre-pended to it, the path specified by this method is used to reference all programs and sub-programs.

| IDX_XMC_PROGENG_SetOutputProgram | |
|---|---|
| Namespace | IDX_XMC_NS_PROGENGINE |
| Syntax | IDX_XMC_PROGENG_SetOutputProgram, rgData[ ], dwCount = 1 |
| Parameters | rgData[0]—(string) name of the program to set as the active output program. |
| Return Val | NOERROR on success, or an error code on failure. |

The IDX_XMC_PROGENG_SetOutputProgram method is used to set the active output program that the program engine 430 is to create.

| IDX_XMC_PROGENG_SetOutputProgramBuffer | |
|---|---|
| Namespace | IDX_XMC_NS_PROGENGINE |
| Syntax | IDX_XMC_PROGENG_SetOutputProgramBuffer, rgData[ ], dwCount = 2 |
| Parameters | rgData[0]—(string) pointer to the string buffer to be used for program output. |
| | rgData[1]—(number) size of the string buffer. |
| Return Val | NOERROR on success, or an error code on failure. |

The IDX_XMC_PROGENG_SetOutputProgramBuffer method is used to set the active output program buffer that the program engine 430 is to process. Any previous calls to SetOutputProgram are overridden after making this call.

| IDX_XMC_PROGENG_SetBreak | |
|---|---|
| Namespace | IDX_XMC_NS_PROGENGINE |
| Syntax | IDX_XMC_PROGENG_SetBreak, rgData[ ], dwCount = 2 |
| Parameters | rgData[0]—(string) program name for the break (i.e. sub-program, or main program).<br>rgData[2]—(number) line number for the break-point. |
| Return Val | NOERROR on success, or an error code on failure. |

The IDX_XMC_PROGENG_SetBreak method is used to set a break-point in either the main program or a sub-program used by the main program.

| IDX_XMC_PROGENG_GetInputProgram | |
|---|---|
| Namespace | IDX_XMC_NS_PROGENGINE |
| Syntax | IDX_XMC_PROGENG_GetProgram, rgData[ ], dwCount = 1-4 |
| Parameters | rgData[0]—(string) the active program name is returned in this parameter.<br>rgData[1]—(string) [optional] the active sub-program name is returned in this parameter.<br>rgData[2]—(number) [optional] the current line in the main program is returned in this parameter.<br>rgData[3]—(number) [optional] the current line in the active sub-program (if any) is returned in this parameter. |
| Return Val | NOERROR on success, or an error code on failure. |

The IDX_XMC_PROGENG_GetInputProgram method is used to retrieve the current program and sub-program (if available) names. If a buffer is used instead of a program, a value of "internal buffer" is returned.

| IDX_XMC_PROGENG_GetOutputProgram | |
|---|---|
| Namespace | IDX_XMC_NS_PROGENGINE |
| Syntax | IDX_XMC_PROGENG_GetOutputProgram, rgData[ ], dwCount = 1-4 |
| Parameters | rgData[0]—(string) the active output program name is returned in this parameter.<br>rgData[1]—(string) [optional] the active output sub-program name is returned in this parameter.<br>rgData[2]—(number) [optional] the current line in the main output program is returned in this parameter.<br>rgData[3]—(number) [optional] the current line in the active output sub-program (if any) is returned in this parameter. |
| Return Val | NOERROR on success, or an error code on failure. |

The IDX_XMC_PROGENG_GetOutputProgram method is used to retrieve the current output program and sub-program (if available) names. If a buffer is used instead of a program, a value of "internal buffer" is returned.

| IDX_XMC_PROGENG_GetState | |
|---|---|
| Namespace | IDX_XMC_NS_PROGENGINE |
| Syntax | IDX_XMC_PROGENG_GetState, rgData[ ], dwCount = 1 |
| Parameters | rgData[0]—(number: DWORD) the current state of the program engine 430 is returned in this parameter where valid date values are as follows:<br>XMC_PROGENG_STATE_IDLE—returned when the program engine 430 is not actively processing any programs.<br>XMC_PROGENG_STATE_RUNNING—returned when the program engine 430 is actively running a program.<br>XMC_PROGENG_STATE_DEBUG—returned when the program engine 430 is actively running a program and the debug option is enabled. |

| IDX_XMC_PROGENG_GetState | |
|---|---|
| | XMC_PROGENG_STATE_SINGLESTEP—returned when the program engine 430 is actively running a program in the single step mode.<br>NOTE: other than the 'idle' state, all other states may be bit-wise OR'ed together. |
| Return Val | NOERROR on success, or an error code on failure. |

The IDX_XMC_PROGENG_GetState method is used to retrieve the current state of the program engine 430.

| IDX_XMC_PROGENG_Run | |
|---|---|
| Namespace | IDX_XMC_NS_PROGENGINE |
| Syntax | IDX_XMC_PROGENG_Run, rgData[ ], dwCount = 1 |
| Parameters | rgData[0]—(number: DWORD) the current mode for which the program should be run.<br>XMC_PROGENG_RUNMODE_SINGLESTEP—directs the program engine 430 to only run a single line of the program and then stop.<br>XMC_PROGENG_RUNMODE_DEBUG—directs the program engine 430 to run in debug mode causing any previously set break-points to take effect. The program is run either up until the next break-point of the end of the program, whichever comes first. |
| Return Val | NOERROR on success, or an error code on failure. |

The IDX_XMC_PROGENG_Run method is used to run the active program currently set in the program engine 430.

| IDX_XMC_PROGENG_Reset | |
|---|---|
| Namespace | IDX_XMC_NS_PROGENGINE |
| Syntax | IDX_XMC_PROGENG_Reset, rgData[ ] = NULL, dwCount = 0 |
| Parameters | No parameters |
| Return Val | NOERROR on success, or an error code on failure. |

The IDX_XMC_PROGENG_Run method is used to stop running a program and reset the current position in the active program to the beginning of the program.

| IDX_XMC_PROGENG_RemoveBreak | |
|---|---|
| Namespace | IDX_XMC_NS_PROGENGINE |
| Syntax | IDX_XMC_PROGENG_RemoveBreak, rgData[ ], dwCount = 2 |
| Parameters | rgData[0]—(string) program name for the break (i.e. sub-program, or main program).<br>rgData[2]—(number) line number for the break-point. |
| Return Val | NOERROR on success, or an error code on failure. |

The IDX_XMC_PROGENG_RemoveBreak method is used to remove a break-point in either the main program or a sub-program used by the main program.

| IDX_XMC_PROGENG_RemoveAllBreaks | |
|---|---|
| Namespace | IDX_XMC_NS_PROGENGINE |
| Syntax | IDX_XMC_PROGENG_RemoveAllBreaks, rgData[ ] = NULL, dwCount = 0 |
| Parameters | No parameters |
| Return Val | NOERROR on success, or an error code on failure. |

The IDX_XMC_PROGENG_RemoveAllBreaks method is used to remove all break-points previously set.

The parser engine component 432 exposes the following properties and methods via the IXMCDirect interface described above.

Property Summary

No properties are specified for this component at this time.

Methods Summary

The following methods are implemented by the parser engine component:

SetInputRoot—This method is used to set the root path to the input data. For example, when parsing file based data, the root is the program path where all programs that do not have pre-pended paths are retrieved from.

SetInput—This method sets the active input data to be parsed.

GetInput—This method retrieves the current input name being parsed.

Step—This method advances the current program position to the next line in the program.

Reset—This method resets the current program position to the start of the active program.

ParseLine—This method parses the current line in the active program and returns a universal set of tokens and parameters that describe the instructions on the current program line.

| IDX_XMC_PARSEENG_SetInputRoot | |
|---|---|
| Namespace | IDX_XMC_NS_PROGENGINE |
| Syntax | IDX_XMC_PARSEENG_SetInputRoot, rgData[ ], dwCount = 1 |
| Parameters | rgData[0] - (string) name of the input path. For example, when using file based programs, a path is specified in standard UNC format. Unless otherwise specified in the specific program name, the path specified by this method is used as the root path for all programs. |
| Return Val | NOERROR on success, or an error code on failure. |

The IDX_XMC_PARSEENG_SetInputRoot method is used to set the root path for all programs. Unless a program name already has a path pre-pended to it, the path specified by this method is used to reference all programs and sub-programs.

| IDX_XMC_PARSEENG_SetInput | |
|---|---|
| Namespace | IDX_XMC_NS_PROGENGINE |
| Syntax | IDX_XMC_PARSEENG_SetInput, rgData[ ], dwCount = 2 |
| Parameters | rgData[0] - (number:DWORD) flag specifying the input type. The following input flags are supported: XMC_PROGENG_INPUT_FILE - specifies that the input type is a file and the following parameter is a filename. XMC_PROGENG_INPUT_BUFFER - specifies that the input type is a text buffer and the following 2 parameters are the buffer and buffer length. rgData[1] - (string) name of the program or program buffer depending on the input type. rgData[2] - (number) size of program buffer (only valid when using the XMC_PROGENG_INFPUT_BUFFER input type). |
| Return Val | NOERROR on success, or an error code on failure. |

The IDX_XMC_PARSEENG_SetInput method is used to set the active program, program buffer, or other program source that the parse engine 432 is to process.

| IDX_XMC_PARSEENG_GetInput | |
|---|---|
| Namespace | IDX_XMC_NS_PROGENGINE |
| Syntax | IDX_XMC_PARSEENG_GetInput, rgData[ ], dwCount = 1 |
| Parameters | rgData[0] - (number:DWORD) flag specifying the input type. The following input flags are supported: XMC_PROGENG_INPUT_FILE - specifies that the input type is a file and the following parameter is a filename. XMC_PROGENG_INPUT_BUFFER - specifies that the input type is a text buffer and the following 2 parameters are the buffer and buffer length. rgData[1] - (string) name of the program or program buffer depending on the input type. rgData[2] - (number) size of program buffer (only valid when using the XMC_PROGENG_INFPUT_BUFFER input type). |
| Return Val | NOERROR on success, or an error code on failure. |

The IDX_XMC_PARSEENG_GetInput method is used to retrieve the current program or sub-program (if available) name.

| IDX_XMC_PARSEENG_Step | |
|---|---|
| Namespace | IDX_XMC_NS_PROGENGINE |
| Syntax | IDX_XMC_PARSEENG_Step, rgData[ ], dwCount = 0-1 |
| Parameters | rgData[0] [optional] - (number:DWORD flags specifying how to make the step operation. Currently this flag is reserved and should be set to 0 (zero). |
| Return Val | S_OK on success, S_FALSE at end of data, or an error code on failure. |

The IDX_XMC_PARSEENG_Step method is used to step to the next line in the active program currently set in the parse engine 432.

| IDX_XMC_PARSEENG_Reset | |
|---|---|
| Namespace | IDX_XMC_NS_PROGENGINE |
| Syntax | IDX_XMC_PARSEENG_Reset, rgData[ ] = NULL, dwCount = 0 |
| Parameters | No parameters |
| Return Val | NOERROR on success, or an error code on failure. |

The IDX_XMC_PARSEENG_Reset method is used to reset the current position in the active program to the beginning of the program.

| IDX_XMC_PARSEENG_ParseLine | |
|---|---|
| Namespace | IDX_XMC_NS_PROGENGINE |
| Syntax | IDX_XMC_PARSEENG_ParseLine, rgData[ ] = NULL, dwCount = 1 to 1024 max |
| Parameters | rgData[0]- (out - number) this out parameter contains the actual number of tokens returned for the line. rgData[1]- (out - number) this out parameter contains the first token identifier in the set of tokens. rgData[2]- (out - number) this out parameter contains the number of parameters returned for the first token identifier. rgData[3]- (out - number) this out parameter contains the first parameter returned for the first token identifier. NOTE: the patter for element 1-3 continues for all tokens and parameters. For example, a token pattern containing 2 tokens with 1 parameter for the first and 2 parameters for the second would have the following array pattern: rgData[0] = 2 (for 2 tokens) rgData[1] = token #1 identifier |

| IDX_XMC_PARSEENG_ParseLine | |
|---|---|
| | rgData[2] = token #1 parameter count = 1 (for 1 parameter)<br>rgData[3] = token #1 parameter #1<br>rgData[4] = token #2 identifier<br>rgData[5] = token #2 parameter count = 2 (for 2 parameters)<br>rgData[6] = token #2 parameter #1<br>rgData[7] = token #2 parameter #2 |
| Return Val | NOERROR on success, or an error code on failure. |

The IDX_XMC_PARSEENG_ParseLine method is used to parse the current line into a universal token and associated parameters.

The XMC emit engine component 434 exposes the following properties and methods via the IXMCDirect interface described above.

Property Summary

No properties are specified for this component at this time.

Methods Summary

The following methods are implemented by the emit engine 434 component:

SetOutputRoot—This method is used to set the root path for any data output. For example, when emitting file based data, the root is the program path where all programs that do not have pre-pended paths are created.

SetOutput—This method sets the active output target for emitted data.

GetOutput—This method retrieves the current output name that is emitted to.

EmitLine—This method uses a set of universal tokens and associated parameters to create a line of instructions in the target emitter format.

| IDX_XMC_EMITENG_SetOutputRoot | |
|---|---|
| Namespace | IDX_XMC_NS_PROGENGINE |
| Syntax | IDX_XMC_EMITENG_SetOutputRoot, rgData[ ],<br>dwCount = 1 |
| Parameters | rgData[0] - (string) name of the output path. For example, when using file based programs, a path is specified in standard UNC format. Unless otherwise specified in the specific program name, the path specified by this method is used as the root path for all programs. |
| Return Val | NOERROR on success, or an error code on failure. |

The IDX_XMC_EMITENG_SetOutputRoot method is used to set the root path for all programs. Unless a program name already has a path pre-pended to it, the path specified by this method is used to reference all programs and sub-programs.

| IDX_XMC_EMITENG_SetOutput | |
|---|---|
| Namespace | IDX_XMC_NS_PROGENGINE |
| Syntax | IDX_XMC_EMITENG_SetOutput, rgData[ ],<br>dwCount = 2 |
| Parameters | rgData[0] - (number:DWORD) flag specifyint the output type. The following input flags are supported:<br>XMC_PROGENG_OUTPUT_FILE - specifies that the output type is a file and the following parameter is a filename.<br>XMC_PROGENG_OUTPUT_BUFFER - specifies that the output type is a text buffer and the following 2 parameters are the buffer and buffer length.<br>rgData[1] - (string) name of the program or program buffer depending on the output type. |

| IDX_XMC_EMITENG_SetOutput | |
|---|---|
| | rgData[2] - (number size of program buffer (only valid when using the XMC_PROGENG_OUTPUT_BUFFER output type). |
| Return Val | NOERROR on success, or an error code on failure. |

The IDX_XMC_EMITENG_SetOutput method is used to set the active output program, program buffer, or other program source that the emit engine 434 outputs all program data to.

| IDX_XMC_EMITENG_GetOutput | |
|---|---|
| Namespace | IDX_XMC_NS_PROGENGINE |
| Syntax | IDX_XMC_EMITENG_GetOutput, rgData[ ],<br>dwCount = 1 |
| Parameters | rgData[0] - (number:DWORD) flag specifying the output type. The following input flags are supported:<br>XMC_PROGENG_OUTPUT_FILE - specifies that the output type is a file and the following parameter is a filename.<br>XMC_PROGENG_OUTPUT_BUFFER - specifies that the output type is a text buffer and the following 2 parameters are the buffer and buffer length.<br>rgData[1] - (string) name of the program or program buffer depending on the output type.<br>rgData[2] - (number) size of program buffer (only valid when using the XMC_PROGENG_OUTPUT_BUFFER output type). |
| Return Val | NOERROR on success, or an error code on failure. |

The IDX_XMC_EMITENG_GetOutput method is used to retrieve the current program or sub-program (if available) name.

| IDX_XMC_EMITENG_EmitLine | |
|---|---|
| Namespace | IDX_XMC_NS_PROGENGINE |
| Syntax | IDX_XMC_EMITENG_EmitLine, rgData[ ] = NULL,<br>dwCount = 1 to 1024 max |
| Parameters | rgData[0]- (out - string) this out parameter contains the resulting line of instructions in the native format produced by the emitter.<br>rgData[1]- (out - number) this out parameter contains size of the output buffer contained in parameter one.<br>rgData[0]- (in - number) this in parameter contains the actual number of tokens returned for the line.<br>rgData[1]- (in - number) this in parameter contains the first token identifier in the set of tokens.<br>rgData[2]- (in - number) this in parameter contains the number of parameters returned for the first token identifier.<br>rgData[3]- (in - number) this in parameter contains the first parameter returned for the first token identifier.<br>NOTE: the patter for element 1-3 continues for all tokens and parameters. For example, a token pattern containing 2 tokens with 1 parameter for the first and 2 parameters for the second would have the following array pattern:<br>rgData[0] = 2 (for 2 tokens)<br>rgData[1] = token #1 identifier<br>rgData[2] = token #1 parameter count = 1 (for 1 parameter)<br>rgData[3] = token #1 parameter #1<br>rgData[4] = token #2 identifier<br>rgData[5] = token #2 parameter count = 2 (for 2 parameters)<br>rgData[6] = token #2 parameter #1<br>rgData[7] = token #2 parameter #2 |
| Return Val | NOERROR on success, or an error code on failure. |

The IDX_XMC_EMITENG_EmitLine method is used to emit the current line based on a universal token set and associated parameters.

Each parser component 440 exposes the following properties and methods via the IXMCDirect interface described above.

Property Summary

No properties are specified for this component at this time.

Methods Summary

The following methods are implemented by each parser component 440 component:

ParseLine—This method parses a single line of instructions and returns a set of universal token identifiers and associated parameters for the line of instructions.

| IDX_XMC_PARSEENG_ParseLine | |
|---|---|
| Namespace | IDX_XMC_NS_PROGENGINE |
| Syntax | IDX_XMC_PARSEENG_ParseLine, rgData[ ] = NULL, dwCount = 1 to 1024 max |
| Parameters | rgData[0]- (out - number) this out parameter contains the actual number of tokens returned for the line.<br>rgData[1]- (out - number) this out parameter contains the first token identifier in the set of tokens.<br>rgData[2]- (out - number) this out parameter contains the number of parameters returned for the first token identifier.<br>rgData[3]- (out - number) this out parameter contains the first parameter returned for the first token identifier.<br>NOTE: the patter for element 1-3 continues for all tokens and parameters. For example, a token pattern containing 2 tokens with 1 parameter for the first and 2 parameters for the second would have the following array pattern:<br>rgData[0] = 2 (for 2 tokens)<br>rgData[1] = token #1 identifier<br>rgData[2] = token #1 parameter count = 1 (for 1 parameter)<br>rgData[3] = token #1 parameter #1<br>rgData[4] = token #2 identifier<br>rgData[5] = token #2 parameter count = 2 (for 2 parameters)<br>rgData[6] = token #2 parameter #1<br>rgData[7] = token #2 parameter #2 |
| Return Val | NOERROR on success, or an error code on failure. |

The IDX_XMC_PARSEENG_ParseLine method is used to parse the current line into a universal token and associated parameters.

Each emitter component 442 exposes the following properties and methods via the IXMCDirect interface described above.

Property Summary

No properties are specified for this component at this time.

Methods Summary

The following methods are implemented by each emitter component 442:

EmitLine—This method converts a set of universal tokens and associated parameters into a line of native instructions using the native format supported by the target emitter.

| IDX_XMC_EMITENG_EmitLine | |
|---|---|
| Namespace | IDX_XMC_NS_PROGENGINE |
| Syntax | IDX_XMC_EMITENG_EmitLine, rgData[ ] = NULL, dwCount = 1 to 1024 max |
| Parameters | rgData[0]- (out - string) this out parameter contains the resulting line of instructions in the native format produced by the emitter.<br>rgData[1]- (out - number) this out parameter contains size of the output buffer contained in parameter one.<br>rgData[0]- (in - number) this in parameter contains the actual number of tokens returned for the line.<br>rgData[1]- (in - number) this in parameter contains the first token identifier in the set of tokens.<br>rgData[2]- (in - number) this in parameter contains the number of parameters returned for the first token identifier.<br>rgData[3]- (in - number) this in parameter contains the first parameter returned for the first token identifier.<br>NOTE: the patter for element 1-3 continues for all tokens and parameters. For example, a token pattern containing 2 tokens with 1 parameter for the first and 2 parameters for the second would have the following array pattern:<br>rgData[0] = 2 (for 2 tokens)<br>rgData[1] = token #1 identifier<br>rgData[2] = token #1 parameter count = 1 (for 1 parameter)<br>rgData[3] = token #1 parameter #1<br>rgData[4] = token #2 identifier<br>rgData[5] = token #2 parameter count = 2 (for 2 parameters)<br>rgData[6] = token #2 parameter #1<br>rgData[7] = token #2 parameter #2 |
| Return Val | NOERROR on success, or an error code on failure. |

The IDX_XMC_EMITENG_EmitLine method is used to emit the current line based on a universal token set and associated parameters.

The following discussion contains the definitions of all special types used by the methods and properties of each component making up the program engine 430.

XMC_PARAM_DATA Structure

All methods exposed by each component in the program engine 430 system use the standard XMC parameters set to describe data used to set and query properties as well as invoke methods. The standard parameters are in the following format:

pObj->InvokeMethod(LPXMC_PARAM_DATA rgData,
        DWORD dwCount);

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
  LNG_PARAM_DATATYPE adt;
  union
  {
    double df;
    LPTSTR psz;
  };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
|---|---|
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. |

-continued

| LNG_PARAM_DATATYPE | Description |
|---|---|
| | LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

The following discussion contains examples of the three methods that the program engine 430 processes program data: online, offline and translation.

All examples shown in this section (including the online, offline and translation examples) use the same input data. For this reason, the first step of translating the input data to the intermediate universal tokenized data is presented in this section. Each following example, builds on the tokenized data presented in this section for the main difference in each is in how the output data and/or actions are produced.

The following source code is used as the G&M Code ASCII text file input to the program engine 430.

(program filename: "c:\temp\test.cnc")
O0003
N005 G91 G28 X0 Y0 Z0
N010 G54
N015 G90 S1300 M03 T02
N020 G00 X1. Y1.
N025 G43 H01 Z.1
N030 M08

When processing the input data, the following is an example of the intermediate universal tokens (and associated parameters) that represent the program after it is parsed.

| Input Line | Tokens Generated |
|---|---|
| O0003 | rgData[0] = 2 |
| | rgData[1] = TOK_PROGNAME |
| | rgData[2] = 1 |
| | rgData[3] = "O0003" |
| | rgData[4] = TOK_ENDLINE |
| | rgData[5] = 0 |
| N005 G91 G28 X0 Y0 Z0 | rgData[0] = 7 |
| | rgData[1] = TOK_LINEID |
| | rgData[2] = 1 |
| | rgData[3] = 5 |
| | rgData[4] = TOK_MOVE_SETINCMODE |
| | rgData[5] = 0 |
| | rgData[6] = TOK_MOVE_TOHOME |
| | rgData[7] = 1 |
| | rgData[8] = 3 (use next 3 tokens) |
| | rgData[9] = TOK_POS_X |
| | rgData[10] = 1 |
| | rgData[11] = 0 |
| | rgData[12] = TOK_POS_Y |
| | rgData[13] = 1 |
| | rgData[14] = 0 |
| | rgData[15] = TOK_POS_Z |
| | rgData[16] = 1 |
| | rgData[17] = 0 |
| | rgData[18] = TOK_ENDLINE |
| | rgData[19] = 0 |
| N010 G54 | rgData[0] = 3 |
| | rgData[1] = TOK_LINEID |
| | rgData[2] = 1 |
| | rgData[3] = 10 |
| | rgData[4] = TOK_MOVE_SETZEROPOS |
| | rgData[5] = 0 |
| | rgData[18] = TOK_ENDLINE |
| | rgData[19] = 0 |
| N015 G90 S1300 M03 T02 | rgData[0] = 6 |
| | rgData[1] = TOK_LINEID |
| | rgData[2] = 1 |
| | rgData[3] = 15 |
| | rgData[4] = TOK_MOVE_SETABSMODE |
| | rgData[5] = 0 |
| | rgData[6] = TOK_SPINDLE_SETRATE |
| | rgData[7] = 1 |
| | rgData[8] = 1300 |
| | rgData[9] = TOK_SPINDLE_ON |
| | rgData[10] = 1 |
| | rgData[11] = 1 (1 = CW, −1 = CCW) |
| | rgData[12] = TOK_TOOL_SELECT |
| | rgData[13] = 1 |
| | rgData[14] = 2 |
| | rgData[15] = TOK_ENDLINE |
| | rgData[16] = 0 |
| N020 G00 X1. Y1. | rgData[0] = 5 |
| | rgData[1] = TOK_LINEID |
| | rgData[2] = 1 |
| | rgData[3] = 20 |
| | rgData[4] = TOK_MOVE_SETRAPID |
| | rgData[5] = 0 |
| | rgData[6] = TOK_POS_X |
| | rgData[7] = 1 |
| | rgData[8] = 1 |
| | rgData[9] = TOK_POS_Y |
| | rgData[10] = 1 |
| | rgData[11] = 1 |
| | rgData[12] = TOK_ENDLINE |
| | rgData[13] = 0 |
| N025 G43 H01 Z.1 | rgData[0] = 5 |
| | rgData[1] = TOK_LINEID |
| | rgData[2] = 1 |
| | rgData[3] = 25 |
| | rgData[4] = TOK_OFFSET_TOOL_LEN |
| | rgData[5] = 1 |
| | rgData[6] = 1 (use next 1 tokens) |
| | rgData[7] = TOK_OFFSET_SELECT |
| | rgData[8] = 1 |
| | rgData[9] = 1 |
| | rgData[10] = TOK_POS_Z |
| | rgData[11] = 1 |
| | rgData[12] = 0.1 |
| | rgData[13] = TOK_ENDLINE |
| | rgData[14] = 0 |
| N030 M08 | rgData[0] = 3 |
| | rgData[1] = TOK_LINEID |
| | rgData[2] = 1 |
| | rgData[3] = 25 |
| | rgData[4] = TOK_COOLANT_ON |
| | rgData[5] = 0 |
| | rgData[6] = TOK_ENDLINE |
| | rgData[7] = 0 |

The following pseudo code demonstrates how the program engine 430 is used to convert the input data file shown above into a the intermediate universal tokenized data and associated parameters above.

```
IXMCDirect* pProgEng;
HRESULT hr;
XMC_PARAM_DATA rgData[128];
hr=CoCreateInstance(CLSID_ProgEng, . . . ,
    IID_IXMCDirect,
    (LPVOID)&pProgEng);
rgData[0].adt=LNG_ADT_STAT_STRING;
rgData[0].psz="XMC.PARSER.GCODE.RS274";
hr=pProgEng->InvokeMethod(IDX_XMC_PROGENG_
    SetComponents, rgData, 1);
rgData[0].adt=LNG_ADT_STAT_STRING;
```

```
rgData[0].psz="c:\temp";
hr=pProgEng->InvokeMethod(IDX_XMC_PROGENG_
    SetInputPath, rgData, 1);
rgData[0].psz="test.cnc";
hr=pProgEng->InvokeMethod(IDX_XMC_PROGENG_
    SetInputProgram, rgData, 1);
rgData[0].adt=LNG_ADT_NUMBER;
rgData[0].df=0.0;
hr=pProgEng->InvokeMethod(IDX_XMC_PROGEN-
    G_Run, rgData, 1);
```

Internally, when directed to run the program via the IDX_XMC_PROGENG_RUN method, the following pseudo code follows.

```
IXMCDirect *m_pParser;
IXMCDirect* m_pEmitter;
XMC_PARAM_DATA m_rgData[128];
:
// note, the parser component 440 and emitter are created when the
program engine
// received the _SetComponents call.
//
// In addition, the input root and input program name should have
// already been set during the previous calls to _SetInputPath and
// _SetInputProgram as shown above.
IDX_XMC_PROGENG_RUN - method start
  hr = m_pParser->InvokeMethod( IDX_XMC_PARSEENG_Reset,
NULL, 0 );
  hr = S_OK
  while (hr == S_OK)
  {
    hr = m_pParser->InvokeMethod( IDX_XMC_PARSEENG_ParseLine,
        m_rgData, 128 );
    // m_rgData now contains the tokenized data for the current
    // line of data.
    hr = processTokens( m_rgData, 128 );
  }
HRESULT processTokens( LPXMC_PARAM_DATA rgData, DWORD
dwCount )
{
  // specific to online, offline or translate modes.
}
```

In the online processing example, a standard RS274D G&M Code ASCII text file is used as input and run using the XMC Motion Services. The same input data presented in the 'Preparation Example' is used for this example and, for that reason, this example will use the same intermediate universal tokenized data shown above.

The following pseudo code represents the actions output (i.e. the motions that occur) when running the input file with the program engine 430.

| Tokens Generated | Pseudo code actions |
|---|---|
| rgData[0] = 2 | No action taken for the |
| rgData[1] = TOK_PROGNAME | program will run immediately |
| rgData[2] = 1 | in online mode. |
| rgData[3] = "O0003" | |
| rgData[4] = TOK_ENDLINE | |
| rgData[5] = 0 | |
| rgData[0] = 7 | |
| rgData[1] = TOK_LINEID | |
| rgData[2] = 1 | |
| rgData[3] = 5 | |
| rgData[4] = TOK_MOVE_SETINCMODE | Set incremental move mode. |
| rgData[5] = 0 | |
| rgData[6] = TOK_MOVE_TOHOME | Set MoveToHome action. |
| rgData[7] = 1 | |
| rgData[8] = 3 (use next 3 tokens) | |
| rgData[9] = TOK_POS_X | Set X position for action. |
| rgData[10] = 1 | |
| rgData[11] = 0 | |
| rgData[12] = TOK_POS_Y | Set Y position for action. |
| rgData[13] = 1 | |
| rgData[14] = 0 | |
| rgData[15] = TOK_POS_Z | Set Z position for action. |
| rgData[16] = 1 | |
| rgData[17] = 0 | Perform the previous action. |
| rgData[18] = TOK_ENDLINE | Wait for action to complete. |
| rgData[19] = 0 | |
| rgData[0] = 3 | |
| rgData[1] = TOK_LINEID | |
| rgData[2] = 1 | |
| rgData[3] = 10 | |
| rgData[4] = TOK_MOVE_SETZEROPOS | Set zero position on all axes. |
| rgData[5] = 0 | |
| rgData[6] = TOK_ENDLINE | |
| rgData[7] = 0 | |
| rgData[0] = 6 | |
| rgData[1] = TOK_LINEID | |
| rgData[2] = 1 | |
| rgData[3] = 15 | |
| rgData[4] = TOK_MOVE_SETABSMODE | Set absolute move mode. |
| rgData[5] = 0 | Set rotation rate for axis |
| rgData[6] = TOK_SPINDLE_SETRATE | designated as the spindle axis. |
| rgData[7] = 1 | |
| rgData[8] = 1300 | Start rotating the spindle axis |
| rgData[9] = TOK_SPINDLE_ON | in CW direction. |
| rgData[10] = 1 | |
| rgData[11] = 1 (1 = CW, −1 = CCW) | Run the tool-select 'canned' |
| rgData[12] = TOK_TOOL_SELECT | program to select tool #2. |
| rgData[13] = 1 | |
| rgData[14] = 2 | |
| rgData[15] = TOK_ENDLINE | |
| rgData[16] = 0 | |
| rgData[0] = 5 | |
| rgData[1] = TOK_LINEID | |
| rgData[2] = 1 | |
| rgData[3] = 20 | |
| rgData[4] = TOK_MOVE_SETRAPID | Set rapid move action. |
| rgData[5] = 0 | |
| rgData[6] = TOK_POS_X | Set X position for the action. |
| rgData[7] = 1 | |
| rgData[8] = 1 | |
| rgData[9] = TOK_POS_Y | Set Y position for the action. |
| rgData[10] = 1 | |
| rgData[11] = 1 | |
| rgData[12] = TOK_ENDLINE | Perform the previous action. |
| rgData[13] = 0 | |
| rgData[0] = 5 | Set rapid move action (modal |
| rgData[1] = TOK_LINEID | state previously set). |
| rgData[2] = 1 | |
| rgData[3] = 25 | |
| rgData[4] = TOK_OFFSET_TOOL_LEN | Select the Z axis offset array. |
| rgData[5] = 1 | |
| rgData[6] = 1 (use next 1 tokens) | Add the tool offset #1 to the Z |
| rgData[7] = TOK_OFFSET_SELECT | axis offset array. |
| rgData[8] = 1 | |
| rgData[9] = 1 | Set Z position for the action |
| rgData[10] = TOK_POS_Z | making sure to add all active |
| rgData[11] = 1 | offsets in the Z axis offset |
| rgData[12] = 0.1 | array. |
| rgData[13] = TOK_ENDLINE | |
| rgData[14] = 0 | Perform the previous action. |
| rgData[0] = 3 | |
| rgData[1] = TOK_LINEID | |
| rgData[2] = 1 | |
| rgData[3] = 25 | |
| rgData[4] = TOK_COOLANT_ON | Run the tool-select 'canned' |
| rgData[5] = 0 | program to turn the coolant |
| rgData[6] = TOK_ENDLINE | on. |
| rgData[7] = 0 | |

When processing the input file, the following communications occur between the program engine 430 and its associated components.

```
//... continued from Process Flow example shown in the Preparation
// Example above.
HRESULT processTokens( LPXMC_PARAM_DATA rgData, DWORD
dwCount )
{
  XMC_PARAM_DATA rgParams[128];
  DWORD    dwParams;
  DWORD    dwTokens = (DWORD)rgData[0].df;
  DWORD    dwIdx = 1;
  DWORD    dwTokenIdx = 0
  while (dwTokenIdx < dwTokens && dwIdx < dwCount)
  {
    dwToken = (DWORD)rgData[dwIdx].df;
    dwIdx += 1;
    dwParams = (DWORD)rgData[dwIdx].df;
    dwIdx += 1;
    for (DWORD dwPdx=0; dwPdx<dwParams && dwPdx<128;
    dwPdx++)
    {
      rgParams[dwPdx] = rgData[dwIdx+dwPdx];
    }
    dwIdx += dwPdx;
    switch (dwToken)
    {
      case TOK_MOVE_SETINCMODE:
        // store move mode as incremental.
        break;
      case TOK_MOVE_SETABSMODE:
        // store move mode as absolute.
        break;
      case TOK_MOVE_SETRAPID:
        // store move action as rapid.
        break;
      case TOK_MOVE_TOHOME:
        // set move action to move home
        break;
      case TOK_POS_X:
        // store X position.
        break;
      case TOK_POS_Y:
        // store Y position.
        break;
      case TOK_POS_Z:
        // store Z position.
        break;
      case TOK_MOVE_SETZEROPOS:
        // set action to set the zero axis.
        break;
      case TOK_SPINDLE_SETRATE:
        // store the spindle value as velocity (or rotation) for
        // the axis designated as the spindle axis.
        break;
      case TOK_SPINDLE_ON:
        // set action as 'run program'.
        // set target caned program to 'spindle_on'.
        break;
      case TOK_TOOL_SELECT:
        // set action as 'run program'.
        // set target canned program to 'tool_select'.
        break;
      case TOK_OFFSET_TOOL_LEN:
        // Set active offset array to Z axis and if any
        // offsets are in the pending queue, add them to the
        // offset array and clear them from the queue.
        break;
      case TOK_OFFSET_SELECT:
        // Add selected offset to active offset array, and if
        // no offset array is active, add to pending offset queue.
        break;
      case TOK_COOLANT_ON:
        // set action as 'run program'.
        // set target canned program to 'coolant_on'.
        break;
```

-continued

```
      case TOK_ENDLINE:
        // perform the action previously stored using the stored
        // positions, offsets and/or program names (to run) as
        // appropriate.
        break;
    }
  }
}
```

The offline example is similar to the on-line example. The major difference between these examples is that, when the program name token is received (TOK_PROGNAME), the program engine 430 directs the XMC Motion Services to 'Define' a program using the given program name. In addition, just after processing the final token, the program engine 430 directs the XMC Motion Services to 'End' the program thus creating a new program on the current motion target used by the XMC Motion Services. For more information on defining and ending motion programs, see the XMC C++ Reference documentation contained within the XMC for Visual Studio product.

When running in translation mode, the universal tokens and associated parameters are passed to the emit engine 434 that uses the tokens to create a new program output based on the target emitter used. The following pseudo code demonstrates how the program engine 430 is used to convert the intermediate universal tokenized data and associated parameters above into a newly formatted output program file.

```
IXMCDirect* pProgEng;
HRESULT hr;
XMC_PARAM_DATA rgData[128];
hr=CoCreateInstance(CLSID_ProgEng, . . . ,
    IID_IXMCDirect,
    (LPVOID)&pProgEng);
rgData[0].adt=LNG_ADT_STAT_STRING;
rgData[0].psz="XMC.PARSER.GCODE.RS274";
rgData[1].adt=LNG_ADT_STAT_STRING;
rgData[1].psz="XMC. EMITTER.GCODE.OKUMA";
hr=pProgEng->InvokeMethod(IDX_XMC_PROGENG_
    SetComponents, rgData, 1);
rgData[0].adt=LNG_ADT_STAT_STRING;
rgData[0].psz="c:\temp";
hr=pProgEng->InvokeMethod(IDX_XMC_PROGENG_
    SetInputPath, rgData, 1);
hr=pProgEng->InvokeMethod(IDX_XMC_PROGENG_
    SetOutputPath, rgData, 1);
rgData[0].psz="test.cnc";
hr=pProgEng->InvokeMethod(IDX_XMC_PROGENG_
    SetInputProgram, rgData, 1);
rgData[0].psz="newtest.min";
hr=pProgEng->InvokeMethod(
    IDX_XMC_PROGENG_SetOutputProgram,
    rgData, 1);
rgData[0].adt=LNG_ADT_NUMBER;
rgData[0].df=0.0;
hr=pProgEng->InvokeMethod(IDX_XMC_PROGEN-
    G_Run, rgData, 1);
```

Internally, when directed to run the program via the IDX_XMC_PROGENG_Run method, the following pseudo code follows.

```
IXMCDirect* m_pParser;
IXMCDirect* m_pEmitter;
XMC_PARAM_DATA m_rgData[128];
:
// note, the parser component 440 and emitter are created when the
program engine
// received the _SetComponents call.
//
// In addition, the input root and input program name should have
// already been set during the previous calls to _SetInputPath,
// _SetOutputPath, _SetInputProgram and _SetOutputProgram.
IDX_XMC_PROGENG_Run - method start
    hr = m_pParser->InvokeMethod( IDX_XMC_PARSEENG_Reset,
NULL, 0 );
    hr = S_OK
    while (hr == S_OK)
    {
        hr = m_pParser->InvokeMethod( IDX_XMC_PARSEENG_ParseLine,
            m_rgData, 128 );
        // m_rgData now contains the tokenized data for the current
        // line of data.
        hr = m_pEmitter->InvokeMethod( IDX_XMC_EMITENG_EmitLine,
            M_rgData, 128 );
    }
```

Using the universal tokens, the emitter converts the tokens into the appropriate output corresponding to the format supported by the emitter. For example, in the example above, the Okuma emitter would output a .MIN file in the Okuma variant of the G-Code language.

The translator system 420 described above is designed to translate one type of program format to another type of program format where a program format can be either an off-line program format or an online format where a driver is called immediately as the program is translated. In another example a one-program format may be translated into a universal 'meta' format that is hardware independent yet supported by the motion services module 424. In particular, when the meta format is run the format is interpreted into direct calls into the motion services module which are then run on the current driver.

Figure 33:
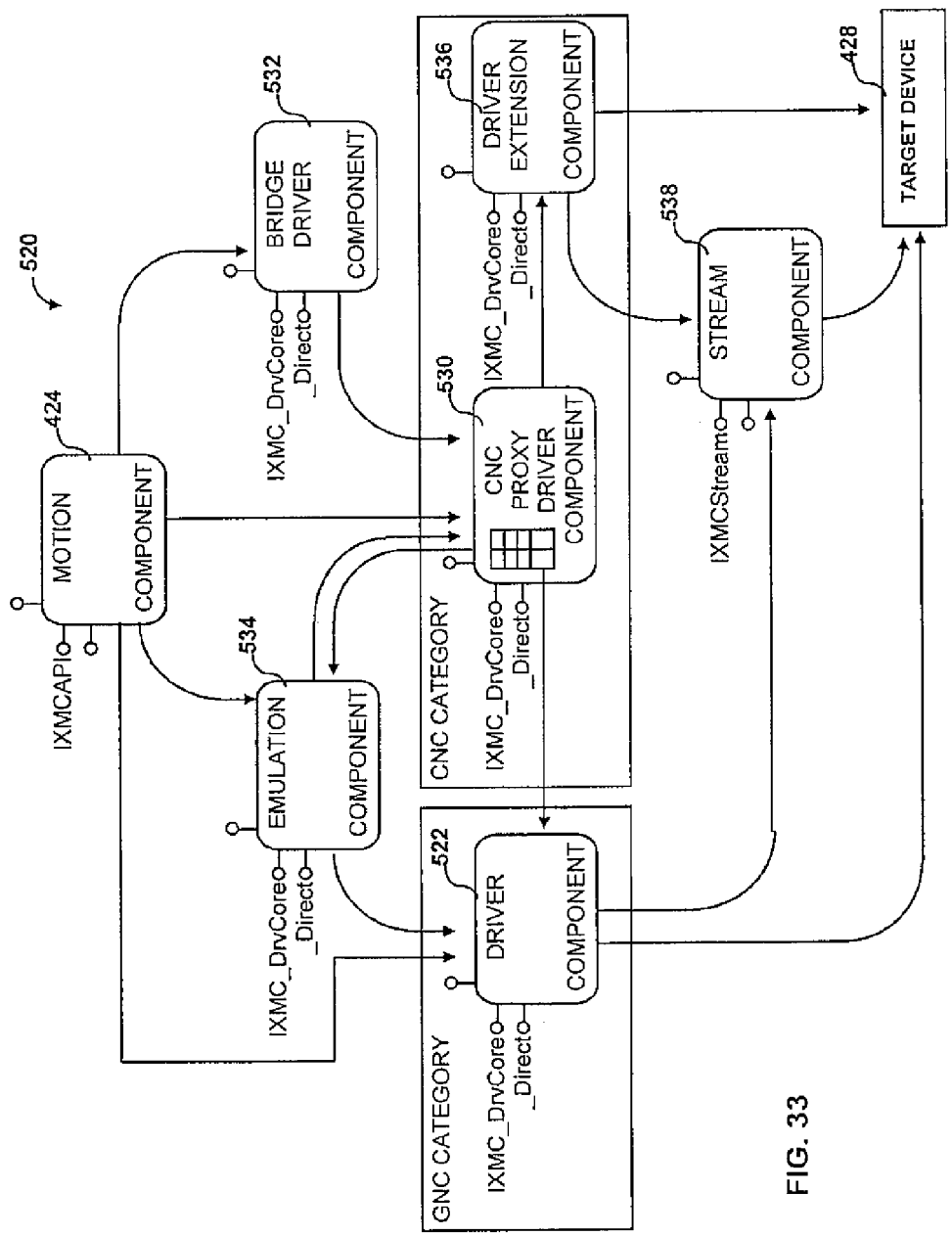
FIG. 33 is a module interaction map of an optional CNC proxy driver system constructed in accordance with the principles of the present invention.

Referring now to FIG. 33, depicted therein is example of a CNC proxy system 520 constructed in accordance with, and embodying, the principles of the present invention. As shown, the CNC proxy system 520 is preferably used in conjunction with the motion services module 424 as described above. In addition, the motion services module 424 is preferably used in conjunction with the translator system 420 as described above. The CNC proxy system 520 may, however, be used without either the motion services module 424 or the translator system 420. As shown, the CNC proxy system 520 may be arranged between the motion services module 424 and the target device 428.

The CNC proxy system 520 is used to map CNC functionality onto a general motion control driver 522. When used with the translator system 420 and the motion services module 424, the CNC proxy system 520 supports translated programs that use CNC functionality. For example, feedrate override, spindlerate, etc are functions that are not normally supported by general motion controllers. To allow the translator system 420 to run on a motion services module 424 connected to a general motion system, the CNC proxy system 520 handles the required mapping between CNC functionality and the general motion functionality provided by a general motion controller functioning as the target device 428.

As shown in FIG. 33, the CNC proxy system 520 comprises a CNC proxy driver component 530. The CNC proxy system further optionally comprises one or more of a bridge driver component 532, an emulation component 534, a driver extension component 535, and a stream component 538.

The CNC proxy driver component 530 is the main module used to make the link between a CNC system and a general motion controller. CNC functions are very specific to the types of operations that occur on a CNC machine, and a General Motion Controller applies to a very broad set of applications. The CNC proxy driver component 530 comprises a set of special algorithms and mapping to allow the use of a general motion controller to implement a CNC based solution.

The emulation driver component 534 is an optional component used to emulate driver operations and defines a broader set of motion functionality that, when combined with the native motion driver, provides the client application 422 with access to a richer set of motion functionality.

The bridge driver component 532 is an optional component used to handle all common driver functionality. The bridge driver component 532 thus makes each target driver 522 very simple and focused primarily on performing the motion operations implemented by the target device 428 or general motion controller (including software, hardware and even remote or network based motion controllers).

The driver component 522 is the native motion control driver that embodies the native motion controller language (or API calls) needed to control the target motion control system.

The exemplary CNC proxy driver component 530 is a module that implements the XMCCNC API function calls and uses internal algorithms to map those CNC operations to the functionality provided by the target driver 522 and/or the emulation driver 534. For example, the feedrate of a toolhead may be calculated using the actual velocities along three axes in three space. When queried, the XMC CNC Proxy Driver would first query the target driver for the actual velocity along the three axes, then calculate the feedrate and return the calculated value.

The driver extension component 536 is an optional component that allows third parties to expand the functionality of the CNC proxy driver component 530 with custom algorithms.

The stream component 538 is an optional component that encapsulates how a driver 522 communicates with the target motion hardware. Optionally, the driver component 522 may handle all communication with the target motion system, therefore eliminating the need for the stream component 538.

The CNC proxy system 520 is used in several common scenarios. When the proxy system 520 is first used, it must be initialized. Once initialized, CNC operations (functions or properties) are performed on the overall motion system. The following sections describe these scenarios in detail.

Figure 34:
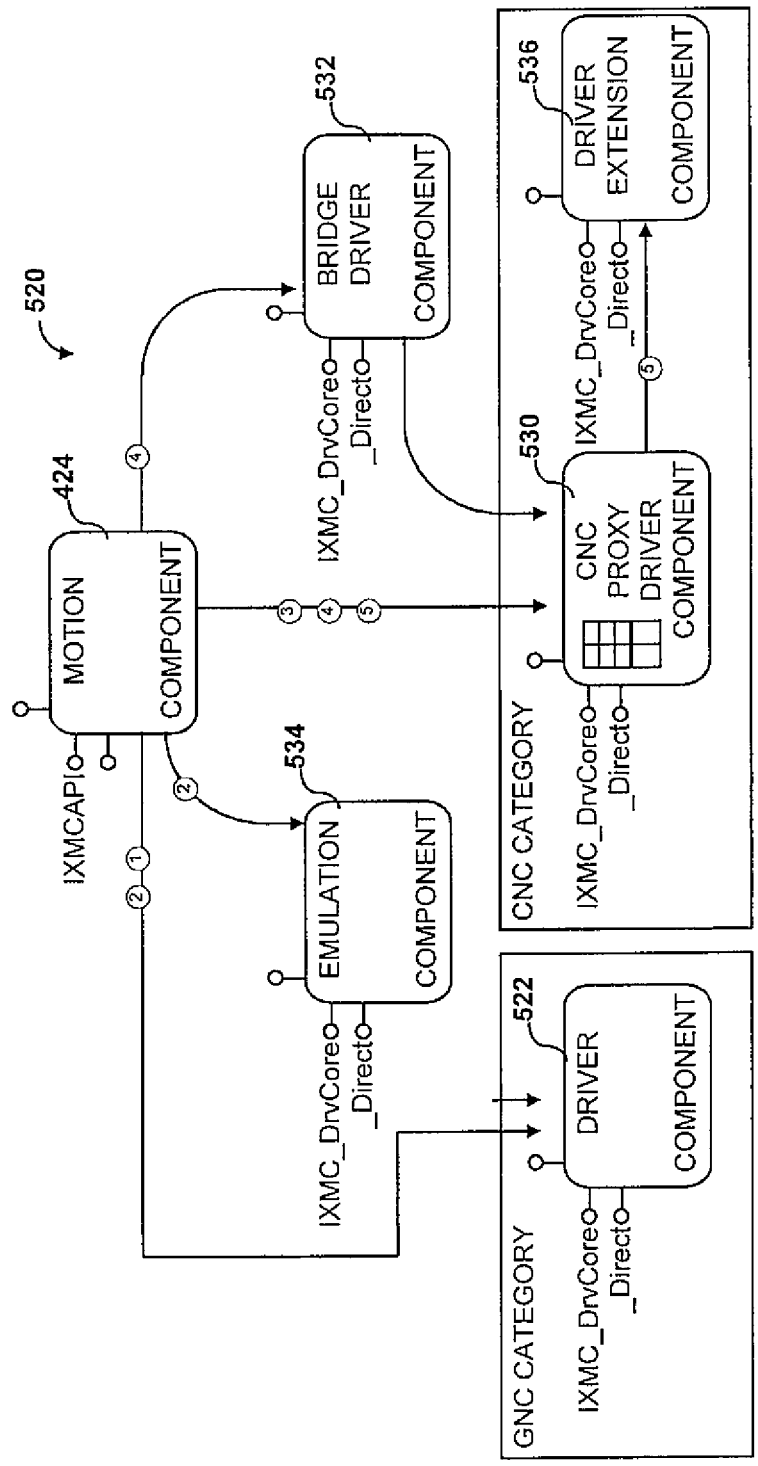
FIGS. 34-35 are scenario maps depicting typical scenarios in which the system of FIG. 33 may be used.

Referring now to FIG. 34, when initializing the system, the link between the CNC functionality provided by the CNC proxy system 520 and the target general motion controller is made. The following steps occur when initializing the CNC proxy system 520.

First, the motion services module 424 queries the target driver 522 for information describing the Service Provider Interface (SPI) support that the driver 522 implements. When queried, the driver 522 returns a table of information describing whether each function in the SPI is implemented, should be emulated, or is not supported.

Next, the motion services module 424 builds an internal Service Provider Interface table that contains pointers to all functions making up the SPI. Depending on how the target driver implements each SPI, a pointer in the table either points to the SPI function implemented by the Driver (when the driver implements the function) or the Emulation component (when the driver does not implement or requests emulation of the function).

Next, the motion services module 424 passes the SPI function table to the CNC proxy driver component 530; the CNC proxy driver component 530 later uses the SPI function table when mapping the CNC functions and properties to the general motion functionality.

Next the motion services module 424 initializes the bridge driver 532 and passes a pointer to the CNC proxy driver component 530 a general proxy.

And finally, any existing driver extension modules 536 are created and registered with the CNC proxy driver component 530.

Figure 35:
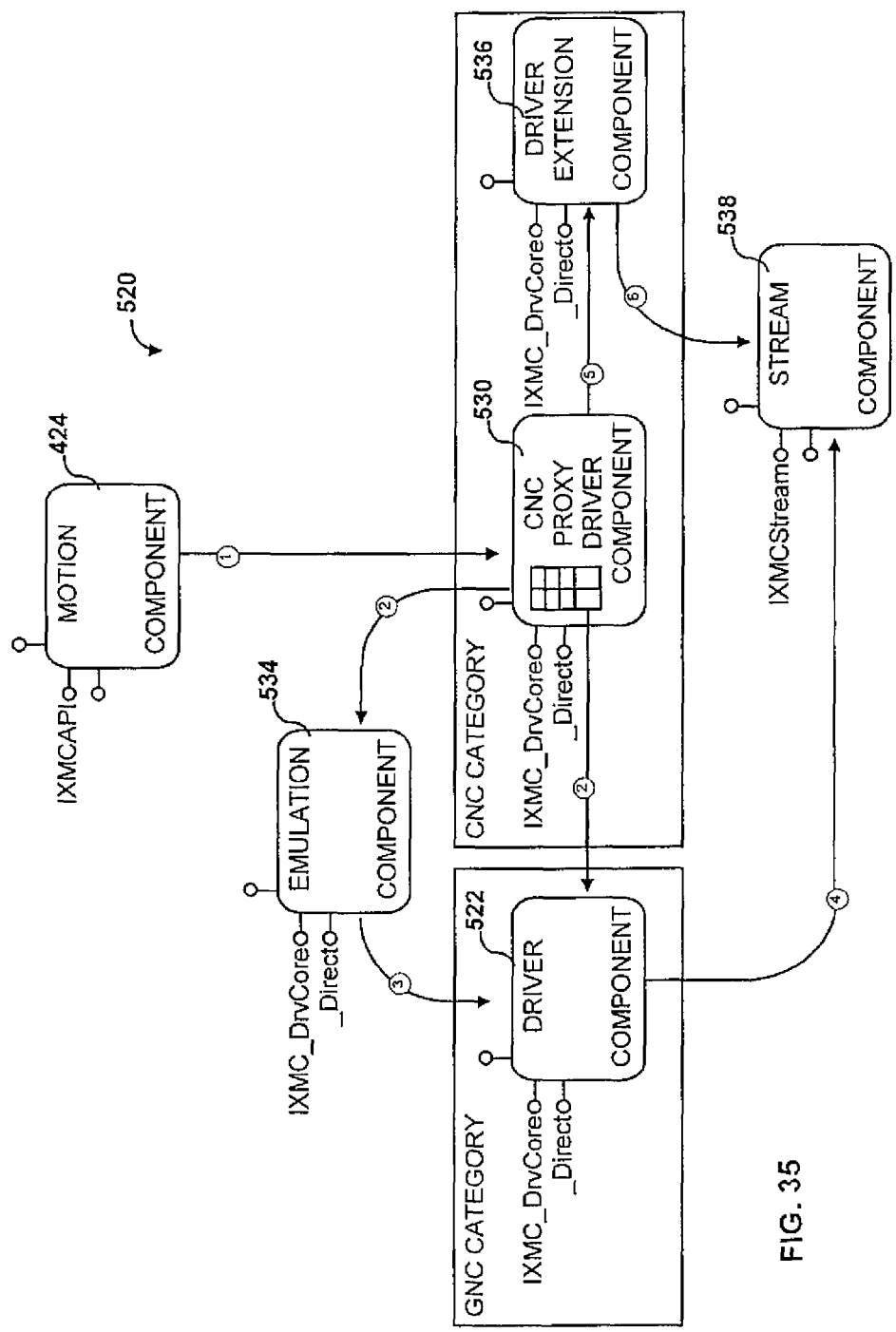

Once initialized, the entire system is ready to perform CNC operations as shown in FIG. 35. When performing each operation, all requests are first routed to the CNC proxy driver component 530. The CNC proxy driver component 530 then uses internal algorithms to map each requested operation to the specific general motion control functionality provided by the target driver 522 and by the functionality provided by the emulation component 534.

The following steps occur when performing a CNC operation on the XMC system. When the client application 422 requests any CNC type operations from the motion services module 424, the motion services module 424 in-turn directs the calls to the CNC proxy driver component 530. Upon receiving the request, the CNC proxy driver component 530 uses the SPI function table, which points to either emulation component 534 or the SPI functions implemented by the driver component 522, to perform general motion operations needed to carry out the requested CNC operation.

If the SPI function called is implemented by the emulation component 534, the emulation component 534 in-turn uses the target driver 522 to carry out the general motion operation or operations that emulate the CNC operation.

When requested to perform general motion operations, the driver component 522 performs any language translations (or direct memory access operations, or API calls) necessary to perform the general motion operation. If used, the stream component 538 allows communication with the target motion system. If the stream component 538 is not used, the driver component 522 may optionally directly communicate with the target motion system 428.

In the event that the CNC proxy driver component 530 does not implement the CNC operation requested, the request is routed to any registered driver extension modules 536 to give them a chance to perform the requested operation. The driver extension modules 536 are normally used when a third party implements additional CNC functionality not supported by the current CNC operations. Upon receiving the request, the driver extension component 536 can optionally use the stream component 538 to communicate with the target motion control system. As another alternative, the driver extension 536 may also talk directly to the target motion system 428.

All driver level modules other than the General Driver Proxy, are required to implement the IXMC_DrvCore_Direct interface. Most communications between drivers occur through this interface.

The IXMC_DrvCore_Direct interface is used for most communications between all driver level components. The following methods make up this interface (as specified in the standard OLE/COM IDL format):

Method Summary

The IXMC_DrvCore_Direct interface is made up of the following functions.

SetTargetStream—This method is used to set the target stream on the driver.

InvokeMethod—This method is used to invoke methods on the driver implementing the SPI function set.

A more detailed description of each method implemented by the object is described below.

| | |
|---|---|
| IXMC_DrvCore_Direct::SetTargetStream | |
| Syntax | HRESULT SetTargetStream( IXMC_Stream* pStrm ); |
| Parameters | IXMC_Stream* pStrm - pointer to the target stream used by all drivers. |
| Return Value | HRESULT - NOERROR on success, or error code on failure. |

The IXMC_DrvCore_Direct::SetTargetStream method is used to set the target stream on the component implementing this method.

| | |
|---|---|
| IXMC_DrvCore_Driver::InvokeMethod | |
| Syntax | HRESULT InvokeMethod( DWORD dwSPIIdx, LPXMC_PARMA_DATA rgData, DWORD dwCount ); |
| Parameters | DWORD dwSPIIdx - index of the function to run on the driver. LPXMC_PARAM_DATA rgData - array of XMC_PARAM_DATA types that specify each parameter corresponding to the function. For more information on the XMC_PARAM_DATA type, see below. DWORD dwCount - number of XMC_PARAM_DATA elements in the rgData array. |
| Return Value | HRESULT - NOERROR on success, or error code on failure. |

The IXMC_DrvCore_Driver:InvokeMethod method is used to run a method on the component implementing the method.

The following discussion describes special algorithms used when mapping the CNC functionality to the general motion driver used to eventually implement portions of the CNC functionality.

Function mapping is an important concept used to make the link between the CNC proxy driver component 530 and the target motion control driver and emulation modules. When making this link, the motion services component 424 passes to the CNC proxy driver component 530 a function table with entries that correspond to each of the functions in the general motion SPI. This table is used to access each general motion function, which are then used by the implementation of the CNC operations.

Figure 36:
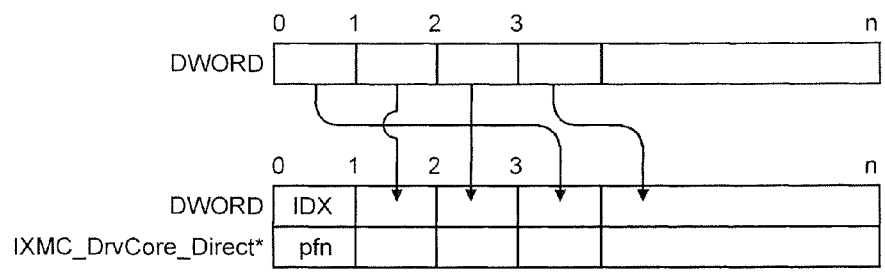
FIG. 36 is a diagram depicting function mapping between CNC operations and general motion functions.

Referring now to FIG. 36, the function table containing entries that correspond to each of the functions in the general motion SPI will now be described in further detail. The table passed to the CNC Proxy is made up of entries that contain, as shown in FIG. 36, both the SPI function index and a pointer to the IXMC_DrvCore_Direct interface on the module that actually implements the function.

| | |
|---|---|
| XMC_SPI_FNTABLE_ENTRY Structure | |
| Syntax | typedef struct _XMC_SPI_FNTABLE_ENTRY { DWORD dwFnIdx; IXMC_DrvCore_Direct* pDirect; } XMC_SPI_FNTABLE_ENTRY; |

-continued

| Field | DWORD dwFnIdx - index of the function to run on the module pointed to by the pDirect interface pointer. IXMC_DrvCore_Direct* pDirect - pointer to the module implementing the IXMC_DrvCore_Direct interface. Depending on whether or not the native driver supports the function specified by the dwFnIdx field, this pointer will either point to the Emulation module or the native driver. |
|---|---|

The XMC_SPI_FNTABLE_ENTRY structure defines each entry in the SPI table passed to the CNC proxy driver component 530.

When first initialized, the CNC proxy driver component 530 is sent the SPI table so that this table can be used later when running CNC type operations. To initialize the CNC proxy driver component 530, the table is passed to the CNC Proxy by the Motion component through an array of XMC_PARAM_DATA elements. The following source code sample demonstrates pseudo code of the initialization process.

```
class CNCProxyImpl
{
public:
CNCProxyImpl( void );
HRESULT InvokeMethod( ... );
private:
LPXMC_SPI_FNTABLE_ENTRY m_rgSPITable;
DWORD          m_dwSPITableCount;
};
:
HRESULT CNCProxyImpl::InvokeMethod( DWORD dwSPIIdx,
LPXMC_PARAM_DATA rgData,
DWORD dwCount,
DWORD dwFlags )
{
if (dwSPIIdx == IDX_XMC_CNCPROXY_INITIALIZE)
{
LPXMC_SPI_FNTABLE_ENTRY rgSPITable;
DWORD         dwSPITableCount;
if (rgData[0].adt != LNG_ADT_STAT_STRING ||
rgData[1].adt != LNG_ADT_NUMBER)
return( E_INVALIDARG );
rgSPITable = (LPXMC_SPI_FNTABLE_ENTRY)rgSPITable.psz;
dwSPITableCount = (DWORD)rgSPITableCount.df;
m_rgSPITable = new
XMC_SPI_FNTABLE_ENTRY[dwSPITableCount];
m_dwSPITableCount = dwSPITableCount;
for (DWORD dwIdx=0; dwIdx<dwSPITableCount; dwIdx++)
{
m_rgSPITable[dwIdx].dwSPIIdx = rgSPITable[dwIdx].dwSPIIdx;
m_rgSPITable[dwIdx].pDirect = rgSPITable[dwIdx].pDirect;
if (m_rgSPITable[dwIdx].pDirect != NULL)
m_rgSPITable[dwIdx].pDirect->AddRef( );
}
}
return( NOERROR );
}
```

Once the CNC proxy driver component 530 is initialized, it will hold a copy of the full SPI Table containing all SPI functions implemented by either the target Driver or Emulation component.

Once the CNC proxy driver component 530 is initialized it is ready to perform CNC operations. When performing CNC operations, the CNC proxy driver component 530 uses the functions pointed to by the entries of the SPI Table to complete the CNC operations requested. The following example, demonstrates how to call methods contained within the XMC SPI function table.

```
//NOTE: m_rgSPITable is defined by the class, see above source.
:
HRESULT CNCProxyImpl::InvokeMethod( DWORD dwSPIIdx,
LPXMC_PARAM_DATA rgData,
DWORD dwCount,
DWORD dwFlags )
{
if (dwSPIIdx == IDX_XMC_CNCPROXY_FEEDRATE)
{
XMC_PARAM_DATA rgSpiData[3];
HRESULT hr;
DWORD dwFnIdx =
IDX_XMC_GENERALMOTION_GET_VELOCITY;
double dfFeed = 0;
hr = m_rgSPITable[dwFnIdx]->InvokeMethod( dwFnIdx,
rgSpiData,
3,
0 );
if (FAILED( hr ))
return( hr );
dfFeed = rgData[0].df * rgData[0].df +
rgData[1].df * rgData[1].df +
rgData[2].df * rgData[2].df;
dfFeed = _sqrt( dfFeed );
rgData[0].adt = LNG_ADT_NUMBER;
rgData[0].df = dfFeed;
}
return( NOERROR );
}
```

The following discussion contains the definitions of all special types used by the methods and properties of each component making up the program engine 430 system.

All methods exposed by each component in the system 520 use the standard XMC parameters set to describe data used to set and query properties as well as invoke methods. The standard parameters are in the following format:

pObj->InvokeMethod(LPXMC_PARAM_DATA rgData, DWORD dwCount);

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
  LNG_PARAM_DATATYPE adt;
  union
  {
    double df;
    LPTSTR psz;
  };
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
|---|---|
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |

-continued

| LNG_PARAM_DATATYPE | Description |
|---|---|
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

EVENTS

The present invention also relates to systems for handling events generated in the context of a motion system. Such events will be referred to as motion events. In addition, a common source of events in a motion system is a change in data associated with a variable. The present invention also relates to a variable support system for accessing and mapping proprietary variables associated with motion controllers.

The following discussion will thus describe both a motion event system for handling motion events and a variable support system for accessing data values associated with motion variables. While a significant benefit can be obtained by combining the motion event system and variable support system as described herein, each of these systems can operate independently, and the Applicant reserves the right to pursue separate claims directed towards each of the motion event system and the variable support system.

MOTION EVENT SYSTEMS

Figure 37:
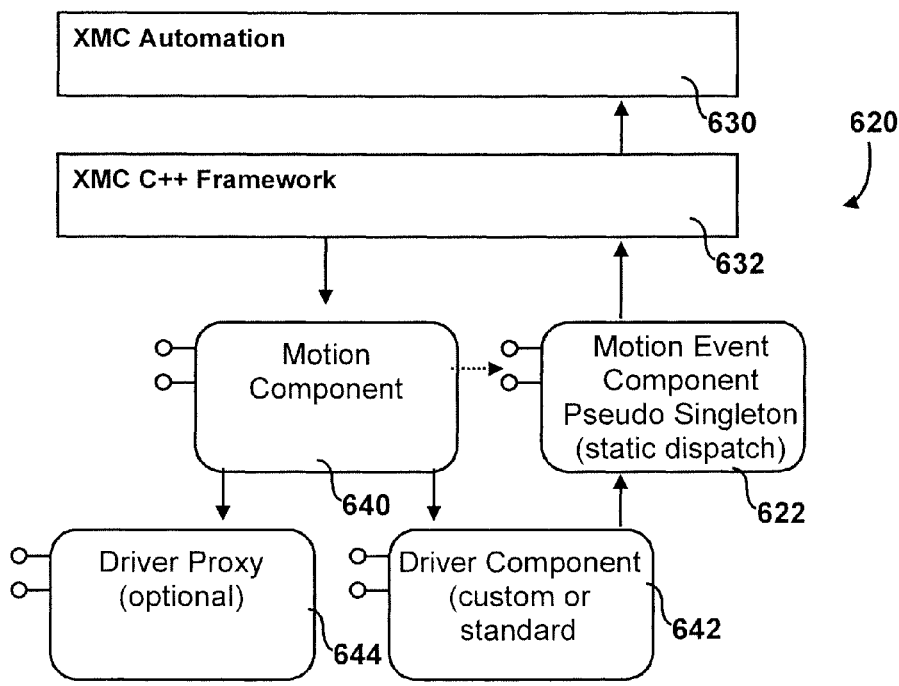
FIG. 37 is an object interaction map depicting an event monitoring system for use by a motion system.

Referring now to FIG. 37 of the drawing, depicted at 620 therein is an example motion event system 620 comprising a motion event component 622. The example motion event component 622 routes events among the other components (custom driver, standard driver, or stream) of the system 620 as will be described in further detail below.

As shown in FIG. 37, the motion event system 620 further comprises an automation layer 630 and a C++ framework layer 632. The automation layer 630 allows access to the motion component 640 by a client (not shown) written in any automation aware language such as Visual Basic, VBA, VBScript, Java, and .NET languages. The client may be a component, application, or other software using the motion services provided by the motion event system 620. The C++ framework layer 632 implements a very thin wrapper designed to facilitate access to COM interfaces.

The example motion event system 620 further comprises a motion component 640 and a driver component 642. The example motion component 640 implements a set of OLE interfaces designed for use in the context of motion control systems. The example driver component 642 implements the driver logic for a given motion platform and may be either custom or standard.

Optionally, the system 620 may further comprise a driver proxy component 644. The driver proxy component 644 acts as a proxy between a first set of driver original interface requirements and a second set of slim driver interfaces. When the driver component 642 is standard, the standard driver component 642 performs the functions both of the driver proxy component 644 and of a custom driver component 642.

Figure 38:
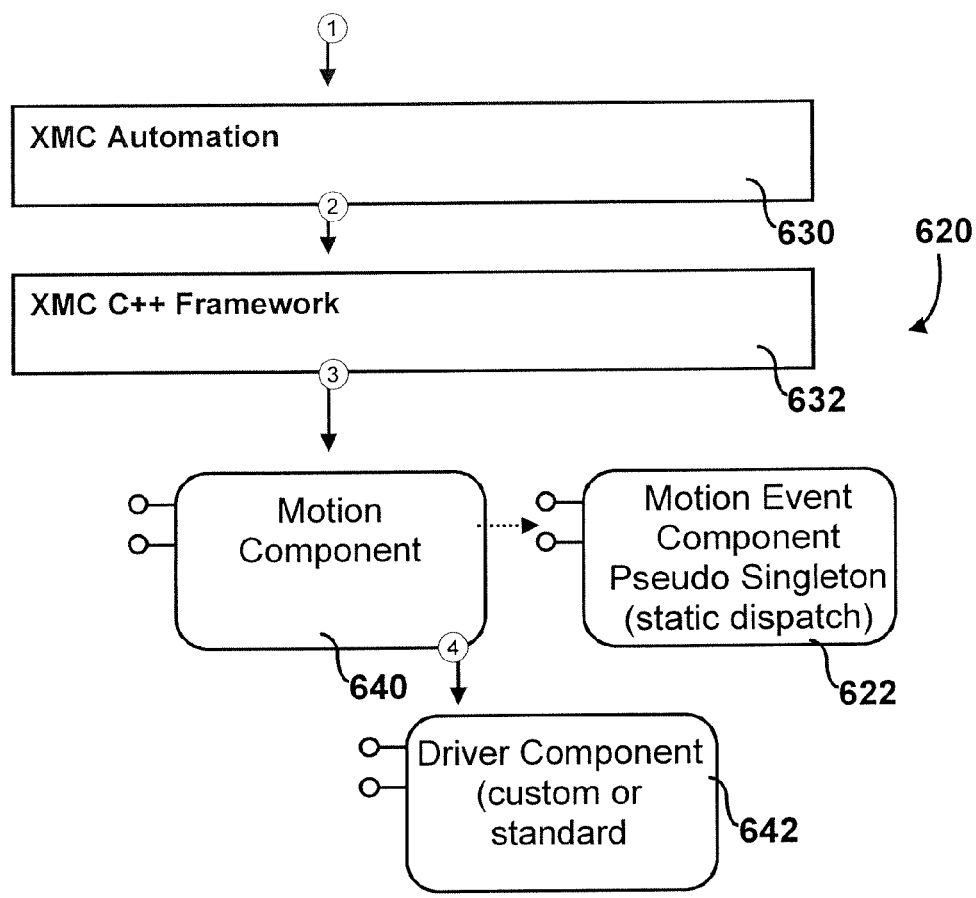
FIG. 38 is a scenario map depicting the making of a normal method call.

Referring now to FIG. 38 of the drawing, depicted therein is a scenario map depicting the operation of the system 620 when making a normal method call. When making a normal call to the motion component 640, the thread of control is routed from the caller to the custom driver component 642 implementing the service requested and the following steps are performed:
1. First the caller calls the function on the automation layer 630 (or C++ framework layer 632).
2. If the automation layer 630 is called, it in turn calls the C++ framework layer 632.
3. The C++ framework layer 632 calls the appropriate motion service provided by the motion component 640.
4. Internally the motion component 640 then routes the request to the target motion driver 642. At this point no events have been triggered.

Figure 39:
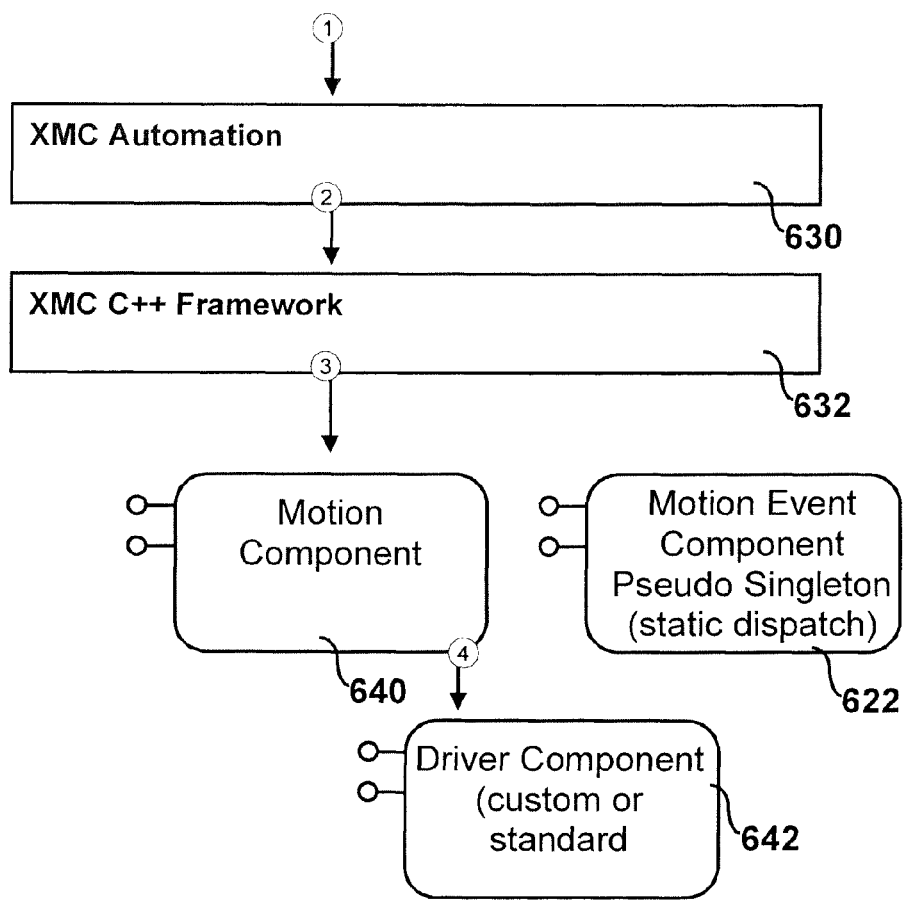
FIG. 39 is a scenario map depicting the process of driver event subscription.

Referring now to FIG. 39 of the drawing, the process of driver event subscription will now be described. To receive events, a client must first 'subscribe' to a set of one or more events. Subscribing is the process of notifying the motion event system 620 of the events in which the client has interest. Once subscribed, the event conditions defined by the subscription dictate what triggers the event that then notifies the client of the event. FIG. 39 illustrates how event subscription works.

As shown in FIG. 39, the following steps occur when subscribing to an event:
1. First the client in communication with either of the automation layer 630 or C++ framework layer 632 calls the 'Subscribe' method notifying the system 620 which event or events are to be monitored.
2. If the automation layer 630 is used, it notifies the C++ framework layer 632 of the event subscription.
3. Next, the C++ framework layer 632 notifies the motion component 640 of the event subscription.
4. The motion component 640 then notifies the target driver component 642, which stores the subscription information and then either begins monitoring the event or waits until told to do so.

Optionally, the motion component 640 may implement the event subscription/monitoring functionality, which adds a higher degree of reusability because each of the driver components 642 would not be required to implement any subscription/monitoring logic. Also, because the automation layer 630 and C++ framework layer 632 are provided merely as programming conveniences, the client setting up the subscription may optionally communicate directly to the motion component 640, bypassing both the automation layer 630 and C++ framework layer 632.

Figure 40:
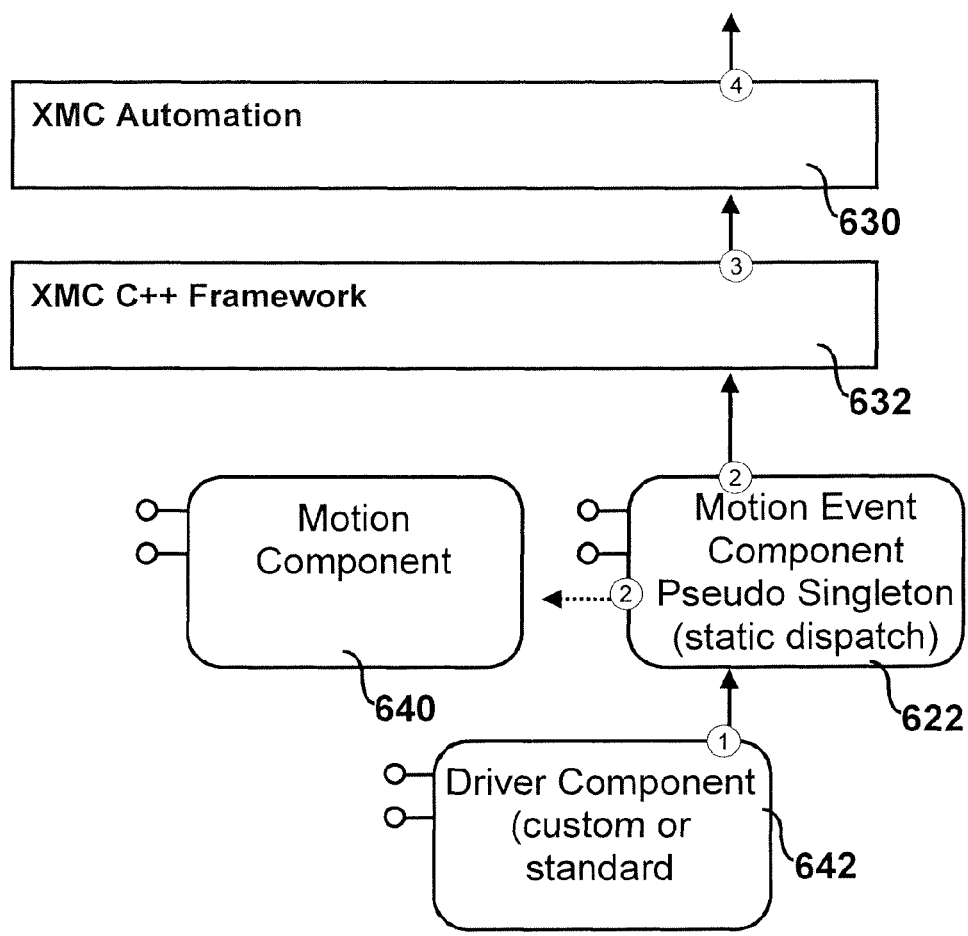
FIG. 40 is a scenario map depicting the making of a driver level event triggering.

Referring now to FIG. 40, the process of driver level event triggering will now be described. An event is generated by either a driver component 642 or stream, which will also be referred to as the event source. When an event occurs, the event source routes the event to subscribed clients the motion event component 622. As shown in FIG. 40, the following steps are performed when an event is generated:
1. First the event condition occurs in the event source. When the event occurs, the event source sends the event notification to the motion event component 622.
2. Next, the motion event component 622 sends the event notification to all clients subscribed to that particular event.
3. If the automation layer 630 is used, the C++ framework layer 632 notifies the automation layer 630 of the event.

4. The automation layer 630 next notifies all appropriate subscribed clients of the event, thereby completing the event cycle.

As an alternate to the design above, the functionality of the motion event component 622 may be provided by the motion component 640, in which case a separate motion event component 622 would not be used. However, using a separate motion event component 622 allows a decoupling of the event source and the event receiver, which may be beneficial when the components of the system 620 are distributed across a network. For example with the motion event component 622, the motion component 640 may actually be located on a different computer connected via a network (Ethernet, wireless, or other network system).

Optionally a motion stream (not shown) residing below the driver component 642 may fire events. For example, data transmission events may be fired by the stream when data is received from or sent to the stream target system. In this case, the event source would be the motion stream instead of the motion driver 642. In addition, as generally discussed above, the motion component 640 may actually implement the event subscription/monitoring/trigger functionality, which would add a higher degree of reusability because each driver would not be required to implement any subscription/monitoring logic. Further, because the automation layer 630 and C++ framework layer 632 are provided merely as programming conveniences, the motion event component 622 may communicate directly with the client application thus bypassing the automation layer 630 and C++ framework layer 632.

Figure 41:
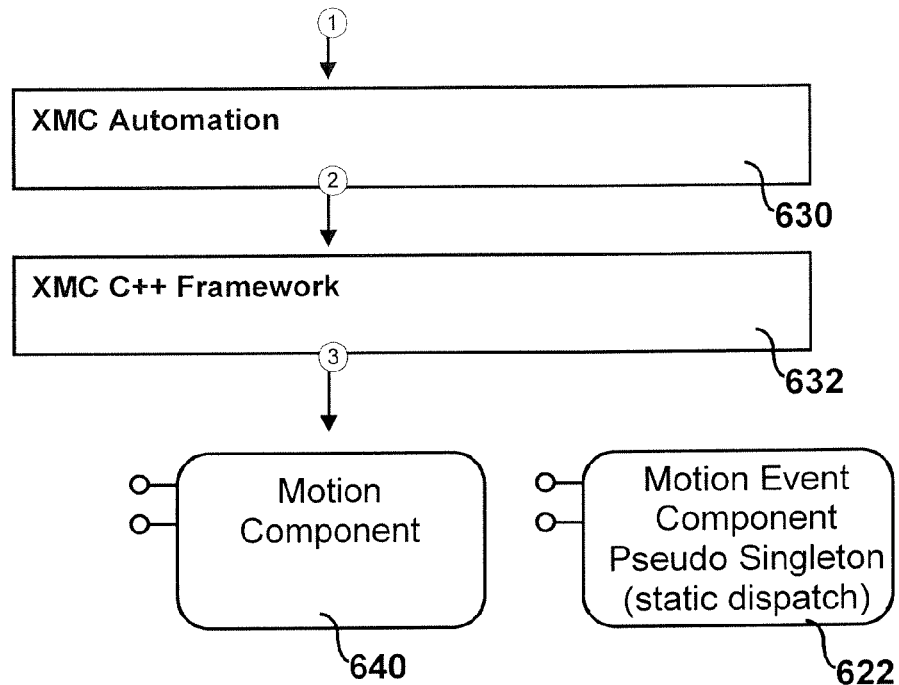
FIG. 41 is a scenario map depicting the process of event subscription at the motion component level.

Referring now to FIG. 41 of the drawing, the optional process of event subscription at the motion component level will now be described. To maximize code re-use across driver implementations, event subscription and monitoring may be implemented at the motion component 640 level instead of at the driver component level. FIG. 41 illustrates the steps that occur when event subscription is handled at the motion component level:
1. Initially, the client (of either the automation layer 630 or C++ framework layer 632) calls the 'Subscribe' method notifying the motion event system 620 of which events to monitor.
2. The automation layer 630, if used, notifies the C++ framework layer 632 of the event subscription.
3. Next, the C++ framework layer 632 notifies the motion component 640 of the event subscription, which in turn stores the subscription information and then either starts monitoring the event immediately or waits until told to do so.

Optionally, because the automation layer 630 and C++ framework layer 632 are provided merely as programming conveniences, the client setting up the subscription may also talk directly to the motion component 640, thus bypassing both the automation layer 630 and C++ framework layer 632.

Figure 42:
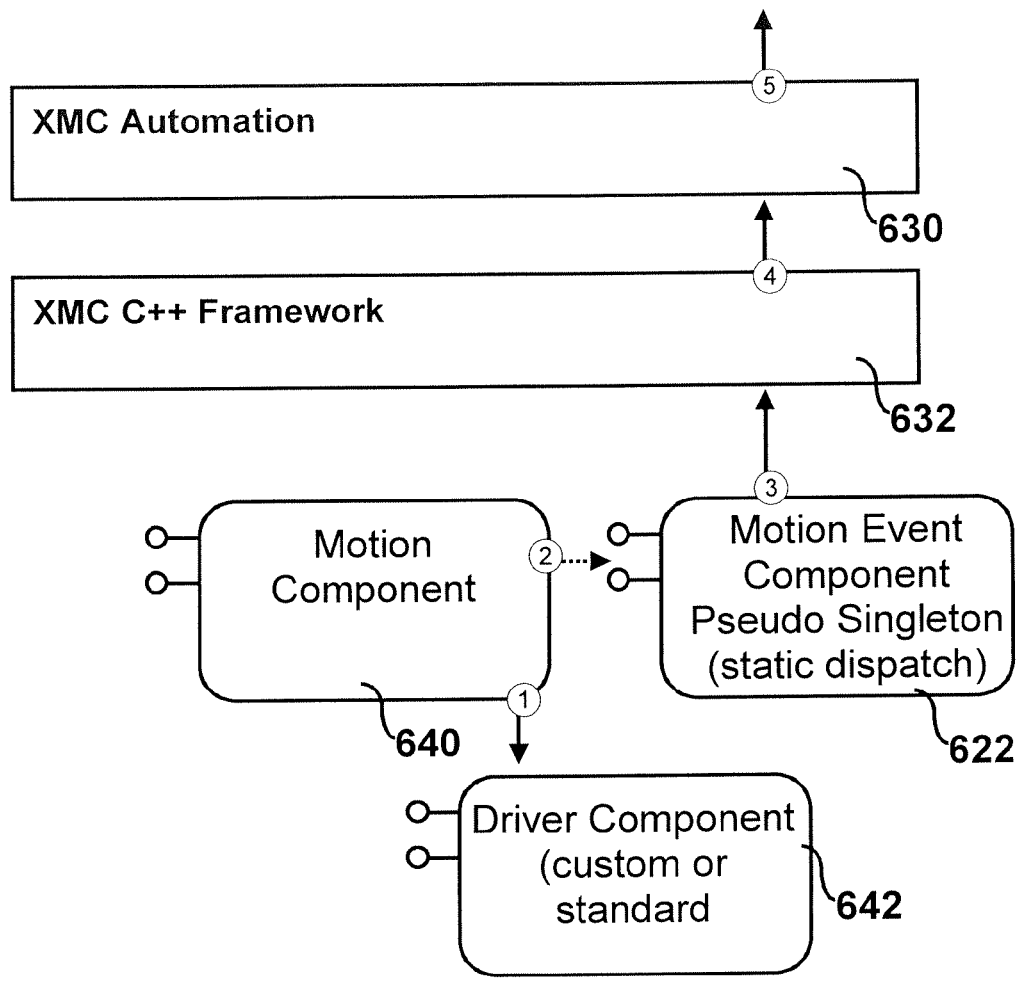
FIG. 42 is a scenario map depicting the event monitoring at the component level.

Referring now to FIG. 42, the process of event monitoring at the component level will now be described. If motion component event monitoring is used and an event occurs, the motion component 640 becomes the event source. Upon detecting an event, the motion component 640 routes the event to subscribed clients through the motion event component 622. The steps that occur when the motion component 40 routes events are as follows:
1. First the motion component 640 monitors the driver component 642 to determine whether any pre-subscribed event conditions occur.
2. Upon detecting a subscribed event condition, the motion component 640 notifies the motion event component 622 of the event.
3. The motion event component 622 then notifies all clients (components, applications or other software) subscribed to the event, that the event has occurred.
4. If the automation layer 630 is used, the C++ framework layer 632 notifies the automation layer 630 of the event.
5. The automation layer 630 then notifies any of its clients of the event, thus completing the event cycle.

Optionally, because the automation layer 630 and C++ framework layer 632 are used as programming conveniences, the motion event component 622 may bypass the automation layer 630 and C++ framework layer 632 and communicate directly with the client application.

Any number of conditions may trigger an event. The following section lists several example event triggers.

Low Level Data Transmission is one example of an event that may be monitored using the motion event monitoring system 620. Very low level events may be used in the motion stream to notify other components when raw data is sent or received to and from the target motion device or machine.

Another example of an event that may be monitored using the event monitoring system 620 is a Motion Action. Certain motion actions may trigger events. For example the completion of a move, hitting a limit switch, or accelerating up to a given velocity may all trigger events that notify the client of the event condition.

The event monitoring system 620 may be used to monitor events triggered by changing data values. More specifically, a controller may define variables that are associated with or contain data values; as the data values associated with these variables change, one or more events may be triggered. For example, the motion driver 642 may poll for variables having data values and, upon seeing a change in value or state of a data value, the driver 642 may fire an event to other components notifying them of the change. This model implemented by the motion event monitoring system 620 follows a publish/subscribe model where the driver 642 "publishes" data changes to "subscribing" components such as the automation layer 630 or any client software using the system 620.

Example C++ Functions

The following discussion describes C++ functions that may be used by the motion event system 620 to support event notifications on data and API changes. The example system 620 uses an object, referred to as CSystemMonitorObj, to implement an internal thread to monitor variables and other API's. Using this example object, once each API changes, registered call back functions are called, thereby notifying the target of the data changes.

The CSystemMonitorObj object uses the following functions to support event notifications: Subscribe, Unsubscribe, Initialize, and CleanUp. The Subscribe function adds a new function call-back to be called on data changes. The Unsubscribe function removes a function from the call-back set. The Initialize function creates a connection to the motion event component 622. The CleanUp function shuts-down any connections to the motion event component 622. Each of these functions will be discussed separately below.

CSystemMonitorObj::Subscribe Function

The "Subscribe" function is used to add a new variable or API to the subscription list and employs the following syntax, parameters, and return value:

| | |
|---|---|
| Syntax | HRESULT Subscribe( DWORD dwType, DWORD dwTypeInfo, LPFNMotionEVENT pfnCallBack, LPVOID pvParam, LPDWORD pdwCookie ); |
| Parameters | DWORD dwType - this parameter specifies the type of data where the following types are currently supported: MOTION_CNC_MONITOR_TYPE_VARIABLE - variable monitor type, were the dwTypeInfo points to a string containing the variable name. Note when monitoring this type, only mapped Motion variables are supported. DWORD dwTypeInfo - contains extra information describing the type of data to be monitored. LPFNMOTIONEVENT pfnCallBack - callback function called when the data monitored changes. This function has the following prototype. HRESULT (*LPFNMOTIONEVENT)( DWORD dwType, DWORD dwTypeInfo, LPVOID pvParam, MOTION_PARAM_DATA rgData, DWORD dwCount ); LPVOID pvParam - extra parameter passed to the callback upon invocation. LPDWORD pdwCookie - pointer to a DWORD where the cookie (value associated with the connection) is copied. |
| Return Value | HRESULT - NOERROR on success, or error code on failure. |

CSystemMonitorObj::Unsubscribe Function

The Unsubscribe function Removes a variable or API from the subscription list and employs the following syntax, parameters, and return value:

| | |
|---|---|
| Syntax | HRESULT Unsubscribe( DWORD dwCookie ); |
| Parameters | DWORD dwCookie - value corresponding to the connection (previously returned by the Subscribe function). |
| Return Value | HRESULT - NOERROR on success, or error code on failure. |

CSystemMonitorObj::Initialize Function

The "Initialize" function creates a connection to the motion event component 622 and employs the following syntax, parameters, and return value:

| | |
|---|---|
| Syntax | HRESULT Initialize( DWORD dwFlags ); |
| Parameters | DWORD dwFlags - reserved for future use, should be set to zero. |
| Return Value | HRESULT - NOERROR on success, or error code on failure. |

CSystemMonitorObj::CleanUp Function

The "CleanUp" function releases the connection to the motion event component 622 and employs the following syntax and return value:

| | |
|---|---|
| Syntax | HRESULT CleanUp( void ); |
| Return Value | HRESULT - NOERROR on success, or error code on failure. |

The following C++ functions are examples of functions that may be used by the motion event system 620 to support event notifications that may be implemented in the automation layer 630. The functions described below apply to direct events supported using standard connection points as well as "lazy events", which are loosely coupled events implemented using COM+ events.

Internal SystemAPI Definitions

The event functionality described above is implemented internally to the event management system 620 using a set of SystemAPI or SystemSPI functions. The term "SystemAPI" refers to an application programming interface exposed by the system 620. The term "SystemSPI" refers to a service provider interface defined by the system 620.

When event functionality is implemented at the level of the motion component 640, the SystemAPI definitions are used. When event functionality is implemented at the level of the driver component 642, the events are passed down to the driver component 642 and handled by the SystemSPI definitions.

All data passed to the SystemAPI is passed in the form of a function index called the SystemAPI index and an array of parameters (RgData) that use a Standard Motion Parameter Data Type that will be described in further detail below.

In the following discussion, portions of the SystemAPI and SystemSPI provided to handle event management will be defined.

MOTION_CNC_EVENT_SUBSCRIBE API

The MOTION_CNC_EVENT_SUBSCRIBE API is a SystemAPI that is used to subscribe to a given event condition. In the present example, only variables are supported by the event notification. The present invention may be implemented using events that include motion conditions, raw data transmission conditions, or other state change information occurring either in the motion event system 620 or on the target device or machine. The following Index Value and RgData Values are used to implement this API:

| | |
|---|---|
| Index Value | 2890 |
| RgData[0] | (in, number) type of event to monitor. Current types supported are: XMC_CNC_MONITOR_TYPE_VARIABLE - variable monitor type, were the RgData[1] points to a string containing the variable name. Note when monitoring this type, only mapped XMC variables are supported. |
| RgData[1] | (in, number or string depending on RgData[0]) - actual type information describing the event condition to be monitored. For example when RgData[0] = XMC_CNC_MONITOR_TYPE_VARIABLE, this field contains the actual variable name to monitor. |

-continued

| | |
|---|---|
| RgData[2] | (in, number) number of event conditions to monitor. For each count of event conditions to monitor, there are two elements in the RgData array that follow (one for the event condition type and one for the actual event condition value). |
| RgData[2 + (1*n)] | (in, number) event condition type where the following types are supported:<br>XMC_CNC_EVENTCONDITION_DATA_CHANGE - any data changes in the data type above will trigger the event.<br>XMC_CNC_EVENTCONDITION_DATA_EQUAL<br>XMC_CNC_EVENTCONDITION_DATA_LESSTHAN<br>XMC_CNC_EVENTCONDITION_DATA_GREATERTHAN<br>XMC_CNC_EVENTCONDITION_DATA_AND<br>XMC_CNC_EVENTCONDITION_DATA_OR<br>Each of the conditions above are used in a combined manner. Where the logical condition (=, <, >) are applied for each type respectively.<br>For example, in an array that contains the following items:<br>rgData[2] = 4 (4 condition values)<br>rgData[3] = XMC_CNC_EVENTCONDITION_EQUAL<br>rgData[4] = 3.0<br>rgData[5] = XMC_CNC_EVENTCONDITION_LESSTHAN<br>rgData[6] = 3.0<br>rgData[7] = XMC_CNC_EVENTCONDITION_OR<br>rgData[8] = 1.0<br>rgData[9] = XMC_CNC_EVENTCONDITION_GREATHERTHAN<br>rgData[10] = 5.0<br>the array would be evaluated using the following logic:<br>If (DATA <= 3.0 OR DATA > 5.0) then Trigger Event |
| RgData[0] | (out, number) the cookie (unique identifier) associated with the subscription is returned to the client. |

MOTION_CNC_EVENT_UNSUBSCRIBE API

The MOTION_CNC_EVENT_UNSUBSCRIBE API is a SystemAPI that is used to unsubscribe to a given event condition, thus removing the condition from the monitoring list for the specific client making the unsubscribe request. The event condition will still be monitored if other clients are currently subscribed to the condition. The following Index Value and RgData Values are used to implement this API:

| | MOTION_CNC_EVENT_PAUSE API |
|---|---|
| Index Value | 2891 |
| RgData[0] | (in, number) cookie (unique identifier) associated with the subscription. This value is returned to the client when calling the subscription SystemAPI above. |

The MOTION_CNC_EVENT_PAUSE API allows monitoring of the given event condition to be paused for the given client but does not remove it from the subscription list. The following Index Value and RgData Values are used to implement this API:

| | |
|---|---|
| Index Value | 2892 |
| RgData[0] | (in, number) cookie value (unique identifier) associated with the subscription. |

The Standard Motion Parameter Data Type discussed briefly above will now be discussed in further detail. The structure of the Standard Motion Parameter Data Type is referred to as MOTION_PARAM_DATA. Many methods on the Motion C++ classes use the standard Motion parameters set to describe data used to control, query or set each axis. The standard parameters are in the following format:

pObj->method(LPMOTION_PARAM_DATA rgParamData, DWORD dwCount);

Each element in the rgParamData array corresponds to an axis in the system, with the first element in the array corresponding to the first axis of motion. For example, if the first axis of motion is the 'X' axis, then 'X' axis would correspond to the first element in the array.

The MOTION_PARAM_DATA structure can contain either a numerical or a string value and is defined as follows:

```
typedef struct tagMOTION_PARAM_DATA
{
    LNG_PARAM_DATATYPE adt;
    union
    {
        double df;
        LPTSTR psz;
    };
} MOTION_PARAM_DATA;
```

The 'adt' member of the MOTION_PARAM_DATA structure describes the data contained within the MOTION_PARAM_DATA structure. The values are described below:

| LNG_PARAM_DATATYPE | Description |
|---|---|
| LNG_ADT_NUMBER | Use this value when passing a numerical value via the 'adt' member of the MOTION_PARAM_DATA structure. |
| LNG_ADT_STAT_STRING | Use this value when passing a static string value via the 'psz' member of the MOTION_PARAM_DATA structure. Static strings do not need to be freed from memory. |

-continued

| LNG_PARAM_DATATYPE | Description |
|---|---|
| LNG_ADT_MEM_STRING | Use this value when passing a string value via the 'psz' member of the MOTION_PARAM_DATA structure. LNG_ADT_MEM_STRING denotes that the string must be freed from memory during cleanup. |
| LNG_ADT_NOP | This value is used to ignore items within the MOTION_PARAM_DATA array. For example, if you need to command move-at-velocity for only the third axis of a three axis machine, you would send an MOTION_PARAM_DATA array to CSystemMotionObj::MoveAtVelocity where the first 2 elements would be of type LNG_ADT_NOP and the third element would be of type LNG_ADT_NUMBER. The motion component 40 would then issue the move-at-velocity command only to the third axis, ignoring the first two. |

The system 620 handles Boolean types in the following manner. When querying and setting boolean TRUE/FALSE values, any non-zero value is considered TRUE and any zero value is considered FALSE. For example, if the df field of an MOTION_PARAM_DATA array element is non zero and it is sent to CSystemMotionObj::LimEnableSW, the software limits for the specified axis will be enabled.

VARIABLE SUPPORT SYSTEM

Typically, the variables associated with a motion system change as the motion system changes state. Events generated by motion systems are often associated with these changing variables. Referring now to FIGS. 47-51, depicted therein is a variable support system 720 for facilitating access to and mapping of motion variables. The system 720 is of particular significance when used in conjunction with the motion event handling system 620 described above, but also has application to motion systems that do not incorporate the motion event handling system 620.

Figure 44:
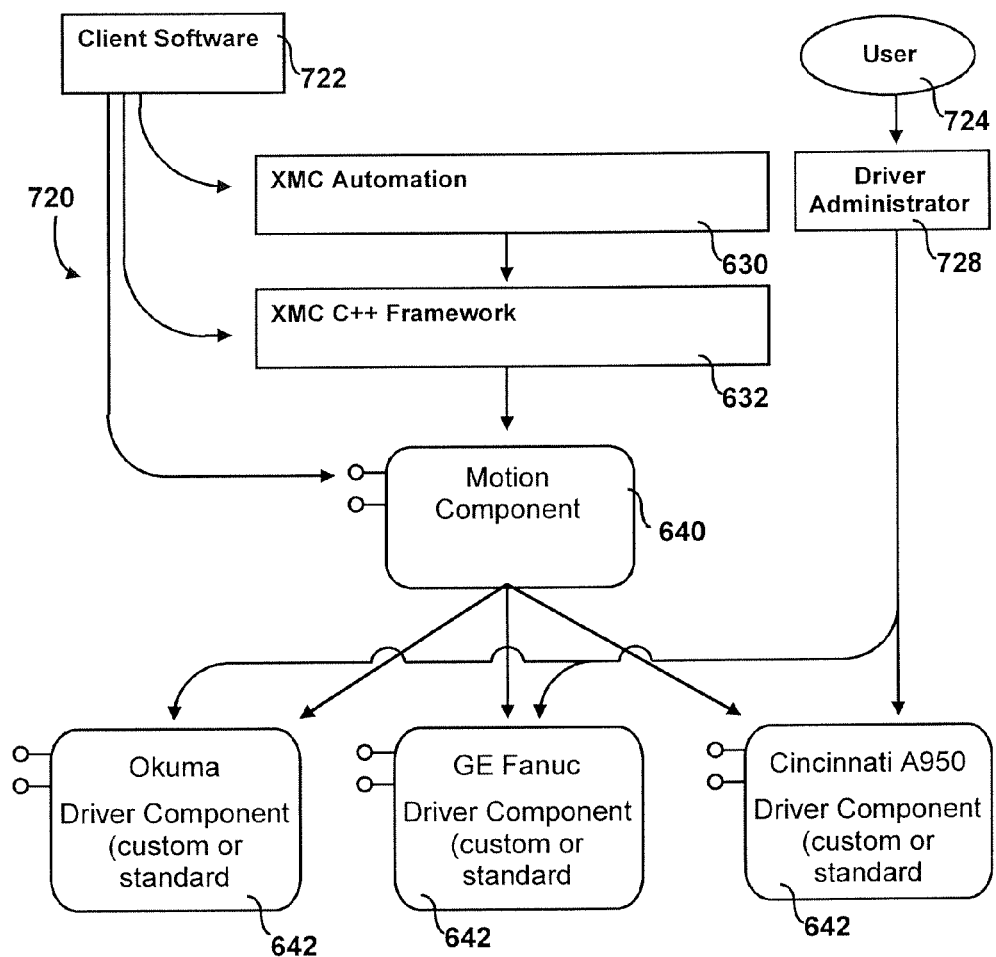
FIG. 44 is a module interaction map depicting a variable support system in the context of a motion system.

Referring now to FIG. 44, that figure illustrates that the example variable support system 720 comprises the automation layer 630, framework layer 632, motion component 640, and driver components 642 as generally described above. In addition, as depicted in FIG. 44, the variable support system 720 comprises client software 722, a user 724, and a driver administrator component 728. The motion event component 622 is not shown in FIG. 44 for clarity but may also be used by the system 720.

The objects forming the variable support system 720 will be described in further detail below after a discussion of an object model associated with the variable support system 720.

Example Object Model

Figure 43:
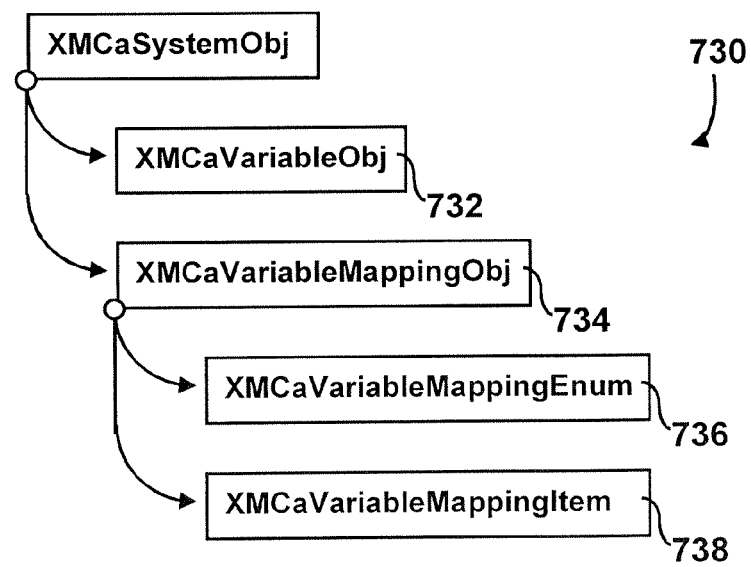

Referring now to FIG. 43 of the drawing, depicted therein is an object model 730 illustrating the relationships among a plurality of objects associated with the example variable support system 720. As shown in FIG. 43, the object model 730 illustrates that the example object model 722 comprises the following variable support objects:

A MotionaVariableObj object 732 is the main object used for variable access. Variables are read and written from this object. In addition, a list of text variable names, as well the general attributes for each variable, can be queried from this object;

A MotionaVariableMappingObj object 734 used to map each variable name to the internal representation of the variable on the controller of a given motion device.

A MotionaVariableMappingEnum object 736 that enumerates all variable mappings configured by the user 724 as well as those provided by the motion component 640.

A MotionaVariableMappingItem object 738 that represents a single variable mapping where the mapping consists of the following "name"→"mapping".

FIG. 45 of the drawing depicts an example of how the variable support objects described below may be used in the context of Microsoft Visual Basic.

The MotionaVariableObj object 732, MotionaVariableMappingObj object 734, MotionaVariableMappingEnum object 736, and MotionaVariableMapping Item object 738 each expose methods, and the methods exposed by each of the objects 732 and 734 will be described separately below.

MotionaVariableObj Object

The MotionaVariableObj 732 supports or exposes the following methods: ReadItem, Read, WriteItem, Write, GetNames, and GetAttributes. The ReadItem method reads a single variable (or array element) and returns the data read. The Read method reads a set of items. The WriteItem methods writes a set of items. The GetNames method returns the list of variable names currently mapped either by the motion component 640 or by the user 724. The GetAttributes method returns the attributes for a given variable. Each of these methods will be separately described in further detail below.

The MotionVariableObj.ReadItem method employs the following syntax, parameters, and return value to read a variable item and return the data read:

| | |
|---|---|
| Syntax | Function ReadItem( strName As String ) As Variant |
| Parameters | strName As String - string containing the name of the variable to be read. |
| Return Value | Variant - data read from the variable. |

The MotionaVariableObj.Read method employs the following syntax and parameters to read a variable item or array and return the data read in the parameter passed:

| | |
|---|---|
| Syntax | Sub Read( strName as String, ByVal rgData( ) As Variant ) |
| Parameters | strName As String - name of variable to read. |
| | rgData( ) as Variant - array of data items read. |
| Return Value | None. |

The MotionaVariableObj.WriteItem method employs the following syntax and parameters to write a variable item to the controller of a given motion device:

| | |
|---|---|
| Syntax | Sub WriteItem( strName As String, varData As Variant ) |
| Parameters | strName As String - string containing the name of the variable to be read. |
| | varData As Variant - data to be written. |
| Return Value | None. |

The MotionaVariableObj.Write method employs the following syntax and parameters to write a variable item or array to the controller of a given motion device:

| | |
|---|---|
| Syntax | Sub Write( strName as String, rgData( ) As Variant ) |
| Parameters | strName As String - name of variable to read.<br>rgData( ) as Variant - array of data items to be written. |
| Return Value | None. |

The MotionaVariableObj.GetNames method employs the following syntax and parameters to get the variable names for a given domain (this method supports both variables mapped in the motion component 640 and variables mapped by the user 724 using a variable mapping API):

| | |
|---|---|
| Syntax | Sub GetNames( strDomain As String,<br>  strName as String,<br>  rgData( ) As Variant ) |
| Parameters | strDomain as String - name of domain (if any) from which variables are to be read.<br>strName As String - name of first variable to retrieve.<br>rgData( ) as Variant - array of data items to be written. |
| Return Value | None. |

The MotionaVariableObj.GetAttributes method uses the following syntax and parameters to get the attributes for a given variable:

| | |
|---|---|
| Syntax | Sub GetAttributes( strName as String,<br>  rgData( ) As Variant ) |
| Parameters | strName As String - name of first variable to retrieve.<br>strAttrib as String - attributes for the variable. |
| Return Value | None. |

MotionaVariableMappingObj Object

The MotionaVariableMappingObj object 734 supports or exposes the following methods: AddMapping, RemoveMapping, RemoveAll, GetMappingList, LoadMappings, and SaveMappings. The AddMapping method adds a new mapping to the list. The RemoveMapping method removes a mapping from the list. The RemoveAll method removes all mappings from the list. The GetMappingList method retrieves the mapping enumerator. The LoadMappings method loads a persisted mapping set. The SaveMappings method saves a mapping set to persisted storage. Each of these methods will be separately described in further detail below.

The MotionaVariableMappingObj.AddMapping method employs the following syntax and parameters to add a new mapping to the mapping list:

| | |
|---|---|
| Syntax | Sub AddMapping( strName As String, strMap As String ) |
| Parameters | strName As String - string containing the name of the variable to be mapped.<br>strMap As String - string containing the mapping information for the variable. |
| Return Value | None. |

The mapping format for a variable is as follows:
DOMAIN:VARNAME:VARPATH:VARWRITEFMT
where "DOMAIN" refers to the domain name on the controller, "VARNAME" the variable name on the controller to be read, "VARPATH" is the variable path (for arrays and structures) of the variable, and "VARWRITEFMT" is the variable write format used when writing data to the variable. A semicolon ':' separates each of the items in the mapping. If the item is empty, the semicolons must still appear. Several example mappings are as follows:
  "FOO"→"APC1:MULTI_SETUP:(0):(0){I4}"
  "BOO"→":PI_TOOL_DATA_TABLE:(0)(1).tool_
    length:(1)(1)[{I4}]"

The MotionaVariableMappingObj.RemoveMapping method employs the following syntax and parameters to remove a mapping from the mapping list:

| | |
|---|---|
| Syntax | Sub RemoveMapping( strName As String ) |
| Parameters | strName As String - string containing the name of the variable to be removed from the mapping list. |
| Return Value | None. |

The MotionaVariableMappingObj.RemoveAll method employs the following syntax to remove all mappings from the mapping list:

| | |
|---|---|
| Syntax | Sub RemoveAll( ) |
| Parameters | None. |
| Return Value | None. |

The MotionaVariableMappingObj.LoadMappings method employs the following syntax and parameters to load a set of mappings from a file:

| | |
|---|---|
| Syntax | Sub LoadMappings( strFile As String ) |
| Parameters | strFile as String - name of file from which the mappings are to be loaded. |
| Return Value | None. |

When using the MotionaVariableMappingObj.LoadMappings method to load mappings from a file, all existing mappings are deleted.

The MotionaVariableMappingObj.SaveMappings method employs the following syntax and parameters to save a set of mappings to file.

| | |
|---|---|
| Syntax | Sub SaveMappings( strFile As String ) |
| Parameters | strFile as String - name of file from which the mappings are to be saved. |
| Return Value | None. |

The MotionVariableMappingObj.GetMappingList method employs the following syntax, parameters, and return value to Retrieve a variable mapping enumerator.

| | |
|---|---|
| Syntax | Function GetMappingList( strDomain as String ) As Object |
| Parameters | strDomain as String - name of the domain for which the enumerator is to enumerate. When empty all variables are enumerated. Currently the following domains are supported:<br>XMC - all variables mapped in the XMC Motion Administrator.<br>user 724 - all user 724 mapped variables using the Mapping API. |
| Return Value | Variable Enumerator. |

Driver Component Implementation

The function index and parameter signature for each function used by the variable support objects 730 will now be described in further detail. In particular, the parameter signature and function indices used by the various driver component 642 functions to implement the new variable support will now be discussed.

The MOTION_CNC_VARIABLE_READ function employs the following Index value and RgData values to read a mapped variable:

| | |
|---|---|
| Index Value | 2870 |
| RgData[0] | (in, string) mapped variable name. |
| RgData[1] | (in, out, number) max elements to read in, number read out. |
| RgData[2 . . .] | (out) data read |

The MOTION_CNC_VARIABLE_READ function employs the following Index value and RgData values to write a mapped variable:

| | |
|---|---|
| Index Value | 2871 |
| RgData[0] | (in, string) mapped variable name. |
| RgData[1 . . .] | (in) data to write. |

The MOTION_CNC_VARIABLE_LIST_GET function employs the following Index value and RgData values to get the list of mapped values:

| | |
|---|---|
| Index Value | 2872 |
| RgData[0] | (in, string) domain (XMC, USER, empty) XMC - all XMC variables mapped in Motion Admin. USER - all user 724 variables mapped with Mapping API. empty - all variables (XMC + USER). |
| RgData[1] | NOT USED - (in, string) first variable to start the list. |
| RgData[2] | (in, out, number) max variables to query in, actual number queried out. |
| RgData[3 . . .] | (out, string) list of variable names. |

The MOTION_CNC_VARIABLE_ATTRIB_GET function employs the following Index value and RgData values to get the attributes describing a given mapped variable:

| | |
|---|---|
| Index Value | 2873 |
| RgData[0] | (in, string) mapped variable name. |
| RgData[1] | (out, string) attributes of the variable. |

The MOTION_CNC_VARIABLE_ADDMAPPING function employs the following Index value and RgData values to add a user 724 defined variable mapping.

| | |
|---|---|
| Index Value | 2850 |
| RgData[0] | (in, string) variable name to be mapped. |
| RgData[1] | (in, string) variable mapping using the following format: DOMAIN:VARNAME:VARPATH:VARWRITEFMT DOMAIN—controller domain. VARNAME—variable name on controller. VARPATH—variable path (used for arrays and structures). VARWRITEFMT—format of the variable data written to HW. |

The MOTION_CNC_VARIABLE_REMOVEMAPPING function employs the following Index value and RgData values to remove a specific variable mapping:

| | |
|---|---|
| Index Value | 2851 |
| RgData[0] | (in, string) mapped variable name. |

The MOTION_CNC_VARIABLE_REMOVEALLMAPPINGS function employs the following Index value and RgData values to remove all variable mappings:

| | |
|---|---|
| Index Value | 2852 |
| No params | |

The MOTION_CNC_VARIABLE_MAPPINGCOUNT_GET function employs the following Index value and RgData values to get the number of variable mappings:

| | |
|---|---|
| Index Value | 2853 |
| RgData[0] | (out, number) number of variable mappings. |

The MOTION_CNC_VARIABLE_MAPPING_GETAT function employs the following Index value and RgData values to get the variable mapping settings:

| | |
|---|---|
| Index Value | 2854 |
| RgData[0] | (in, number) variable mapping index to query. |
| RgData[1] | (out, string) variable name at the index specified. |
| RgData[2] | (out, string) variable mapping at the index specified. |

The MOTION_CNC_VARIABLE_MAPPING_SETAT function employs the following Index value and RgData values to change the settings of a variable mapping:

| | |
|---|---|
| Index Value | 2855 |
| RgData[0] | (in, number) variable mapping index. |
| RgData[1] | (in, string) variable name for the mapping at the index (Cannot change from the original name, only used for verification.) |
| RgData[2] | (in, string) new variable mapping for the variable. |

The MOTION_CNC_VARIABLE_LOAD_MAPPINGS function employs the following Index value and RgData values to load a set of variable mappings:

| | |
|---|---|
| Index Value | 2857 |
| RgData[0] | (in, string) name of the file to load. |
| RgData[1] | (in, number, optional) flags for the load operation. |

The MOTION_CNC_VARIABLE_SAVE_MAPPINGS function employs the following Index value and RgData values to save all variable mappings:

| | |
|---|---|
| Index Value | 2856 |
| RgData[0] | (in, string) name of the file where the mapping info is saved. |
| RgData[1] | (in, number, optional) flags for the load operation. |

The MOTION_CNC_VARIABLE_VALIDATE_MAPPINGS function employs the following Index value to validate all variable mappings:

| | |
|---|---|
| Index Value | 2858 |
| No params | |

The MOTION_CNC_SYSTEM_CONNECT function employs the following Index value and RgData values to connect to the controller:

| Index Value | 502 |
|---|---|
| RgData[0] | (in, number) channel (1.0, 2.0 or 3.0) |

The MOTION_CNC_SYSTEM_DISCONNECT function employs the following Index value and RgData values to disconnect from the controller:

| Index Value | 503 |
|---|---|
| RgData[0] | (in, number) channel (1.0, 2.0 or 3.0) |

The MOTION_CNC_DIRECT_VARIABLE_READ function employs the following Index value and RgData values to directly read from a variable on the controller:

| Index Value | 2803 |
|---|---|
| RgData[0] | (in, number) channel (1.0, 2.0 or 3.0) |
| RgData[1] | (in, string) domain name |
| RgData[2] | (in, string) variable name |
| RgData[3] | (in, string) variable path |
| RgData[4] | (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[5 . . .] | (out) Data read from controller. |

The MOTION_CNC_DIRECT_VARIABLE_WRITE function employs the following Index value and RgData values to directly write to a variable on the controller:

| Index Value | 2823 |
|---|---|
| RgData[0] | (in, number) channel (1.0, 2.0 or 3.0) |
| RgData[1] | (in, string) domain name |
| RgData[2] | (in, string) variable name |
| RgData[3] | (in, string) variable path |
| RgData[4] | (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[5] | Number of items to write. |
| RgData[6] | Data write format for VARIANT type, otherwise the full string containing data write format and comma delimited data. |

The MOTION_CNC_DIRECT_VARIABLE_LIST_GET function employs the following Index value and RgData values to get the list of all variables directly from the controller:

| Index Value | 2798 |
|---|---|
| RgData[0] | (in, number) channel (1.0, 2.0 or 3.0) |
| RgData[1] | (in, string) domain name |
| RgData[2] | (in, string) variable name |
| RgData[3] | (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[4] | (in, number) Number of items to query. |
| RgData[5 . . .] | (out, string) List of variable names. |

The MOTION_CNC_DIRECT_VARIABLE_ATTRIB_GET function employs the following Index value and RgData values to get the attributes of a variable directly from the controller:

| Index Value | 2799 |
|---|---|
| RgData[0] | (in, number) channel (1.0, 2.0 or 3.0) |
| RgData[1] | (in, string) domain name |
| RgData[2] | (in, string) variable name |
| RgData[3] | NOT USED - (in, string) variable name |
| RgData[4] | NOT USED - (in, number) data format |
| | MOTION_VARFMT_STRING_DATA_AND_TYPE (0x00000003) |
| | MOTION_VARFMT_STRING_DATA (0x00000001) |
| | MOTION_VARFMT_VARIANT (0x00000004) |
| RgData[5] | (out, string) String containing the attributes. |

Controller Independent Variables

Currently, various methods of implementing variables are used within control technologies. Typically each vendor has a proprietary manner of specifying each variable and how it is accessed. The variable support system 720 may use what will be referred to herein as Independent Variables to facilitate access to any variable no matter how the variable is actually implemented by the control vendor. The Independent Variables may be independent of the particular hardware or software system used. The following discussion will describe an example design for controller neutral variables, including a description of all software modules involved.

Referring for a moment back to FIG. 44, the objects depicted therein are used (some optionally) when setting up and using controller independent variable mappings. Each of the objects depicted in FIG. 44 will now be described in further detail.

The client software 722 is any software that uses the services of the motion component 640 to setup or use controller independent variable mappings. The client may access the motion component 640 via the automation layer 630, the framework layer 632, or directly where the client software 722 communicated directly with the motion component 40.

The example automation layer 630 is provided for programming environments that support Microsoft OLE Automation. Several examples of such programming environments are Microsoft Visual Basic, applications that are VBA (Visual Basic for Applications) aware, the Visual Basic Scripting environment typically used in Internet/Web based HTML pages, and the new Microsoft .NET environment.

The framework layer 632 is provided for programming environments that use the C++ programming language. Microsoft's Visual Studio 6.0 is an example of such an environment.

The motion component 640 services all client requests for mapped variable configuration and usage. The motion component 640 may be accessed directly, such as by the framework layer 632, or indirectly, such as through the automation layer 630. When requested, the motion component 640 routes the request to the active driver component 642 and may be used with a plurality of driver components 642 in a multi control environment.

The driver component 642 implements the specific variable mapping for a specific controller technology. Each variable mapping is setup either programmatically or via the driver administrator component 728.

The driver administrator component 728 is a user 724 application that allows the user 724 to visually configure each variable mapping for each controller dependent driver component 642. All configurations made in the driver administrator component 728 can be done without any new software programming.

The user 724 is the a person who configured the variable mappings and/or a person who runs or otherwise uses client software that internally uses mapped variables.

Several examples of use cases will now be described to illustrate how the variable mapping model implemented by the system 720 may be used. In the examples discussed below, each driver component 642 is responsible for storing and performing any variable transformations between controller neutral and controller specific data.

Each variable mapping for each controller dependent driver component 642 may be mapped and/or otherwise configured in any one of several ways. The examples depicted in FIGS. 46 and 47 describe how an end-user 724 would configure the variable mappings without any additional software programming. Such mappings are configured via a driver administrator 728 that allows the driver component(s) 642 to be configured.

Figure 46:
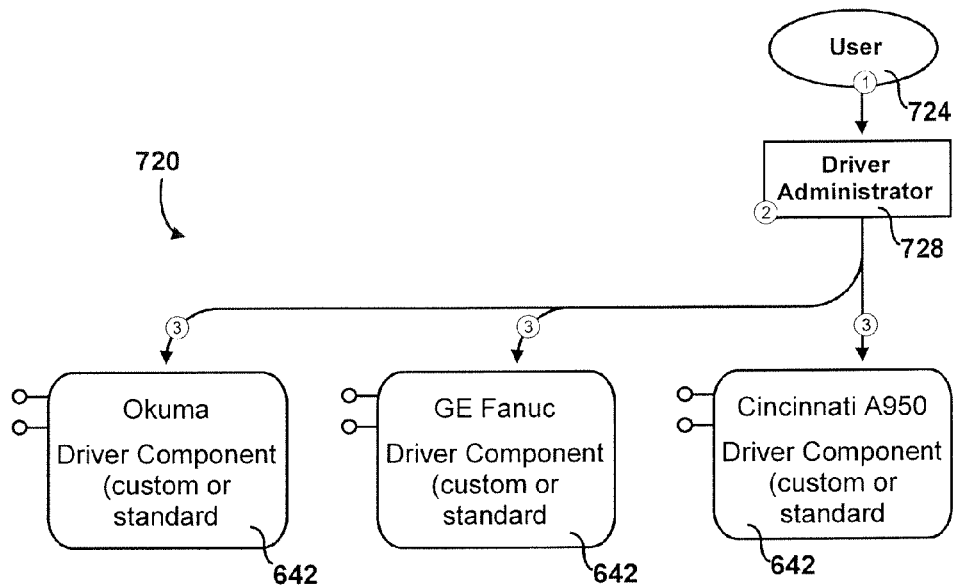
FIG. 46 is a scenario map illustrating the configuration of variable mappings using an administrator component.

Referring initially to FIG. 46, depicted therein is an example of a situation in which the user 724 configures variable mappings with an administrator component the driver administrator component 728. When the user 724 configures variable mappings with the driver administrator 728, the following steps take place:

1. First the user 724 runs the driver administrator component 728 and selects the target driver component 642 for which variable mappings are to be configured.
2. For each target driver component 642, the user 724 enters in the controller dependent information for each controller neutral variable name (or tag). To make the variable controller independent, the same variable name is used and configured within each driver component 642 associated with a controller so that when the variable is later used, the client software 722 using the variable has no need to know any controller dependent information about the mapping. Instead, the variable mapping takes place of the transformation from the controller independent variable name, type, and structure into the controller dependent variable name, type, and structure.
3. The mapping information specific to each driver component 642 is sent to the driver component 642, which in-turn stores the information in a persistent form for later use.

Figure 47:
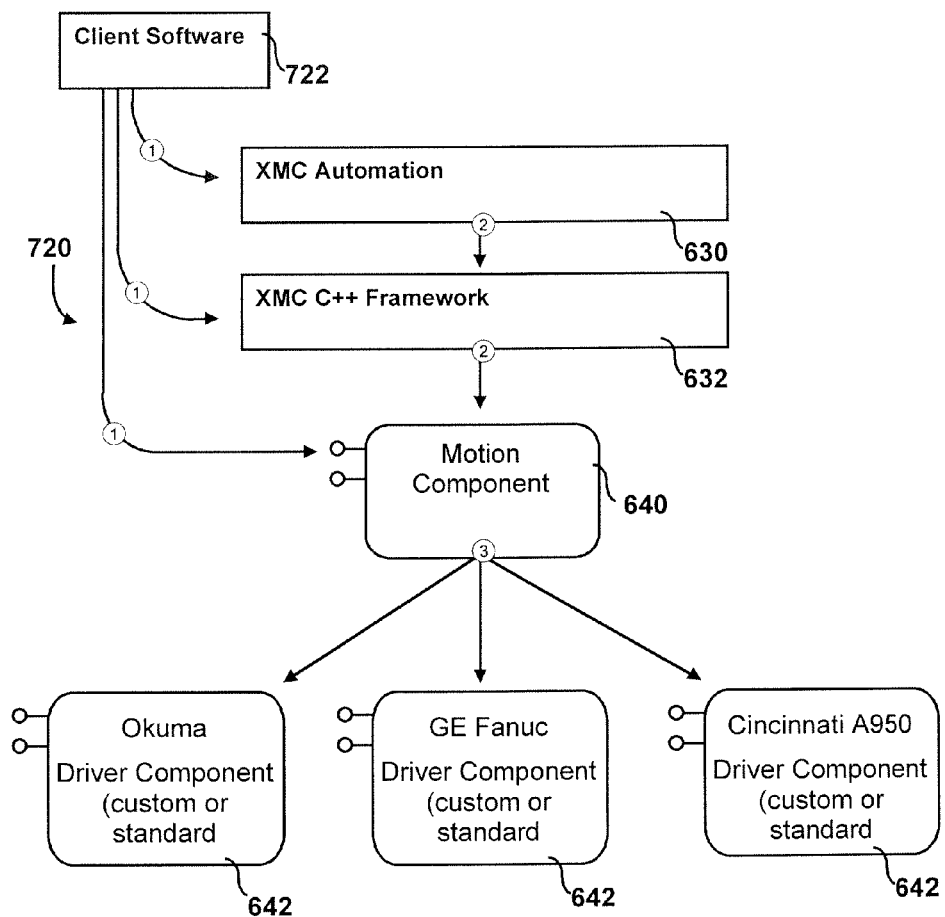
FIG. 47 is a scenario map illustrating the configuration of variable mappings programmatically.

Referring now to FIG. 47, depicted therein is an example of configuring variable mappings programmatically using either the motion component 640 or the driver administrator component 728. FIG. 47 illustrates that the following steps are performed when configuring the motion component 640 programmatically:

1. First the client software 722 programmatically sends the variable mapping information to the motion component 640 either directly or via the framework layer 632 software layers. The motion component 640 is directed to configure the variable mapping for a specific driver component 642.
2. If a framework layer 632 is used, the framework layer 632 relays the information for the variable mapping directly to the motion component 640.
3. Upon receiving the request, the motion component 640 sends the variable mapping information to the target driver component 642, which in turn saves the information for later use when the mapped variable is requested.

As an alternative, the motion component 640 may store the mapping information for each driver component 642 in a mapping database, thus relieving each driver component 642 from having to perform any mapping logic. When a variable is then requested, the motion component 640 would look-up the variable mapping and send the mapped controller dependent information associated with the variable to the target driver component 642. The driver component 642 would then operate on the controller dependent information in a conventional manner.

Figure 48:
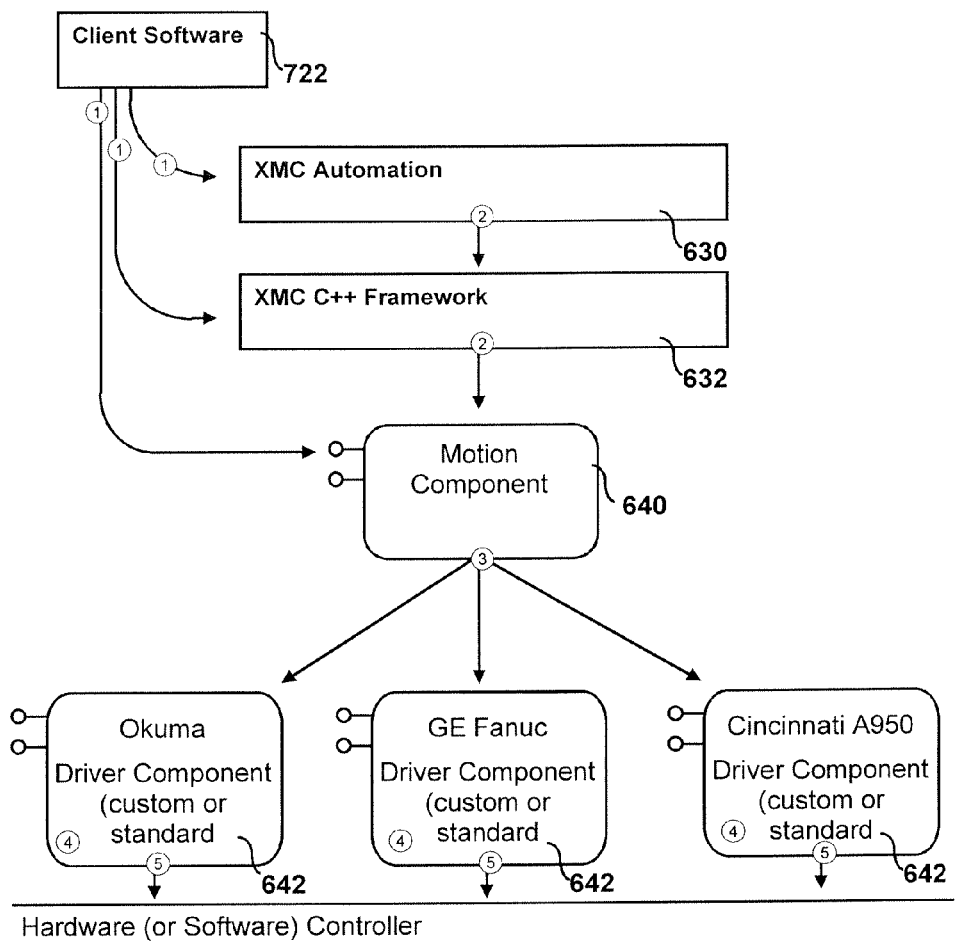
FIG. 48 is a scenario map illustrating the use of the variable support system to map variables.

Referring now to FIG. 48, depicted therein is an example of the system 720 using variable mappings. When using variable mappings, the controller independent variable name, type and structure are always used by the client software 722, thus allowing for controller independent use. When the same variable name, type, and structure are configured across several controller dependent technologies, the variable mapping taking place between the controller independent variable information and the controller dependent variable creates the controller independent variable environment.

FIG. 48 illustrates that the following steps occur when using the system 720 to map variables:

1. First the client software 722 programmatically requests an operation to occur on the variable (i.e. read, write, query attributes, etc).
2. The client software may communicate with the motion component 640 direct or via the framework layer 632 layers (which in-turn then communicates with the motion component 640).
3. Upon receiving the variable request, the motion component 640 routes the information directly to the driver component 642 (or driver components 642 in a multi controller environment).
4. Upon receiving the variable request each driver component 642 transforms the controller independent variable information into the controller specific variable information and then performs the variable operation(s) using the controller specific information. Upon receiving any controller specific data from the request (i.e. a read operation), the controller specific data received is then retransformed back into the controller neutral format and returned to the motion component 640.
5. The driver component 642 communicates the request to the target controller, for which it is designed, using the controller specific variable name, format and structure.

Figure 49:
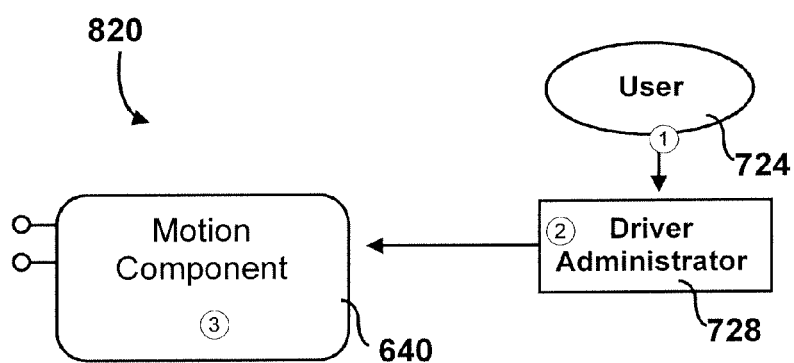
FIG. 49 is a scenario map illustrating a variable support system in which mapping and logic is performed by the motion component.
Figure 50:
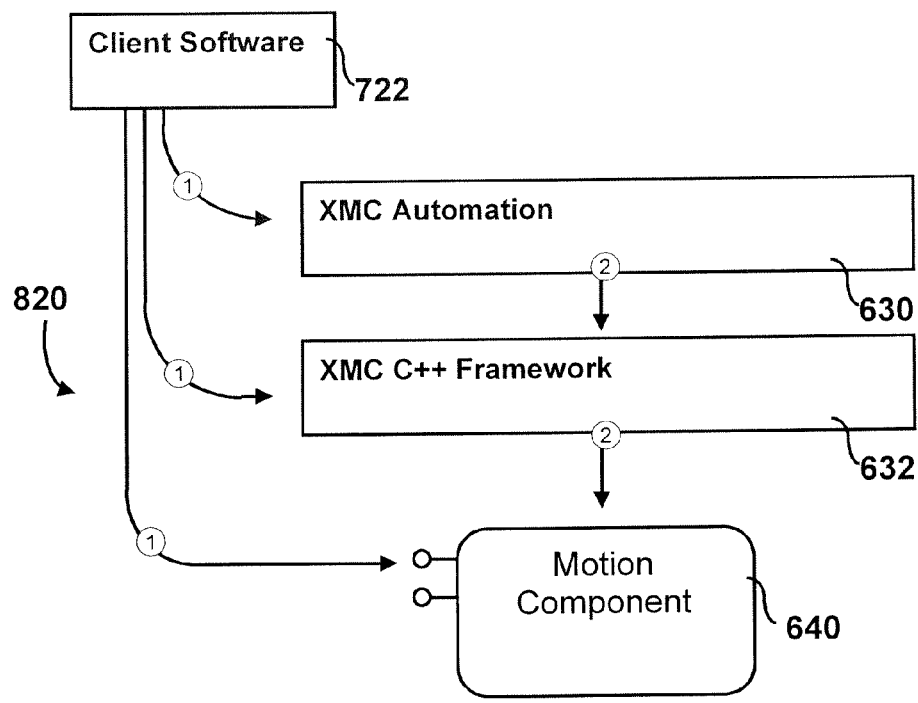
FIG. 50 is a scenario map of the system of FIG. 49 being configured programmatically.
Figure 51:
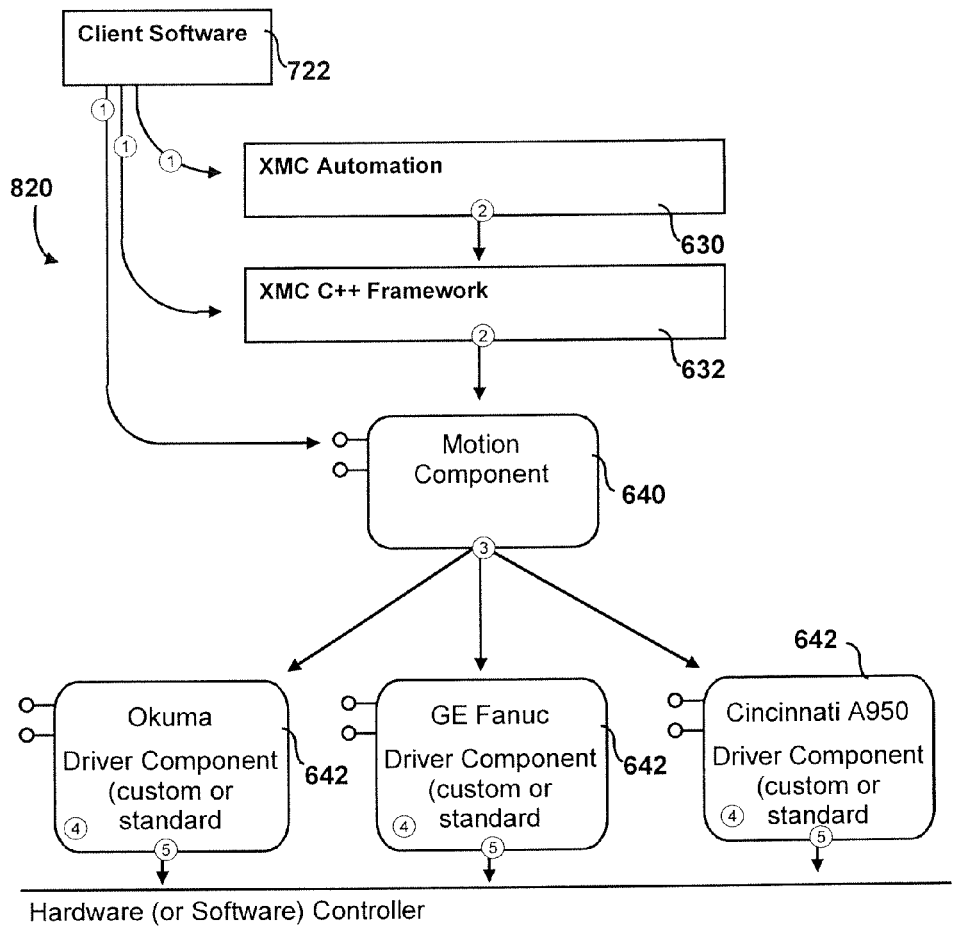
FIG. 51 is a scenario map of the system of FIG. 49 being used to access mapped variables.

Referring now to FIGS. 49-51, described therein is a variable support system 820 that is constructed and operates in a manner that is generally similar system 720 described above. However, in the system 820, all mapping logic and storage is performed by the motion component 640, making each driver component 642 easier and simpler to implement. The system 820 may be referred to as a 'shared' model for the mapping because the variable mapping services are implemented by the motion component 640 and shared among all driver components 642.

Like the system 720, the variable mapping/configuration model implemented by the system 820 may be implemented in several ways. FIG. 49 and the following discussion describes how a user 724 can configure the variable mappings without any additional software programming. Such mappings are configured via the driver administrator component 728. When the user 724 configures variable mappings using the driver administrator component 728, the following steps are performed:

1. First the user 724 runs the driver administrator component 728 and selects the target driver component 642 for which variable mappings are to be configured.
2. For each target driver component 642, the user 724 enters in the controller dependent information for each controller neutral variable name (or tag). To make the variable controller independent, the same variable name is used and configured within each driver component 642 associated with a controller so that when the variable is later used, the client software 722 using the variable has no need to know any controller dependent information about the mapping. Instead, the variable mapping takes place of the transformation from the controller independent variable name, type, and structure into the controller dependent variable name, type, and structure.

3. The mapping information specific to each driver component 642 is sent to the motion component 640 which in turn stores the information in a persistent form for later use.

FIG. 50 illustrates how variable mappings may also be configured programmatically using the motion component 640. When configuring each variable mapping programmatically, the following steps are performed:

1. First the client software 722 programmatically sends the variable mapping information directly to the motion component 640 through the framework layer 632. The motion component 640 is directed to configure the variable mapping for a specific driver component 642.
2. If the framework layer or layers 632 are used, the framework layer(s) relay the information for the variable mapping directly to the motion component 640.
3. Upon receiving the request, the motion component 640 saves the information for later use when the mapped variable is requested.

When using the variable mappings, the client software 722 may use the controller independent variable name, type, and structure to allow for controller independent use. As will be described below with reference to FIG. 51, when the same variable name, type and structure are configured across several controller dependent technologies, the variable mapping taking place between the controller independent variable information and the controller dependent variable creates the controller independent variable environment. FIG. 51 shows that the following steps are performed when using mapped variables:

1. First the client software 722 programmatically requests an operation to occur on the variable (i.e. read, write, query attributes, etc).
2. The client software may communicate with the motion component 640 direct or via the framework layer 632 layers, which in turn communicate with the motion component 640.
3. Upon receiving the variable request, the motion component 640 looks up the controller neutral name in a variable mapping database, making sure to collect the controller specific information for the given mapping and target driver component(s) 642. Once collected, the controller specific variable information is routed directly to the driver component 642 (or driver components 642 in a multi controller environment).
4. Upon receiving the variable request each driver component 642 may optionally verify the controller specific information.
5. Next the driver component 642 communicates the request to the target controller, for which it is designed, using the controller specific variable name, format and structure.

The controller neutral model of supporting variables may be applied to a number of different technologies in a number of different environments. Several example environments will be described below.

Industrial Automation, which refers to the automation of factory or workplace processes, uses variable based information extensively. In the following discussion, the application of the variable support systems will be briefly described in the context of the following Industrial Automation technologies: General Motion Control, CNC Motion Control, Robotic Control, Cell Control, and PLC Control.

General Motion Controllers (both software and hardware) are used for various motion based applications in a wide range of industries. For example, in the semiconductor industries, General Motion Controllers drive many of the pick-n-place and vision inspection machines. Each of the General Motion Control technologies is implemented with proprietary vendor specific technologies and most expose variables in some proprietary format. The control neutral model would allow for variables from any General Motion Control technology, regardless of vendor or implementation. The client software 722 thus is provided with a consistent system for accessing variable information from each target controller platform.

Computer Numeric Controls (CNC) are used by a wide range of machines in the metal fabrication industries. Each CNC controller supports a variant of the RS274 (G&M Code) language that usually makes the language supported a proprietary version of the original standard. Because the RS274 standard does not address variables, variables are typically handled as a proprietary extension to the RS274 standard, which the extension only works on the control technology for which it is implemented. The control neutral variable model of the present invention greatly improves upon the proprietary technologies by normalizing all variables across the various proprietary control technologies. A variable support system constructed in accordance with the present invention allow improved integration and information flow in enterprise wide systems such as data collection, analysis, and resource planning systems.

Robotic Controllers are similar to general motion controllers in that each Robotic Controller typically employs a proprietary technologies defined by the vendor of the particular Controller. A controller neutral variable support system implemented using the principles of the present invention improves upon proprietary systems by defining a generic system for accessing, manipulating, and configuring variable based information on Robotic Controllers.

A Cell Controller is a system (typically a Personal Computer) that directs the functionality of several controlled machines. The controlled machines, whether from the same vendor or from various vendors, each can implement a different manner of accessing, configuring, and using variables. A controller neutral variable support system of the present invention can simplify the process of implementing a Cell Controller that encompasses a variety of controlled machines using different control technologies.

PLC Controllers typically use variables (or tags) to access virtually all portions of their address space. A controller neutral variable support system of the present invention yields an advantage when applied to PLC Controllers because each PLC vendor typically implements their tags and variables in different proprietary ways.

In addition to Industrial Automation, the principles of the present invention may be used in what is referred to as Consumer Automation. Although the Consumer Automation industry is not yet mature, it is anticipated that the Consumer Automation industry will, like the Industrial Automation industry, face problems with proprietary controllers. A controller neutral variable support system of the present invention will in the future provide many of the same benefits in the Consumer Automation industry as are currently provided in the Industrial Automation industry.

What is claimed is:

1. A motion control system for a user to enable at least one motion device to perform a motion operation, comprising:
   at least one motion control application that comprises at least one API function call associated with the motion task, wherein the at least one motion control application makes at least one API function call to the motion control component;
   an administrator component for storing security settings;
   a security system configured to
      query the administrator component for the security settings, and
      compare each API function call made by the at least one motion control application to the motion control component against the security settings to determine whether each API function call equals the access rights defined by the security settings;
   wherein, if the at least one API function call equals the access rights defined by the security settings, the motion control component generates at least one motion control command based on the at least one API function call made by the at least one motion control application and then transmits the at least one motion control command to the at least one motion device; and
   wherein, if the at least one API function call does not equal the access rights defined by the security settings, the motion control component limits the generation of at least one motion control command based on the at least one API function call made by the at least one motion control application.

2. A motion control system as recited in claim 1, in which the security settings define limits to at least one API function based on an identity of the user.

3. A motion control system as recited in claim 1, in which the security settings define limits to at least one API function based on a motion operation associated with at least one API function.

4. A motion control system as recited in claim 1, in which the security settings define limits to at least one API function based on a status of the at least one motion device.

5. A motion control system as recited in claim 1, in which the security settings define limits to at least one API function based on at least one of:
   an identity of the user;
   a motion operation associated with at least one API function; and
   a status of the at least one motion device.

6. A motion control system as recited in claim 1, in which the security settings define limits to at least one limited API function based on at least one parameter of the at least one limited API function.

7. A motion control system as recited in claim 6, in which the motion control component generates at least one motion control command with motion control command parameter limits determined by the security settings.

8. A motion control system as recited in claim 7, in which the security settings determine at least one of a minimum and a maximum of at least one parameter of the at least one motion control command.

9. A motion control system as recited in claim 7, in which the security settings determine an initial setting of at least one parameter of the at least one motion control command.

10. A motion control system as recited in claim 1, in which the security settings define limits to at least one API function based on an indication of whether the API function can be accessed by more than one motion control application at a time.

11. A motion control system as recited in claim 1, in which at least one motion operation is capable of causing physical movement of the motion device.

12. A method of allowing a user to enable at least one motion device to perform a motion operation, comprising:
   making, in at least one motion control application, at least one API function call;
   storing security settings;
   comparing each API function call made by the at least one motion control application to the motion control component against the stored security settings to determine whether each API function call equals the access rights defined by the security settings;
   if the at least one API function call equals the access rights defined by the security settings, generating, for each API function associated with the at least one API function call, at least one motion control command based on the at least one API function call made by the at least one motion control application and transmitting the at least one motion control command to the at least one motion device; and
   if the at least one API function call does not equal the access rights defined by the security settings, limiting, for each API function associated with the at least one API function call, the generation of at least one motion control command based on the at least one API function call made by the at least one motion control application.

13. A method as recited in claim 12, in which the security settings limit the generation of at least one motion control command for at least one API function based on an identity of the user.

14. A method as recited in claim 12, in which the security settings limit the generation of at least one motion control command for at least one API function based on a motion operation associated with at least one API function.

15. A method as recited in claim 12, in which the security settings limit the generation of at least one motion control command for at least one API function based on a status of the at least one motion device.

16. A method as recited in claim 12, the security settings limit the generation of at least one motion control command for at least one API function based on at least one of:
   an identity of the user;
   a motion operation associated with at least one API function; and
   a status of the at least one motion device.

17. A method as recited in claim 12, in which the security settings limit the generation of at least one motion control command for at least one API function based on at least one parameter of the at least one API function.

18. A method as recited in claim 17, in which at least one motion control command is generated based on motion control command parameter limits determined by the security settings.

19. A method as recited in claim 18, in which the security settings determine at least one of a minimum and a maximum of at least one parameter of the at least one motion control command.

20. A method as recited in claim 18, in which the security settings determine an initial setting of at least one parameter of the at least one motion control command.

21. A method as recited in claim 12, in which the security settings limit the generation of at least one motion control command for at least one API function based on an indication of whether the API function can be accessed by more than one motion control application at a time.

22. A method as recited in claim 12, further comprising the step of performing the motion operation by the motion device based on the at least one motion control command.

\* \* \* \* \*